US006632885B2

(12) United States Patent
Morizono et al.

(10) Patent No.: US 6,632,885 B2
(45) Date of Patent: Oct. 14, 2003

(54) SOFT SYNDIOTACTIC POLYPROPYLENE COMPOSITION AND MOLDED PRODUCT

(75) Inventors: Kenichi Morizono, Yamaguchi (JP); Ryoji Mori, Yamaguchi (JP); Kazuyoshi Kaneko, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/193,293

(22) Filed: Jul. 12, 2002

(65) Prior Publication Data

US 2003/0049477 A1 Mar. 13, 2003

Related U.S. Application Data

(62) Division of application No. 09/719,350, filed as application No. PCT/JP00/02321 on Apr. 10, 2000, now abandoned.

(30) Foreign Application Priority Data

Apr. 13, 1999 (JP) .......................................... 11/105931
Apr. 13, 1999 (JP) .......................................... 11/105932
Aug. 20, 1999 (JP) .......................................... 11/234691

(51) Int. Cl.[7] ......................... C08L 23/10; C08L 23/02; C08K 5/15; B32B 27/32

(52) U.S. Cl. ....................... 525/191; 525/216; 525/221; 525/222; 525/232; 525/240; 428/500; 428/515; 428/516; 428/520; 428/523

(58) Field of Search ................................ 525/191, 216, 525/221, 222, 232, 240; 428/500, 515, 516, 520, 523

(56) References Cited

U.S. PATENT DOCUMENTS 5,232,993 A 8/1993 Winter et al.
5,321,106 A 6/1994 LaPointe
5,840,389 A * 11/1998 Asanuma et al. ........ 428/36.91
5,888,636 A 3/1999 Asanuma et al.
6,417,275 B2 * 7/2002 Takayanagi et al. ........ 525/191

FOREIGN PATENT DOCUMENTS

| | | |
|---|---|---|
| DE | 196 22 059 A1 | 4/1997 |
| EP | 0 405 201 | 1/1991 |
| EP | 0320762 | 4/1992 |
| EP | 0 618 259 A2 | 10/1994 |
| EP | 0 691 354 | 1/1996 |
| EP | 0 770 644 A1 | 5/1997 |
| EP | 0 842 955 A2 | 5/1998 |
| EP | 0 850 756 A2 | 7/1998 |
| EP | 0 896 022 A1 | 2/1999 |
| JP | 1-501950 | 7/1989 |
| JP | 1-502036 | 7/1989 |
| JP | 2-041303 | 1/1990 |
| JP | 2-041305 | 1/1990 |
| JP | 2-078687 | 3/1990 |
| JP | 2-274703 | 9/1990 |
| JP | 2274763 | 10/1990 |
| JP | 3012439 | 1/1991 |
| JP | 3047846 | 2/1991 |
| JP | 3054238 | 3/1991 |
| JP | 3081356 | 4/1991 |
| JP | 3179005 | 5/1991 |
| JP | 3179006 | 5/1991 |
| JP | 3207703 | 5/1991 |
| JP | 3207704 | 5/1991 |
| JP | 3263446 | 6/1991 |
| JP | 4069394 | 3/1992 |
| JP | 4094917 | 3/1992 |
| JP | 2274704 | 7/1992 |
| JP | 4258652 | 9/1992 |
| JP | 5017589 | 1/1993 |
| JP | 565376 | 3/1993 |
| JP | 5077309 | 3/1993 |
| JP | 4114050 | 8/1993 |
| JP | 7125064 | 5/1995 |
| JP | 7126453 | 5/1995 |
| JP | 7126454 | 5/1995 |
| JP | 7126458 | 5/1995 |
| JP | 7149968 | 6/1995 |
| JP | 7171869 | 7/1995 |
| JP | 7247387 | 9/1995 |
| JP | 7247388 | 9/1995 |
| JP | 8109292 | 4/1996 |
| JP | 8120127 | 5/1996 |
| JP | 8217928 | 8/1996 |
| JP | 8290461 | 11/1996 |
| JP | 8301934 | 11/1996 |
| JP | 9100374 | 12/1996 |
| JP | 952328 | 2/1997 |
| JP | 9157462 | 6/1997 |
| WO | WO96/20150 | 7/1996 |

OTHER PUBLICATIONS

Search Report issued in European Patent Application No. EP 00 91 5458, Mar. 21, 2003.

* cited by examiner

*Primary Examiner*—Nathan M. Nutter
(74) *Attorney, Agent, or Firm*—Burns, Doane, Swecker & Mathis, LLP

(57) ABSTRACT

The present invention is intended to provide a soft syndiotactic polypropylene composition having a good balance of properties such as transparency, flexibility and heat resistance and a laminate having a layer comprising the composition and a layer comprising a thermoplastic resin. The composition (1) comprises a syndiotactic propylene polymer (A), an $\alpha$-olefin polymer (B), and a small amount of a crystal nucleating agent (C) and/or an ethylene-based polymer (D). The composition (2) comprises a syndiotactic propylene polymer (A), an $\alpha$-olefin polymer (B), an isotactic propylene polymer (E), and a small amount of a crystal nucleating agent (C) and/or an ethylene-based polymer (D). The composition (3) comprises a syndiotactic propylene polymer (A), an $\alpha$-olefin polymer (B), an isotactic propylene polymer (E), a copolymer (F) of polar group-containing vinyl and ethylene, and a small amount of an ethylene-based polymer (D).

23 Claims, No Drawings

SOFT SYNDIOTACTIC POLYPROPYLENE COMPOSITION AND MOLDED PRODUCT

This application is a divisional of U.S. application Ser. No. 09/719,350, filed on Dec. 12, 2000 now abandoned, which was a national stage filing under 35 U.S.C. §371 of International Application No. PCT/JP00/02321 filed on Apr. 10, 2000, which International Application was not published by the International Bureau in English.

TECHNICAL FIELD

The present invention relates to soft syndiotactic polypropylene compositions, and more particularly to soft syndiotactic polypropylene compositions having a good balance among transparency, flexibility and heat resistance and molded products comprising the compositions.

BACKGROUND ART

Films comprising isotactic polypropylene obtained by copolymerizing propylene, ethylene and optionally an α-olefin of 4 to 20 carbon atoms are widely employed for various packaging materials because they are inexpensive and have excellent flexibility, moisture resistance and heat resistance. However, if the film thickness is increased in order to prevent damage of the contents, transparency, flexibility and heat sealing properties of the film become poor. If the comonomer content in the isotactic polypropylene is increased in order to improve these properties, the tacky component increases to cause lowering of blocking resistance. Therefore, it is difficult to produce packaging materials of excellent transparency, flexibility and heat sealing properties from films of large thickness.

It is known that the syndiotactic polypropylene is obtained by low-temperature polymerization in the presence of a catalyst comprising a vanadium compound, ether and organoaluminum. The polymer obtained by this process, however, has low syndiotacticity and does not possess such elastic properties as the syndiotactic polypropylene inherently has.

Recently, it has been discovered by J. A. Ewen, et al. that high-tacticity polypropylene having a syndiotactic triad fraction of more than 0.7 is obtained in the presence of a catalyst comprising a transition metal catalyst having an asymmetric ligand and aluminoxane (see J. A. Chem. Soc., 1988, 110, 6255–6256). The polymer obtained by the process of J. A. Ewen, et al. has a high syndiotacticity and shows more elastic properties than the isotactic polypropylene. However, if the polymer is used as a soft molding material in, for example, a field where non-rigid vinyl chloride or a vulcanized rubber is used, the polymer is not satisfactory in its flexibility, elastomeric properties and mechanical strength.

Thus far, attempts to improve flexibility and impact resistance of propylene-based polymers have been made by adding thereto ethylene/propylene copolymer rubbers in which the stereoregularity of propylene units is isotactic, but molded products comprising a resin composition obtained by this process do not have sufficient flexibility and impact resistance though these properties have been improved to a certain extent.

Further, the syndiotactic polypropylene has a low crystallizing rate and thereby has a problem of winding round a take-up roll in the T-die film molding, and therefore improvement of the crystallizing rate has been desired.

Under such circumstances as described above, the present inventors have made earnest studies, and as a result, they have found that a soft syndiotactic polypropylene composition (1) comprising a specific syndiotactic propylene polymer, an α-olefin polymer, and a crystal nucleating agent and/or an ethylene-based polymer has a good balance among transparency, flexibility, heat resistance and scratch resistance.

The present inventors have further found that a soft syndiotactic polypropylene composition (2) comprising a specific syndiotactic propylene polymer, an α-olefin polymer, an isotactic propylene polymer, and a crystal nucleating agent and/or an ethylene-based polymer has a good balance among transparency, flexibility, heat resistance and scratch resistance, particularly a soft syndiotactic polypropylene composition (2) comprising a specific syndiotactic propylene polymer, an α-olefin polymer, an isotactic propylene polymer and an ethylene-based polymer has a good balance among transparency, flexibility, heat resistance and scratch resistance and shows excellent moldability.

The present inventors have furthermore found that a soft syndiotactic polypropylene composition (3) comprising a specific syndiotactic propylene polymer, an α-olefin polymer, an ethylene-based polymer, an isotactic propylene polymer and a copolymer of polar group-containing vinyl and ethylene has a good balance among transparency, flexibility, heat resistance and impact resistance and shows excellent moldability, and that films obtained from the composition have excellent tearability.

Moreover, the present inventors have found that a laminate having a layer of a thermoplastic resin and a layer of any one of the syndiotactic polypropylene compositions (1) to (3) have various useful properties. Based on the finding, the present invention has been accomplished.

DISCLOSURE OF THE INVENTION

The soft syndiotactic polypropylene composition (1) of the invention is a composition comprising:

(A) a syndiotactic propylene polymer which comprises recurring units ($U_{pr}$) derived from propylene having a substantially syndiotactic structure, and optionally, recurring units ($U_{et}$) derived from ethylene and/or recurring units ($U_{ol}$) derived-from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 10 dl/g, (B) an α-olefin polymer which comprises at least one kind of recurring units derived from an α-olefin selected from α-olefins of 2 to 20 carbon atoms, contains one kind of recurring units out of said one or more kinds of recurring units in amounts of 50 to 100% by mol, and has a Young's modulus of not more than 150 MPa, and optionally, (C) a crystal nucleating agent and/or (D) an ethylene-based polymer having a density of 0.91 to 0.97 g/cm$^3$, wherein the weight ratio (A/B) of the syndiotactic propylene polymer (A) to the α-olefin polymer (B) is in the range of 90/10 to 10/90.

The soft syndiotactic polypropylene composition (1) is, in an embodiment, a composition comprising the syndiotactic propylene polymer (A), the α-olefin polymer (B) and the crystal nucleating agent (C), wherein:

the weight ratio (A/B) of the polymer (A) to the polymer (B) is in the range of 90/10 to 10/90, and the crystal nucleating agent (C) is contained in an amount of 0.01 to 1 part by weight based on 100 parts by weight of the total of the polymer (A) and the polymer (B).

In this soft syndiotactic polypropylene composition, the syndiotactic propylene polymer (A) preferably has a syndiotacticity, that is based on triad sequences of the propylene units, of not less than 0.6, the α-olefin polymer (B) preferably has an intrinsic viscosity (η), as measured in decalin at 135° C., of 0.01 to 10 dl/g, a molecular weight distribution (Mw/Mn), as determined by gel permeation chromatography (GPC), of not more than 4 and a glass transition temperature (Tg) of not higher than −5° C., and the crystal nucleating agent (C) is preferably a sorbitol type crystal nucleating agent.

The soft syndiotactic polypropylene composition has a good balance among transparency, flexibility, heat resistance and scratch resistance.

The soft syndiotactic polypropylene composition is, in another embodiment, a composition comprising the syndiotactic propylene polymer (A) and two or more kinds of the α-olefin polymers (B), wherein:

the weight ratio (A/(total of B)) of the polymer (A) to the total of the two or more kinds of the polymers (B) is in the range of 90/10 to 10/90, and each content of the two or more kinds of the polymers (B) is at least 1% by weight.

This soft syndiotactic polypropylene composition is preferably a composition further comprising the crystal nucleating agent (C), wherein:

the weight ratio (A/(total of B)) of the polymer (A) to the total of the two or more kinds of the polymers (B) is in the range of 90/10 to 10/90, each content of the two or more kinds of the polymers (B) is at least 1% by weight, and the crystal nucleating agent (C) is contained in an amount of 0.01 to 1 part by weight based on 100 parts by weight of the total of the polymer (A) and the two or more kinds of the polymers (B).

In this soft syndiotactic polypropylene composition, the syndiotactic propylene polymer (A) preferably has a syndiotacticity, that is based on triad sequences of the propylene units, of not less than 0.6, and the α-olefin polymer (B) preferably has an intrinsic viscosity (η), as measured in decalin at 135° C., of 0.01 to 10 dl/g, Mw/Mn, as determined by GPC, of not more than 4 and Tg of not higher than −5° C.

The soft syndiotactic polypropylene composition has a good balance among transparency, flexibility, heat resistance and scratch resistance.

The α-olefin polymer (B) for forming the soft syndiotactic polypropylene composition (1) preferably is:

a copolymer comprising recurring units derived from ethylene in amounts of 50 to 99% by mol and recurring units derived from at least one α-olefin selected from α-olefins of 3 to 20 carbon atoms in amounts of 1 to 50% by mol, or a copolymer comprising recurring units derived from propylene in amounts of 50 to 99% by mol and recurring units derived from at least one α-olefin selected from ethylene and α-olefins of 4 to 20 carbon atoms in amounts of 1 to 50% by mol.

The α-olefin polymer (B) for forming the soft syndiotactic polypropylene composition (1) preferably is one obtained in the presence of a metallocene catalyst (1) comprising:

(a1) a transition metal compound represented by the following formula (I) or (II):

(I)

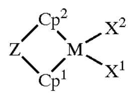

(II)

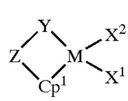

wherein M is Ti, Zr, Hf, Rn, Nd, Sm or Ru; $Cp^1$ and $Cp^2$ are each a cyclopentadienyl group, an indenyl group, a fluorenyl group or a derivative group thereof, each of which is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is an atom of C, O, B, S, Ge, Si or Sn, or a group containing any of these atoms, and (b) at least one compound selected from:

(b-1) a compound which reacts with a transition metal M in the transition metal compound (al) to form an ionic complex, (b-2) an organoaluminum oxy-compound, and (b-3) an organoaluminum compound.

The soft syndiotactic polypropylene composition (2) of the invention is a composition comprising:

(A) a syndiotactic propylene polymer which comprises recurring units ($U_{pr}$) derived from propylene having a substantially syndiotactic structure, and optionally, recurring units ($U_{et}$) derived from ethylene and/or recurring units ($U_{ol}$) derived-from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 10 dl/g, (B) an α-olefin polymer which comprises at least one kind of recurring units derived from an α-olefin selected from α-olefins of 2 to 20 carbon atoms, contains one kind of recurring units out of said one or more kinds of recurring units in amounts of 50 to 100% by mol, and has a Young's modulus of not more than 150 MPa, (E) an isotactic propylene polymer which comprises recurring units ($U_{pr}$) derived from propylene having a substantially isotactic structure, and optionally, recurring units ($U_{et}$) derived from ethylene and/or recurring units ($U_{ol}$) derived from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 6 dl/g, and optionally, (C) a crystal nucleating agent and/or (D) an ethylene-based polymer having a density of 0.91 to 0.97 g/cm$^3$, wherein:

the weight ratio (A/E) of the polymer (A) to the polymer (E) is in the range of 99/1 to 1/99, and the weight ratio ((A+E)/B) of the total of the polymer (A) and the polymer (E) to the polymer (B) is in the range of 90/10 to 10/90.

The soft syndiotactic polypropylene composition (2) is, in an embodiment, a composition comprising the syndiotactic propylene polymer (A), the α-olefin polymer (B) and the isotactic propylene polymer (E), wherein:

the weight ratio (A/E) of the polymer (A) to the polymer (E) is in the range of 99/1 to 1/99, and the weight ratio ((A+E)/B) of the total of the polymer (A) and the polymer (E) to the polymer (B) is in the range of 90/10 to 10/90.

The soft syndiotactic polypropylene composition preferably is a composition further comprising the crystal nucleating agent (C), wherein the crystal nucleating agent (C) is contained in an amount of 0.01 to 1 part by weight based on 100 parts by weight of the total of the polymers (A), (B) and (E).

In this soft syndiotactic polypropylene composition, the crystal nucleating agent (C) preferably is a sorbitol type crystal nucleating agent, the syndiotactic propylene polymer (A) preferably has a syndiotacticity, that is based on triad sequences of the propylene units, of not less than 0.6, and the α-olefin polymer (B) preferably has an intrinsic viscosity (η), as measured in decalin at 135° C., of 0.01 to 10 dl/g, Mw/Mn, as determined by GPC, of not more than 4 and Tg of not higher than −5° C.

The soft syndiotactic polypropylene composition has a good balance among transparency, flexibility, heat resistance and scratch resistance.

The soft syndiotactic polypropylene composition (2) is, in another embodiment, a composition comprising the syndiotactic propylene polymer (A), two or more kinds of the α-olefin copolymers (B) and the isotactic propylene polymer (E), wherein:

the weight ratio (A/E) of the polymer (A) to the polymer (E) is in the range of 99/1 to 1/99, the weight ratio ((A+E)/(total of B)) of the total of the polymer (A) and the polymer (E) to the total of the two or more kinds of the copolymers (B) is in the range of 90/10 to 10/90, and each content of the two or more kinds of the copolymers (B) is at least 1% by weight.

This soft syndiotactic polypropylene composition preferably is a composition further comprising the crystal nucleating agent (C), wherein the agent (C) is contained in an amount of 0.01 to 1 part by weight based on 100 parts by weight of the total of the polymer (A), the two or more kinds of the copolymers (B) and the polymer (E).

In this soft syndiotactic polypropylene composition, the α-olefin polymer (B) preferably has an intrinsic viscosity (η), as measured in decalin at 135° C., of 0.01 to 10 dl/g, Mw/Mn, as determined by GPC, of not more than 4 and Tg of not higher than −5° C.

The soft syndiotactic polypropylene composition has a good balance among transparency, flexibility, heat resistance and scratch resistance.

The soft syndiotactic polypropylene composition (2) is, in a further embodiment, a composition comprising the syndiotactic propylene polymer (A), the α-olefin polymer (B), the isotactic propylene polymer (E) and the ethylene-based polymer (D), wherein:

the weight ratio (A/E) of the polymer (A) to the polymer (E) is in the range of 99/1 to 1/99, the weight ratio ((A+E)/B) of the total of the polymer (A) and the polymer (E) to the polymer (B) is in the range of 90/10 to 10/90, and the polymer (D) is contained in an amount of 0.01 to 5 parts by weight based on 100 parts by weight of the total of the polymers (A), (B) and (E).

In this soft syndiotactic polypropylene composition, the α-olefin polymer (B) preferably has an intrinsic viscosity (η), as measured in decalin at 135° C., of 0.01 to 10 dl/g, Mw/Mn, as determined by GPC, of not more than 4 and Tg of not higher than −5° C.

The soft syndiotactic polypropylene composition has a good balance among transparency, flexibility, heat resistance and scratch resistance.

The soft syndiotactic polypropylene composition (2) is, in a still further embodiment, a composition comprising the syndiotactic propylene polymer (A), the α-olefin polymer (B), the isotactic propylene polymer (E) and the ethylene-based polymer (D), wherein:

the α-olefin polymer (B) consists of:

(B1) a syndiotactic-structure propylene/ethylene copolymer containing propylene units having a substantially syndiotactic structure in amounts of not less than 60% by mol and less than 90% by mol, (B2) an amorphous α-olefin copolymer which contains recurring units derived from an α-olefin of 3 to 20 carbon atoms in amounts of not less than 50% by mol (with the proviso that the amount of all recurring units in the copolymer is 100% by mol), whose melting peak is not substantially observed when measured by a differential scanning calorimeter (DSC), and which has an intrinsic viscosity (η), as measured in decalin at 135° C., of 0.01 to 10 dl/g, a molecular weight distribution, as determined by GPC, of not more than 4 and Tg of not higher than 40° C., and (B3) an ethylene/α-olefin copolymer which is a copolymer of ethylene and an α-olefin of 3 to 20 carbon atoms, contains recurring units derived from ethylene in amounts of not less than 60% by mol, and has Mw/Mn, as determined by GPC, of not more than 4 and a density of 0.855 to 0.895 g/cm$^3$, the polymer (A) is contained in an amount of 20 to 60 parts by weight, the copolymer (B1) is contained in an amount of 1 to 30 parts by weight, the copolymer (B2) is contained in an amount of 1 to 30 parts by weight, the copolymer (B3) is contained in an amount of 5 to 30 parts by weight, the polymer (E) is contained in an amount of 1 to 40 parts by weight, the total of the components (A), (B1), (B2), (B3) and (E) being 100 parts by weight, and the polymer (D) is contained in an amount of 0.01 to 5 parts by weight based on 100 parts by weight of the total of the components (A), (B1), (B2), (B3) and (E).

In this soft syndiotactic polypropylene composition, the syndiotactic propylene polymer (A) preferably has a syndiotacticity, that is based on triad sequences of the propylene units, of not less than 0.6, and the syndiotactic-structure propylene/ethylene copolymer (B1) preferably has an intrinsic viscosity (η), as measured in decalin at 135° C., of 0.5 to 10 dl/g, Mw/Mn, as determined by GPC, of not more than 4 and Tg of not higher than −5° C.

The amorphous α-olefin polymer (B2) preferably is a copolymer comprising recurring units derived from propylene in amounts of 50 to 99% by mol and recurring units derived from at least one olefin selected from ethylene and α-olefins of 4 to 20 carbon atoms in amounts of 1 to 50% by mol.

The soft syndiotactic polypropylene composition has a good balance among transparency, flexibility, heat resistance and scratch resistance.

The α-olefin polymer (B) for forming the soft syndiotactic polypropylene composition (2) preferably is:

a copolymer comprising recurring units derived from ethylene in amounts of 50 to 99% by mol and recurring units derived from at least one α-olefin selected from α-olefins of 3 to 20 carbon atoms in amounts of 1 to 50% by mol, or a copolymer comprising recurring units derived from propylene in amounts of 50 to 99% by mol and recurring units derived from at least one α-olefin selected from ethylene and α-olefins of 4 to 20 carbon atoms in amounts of 1 to 50% by mol.

The isotactic propylene polymer (E) for forming the soft syndiotactic polypropylene composition (2) preferably has a microisotacticity, that is based on triad sequences of the propylene units, of not less than 0.8.

The α-olefin polymer (B) for forming the soft syndiotactic polypropylene composition (2) preferably is one obtained in the presence of the aforesaid metallocene catalyst (1).

The soft syndiotactic polypropylene composition (3) of the invention is a composition comprising:

(A) a syndiotactic propylene polymer which comprises recurring units ($U_{pr}$) derived from propylene having a substantially syndiotactic structure, and optionally, recurring units ($U_{et}$) derived from ethylene and/or recurring units ($U_{ol}$) derived from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 10 dl/g, (B) an α-olefin polymer which comprises at least one kind of recurring units derived from an α-olefin selected from α-olefins of 2 to 20 carbon atoms, contains one kind of recurring units out of said one or more kinds of recurring units in amounts of 50 to 100% by mol, and has a Young's modulus of not more than 150 MPa, (D) an ethylene-based polymer having a density of 0.91 g/cm$^3$ to 0.97 g/cm$^3$, (E) an isotactic propylene polymer which comprises recurring units ($U_{pr}$) derived from propylene having a substantially isotactic structure, and optionally, recurring units ($U_{et}$) derived from ethylene and/or recurring units ($U_{ol}$) derived from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 6 dl/g, and (F) a copolymer of polar group-containing vinyl and ethylene, wherein:

the weight ratio (A/E) of the polymer (A) to the polymer (E) is in the range of 99/1 to 1/99, the weight ratio ((A+E)/B) of the total of the polymer (A) and the polymer (E) to the polymer (B) is in the range of 90/10 to 10/90, and the polymer (D) is contained in an amount of 0.01 to 5 parts by weight and the copolymer (F) is contained in an amount of 10 to 40 parts by weight, each amount being based on 100 parts by weight of the total of the components (A), (E) and (B).

In this soft syndiotactic polypropylene composition, the syndiotactic propylene polymer (A) preferably has a syndiotacticity, that is based on triad sequences of the propylene units, of not less than 0.6, and the α-olefin polymer (B) preferably has an intrinsic viscosity (η), as measured in decalin at 135° C., of 0.01 to 10 dl/g, Mw/Mn, as determined by GPC, of not more than 4 and Tg of not higher than −5° C.

The α-olefin polymer (B) for forming the soft syndiotactic polypropylene composition (3) preferably is:

a copolymer comprising recurring units derived from ethylene in amounts of 50 to 99% by mol and recurring units derived from at least one α-olefin selected from α-olefins of 3 to 20 carbon atoms in amounts of 1 to 50% by mol, or a copolymer comprising recurring units derived from propylene in amounts of 50 to 99% by mol and recurring units derived from at least one α-olefin selected from ethylene and α-olefins of 4 to 20 carbon atoms in amounts of 1 to 50% by mol.

The isotactic propylene polymer (E) for forming the soft syndiotactic polypropylene composition (3) preferably has a microisotacticity, that is based on triad sequences of the propylene units, of not less than 0.8.

The α-olefin polymer (B) for forming the soft syndiotactic polypropylene composition (3) preferably is one obtained in the presence of the aforesaid metallocene catalyst (1).

The polar group-containing vinyl used for preparing the copolymer (F) of polar group-containing vinyl and ethylene for forming the soft syndiotactic polypropylene composition (3) is preferably selected from acrylic acid, methacrylic acid, vinyl acetate and derivatives thereof.

The soft syndiotactic polypropylene composition (3) has a good balance among transparency, flexibility, heat resistance and scratch resistance and shows excellent moldability, and films obtained from the composition has excellent transparency, impact resistance and tearability.

The laminate of the invention comprises:

a layer which comprises a thermoplastic resin, and a layer which comprises the soft syndiotactic polypropylene composition of any one of the soft syndiotactic polypropylene compositions (1) to (3).

The thermoplastic resin is, for example, a polyolefin resin such as an ethylene-based polymer resin or an isotactic propylene polymer resin, an ethylene/vinyl acetate copolymer resin, or an ethylene/vinyl acetate copolymer saponification product.

The laminate is hardly decomposed thermally and is excellent in various properties such as extensibility, water resistance and gas permeation resistance.

The molded product of the invention comprises any one of the soft syndiotactic polypropylene compositions (1) to (3).

The molded product has a good balance among transparency, flexibility, heat resistance and scratch resistance.

BEST MODE FOR CARRYING OUT THE INVENTION

The soft syndiotactic polypropylene compositions of the invention and the molded products comprising the compositions are described in detail hereinafter.

Soft Syndiotactic Polypropylene Composition (1)

The soft syndiotactic polypropylene composition (1) of the invention comprises a specific syndiotactic propylene polymer (A), a specific α-olefin polymer (B), and optionally, a crystal nucleating agent (C) and/or an ethylene-based polymer (D).

First, the components contained in the soft syndiotactic polypropylene composition (1) are described.

(A) Syndiotactic Propylene Polymer

The syndiotactic propylene polymer (A) is a homopolymer of propylene or a propylene random copolymer obtained from propylene and at least one olefin selected from ethylene and α-olefins of 4 to 20 carbon atoms.

The syndiotactic propylene polymer (A) is a (co)polymer comprising recurring units ($U_{pr}$) derived from propylene, and optionally, recurring units ($U_{et}$) derived from ethylene and/or recurring units ($U_{ol}$) derived from an α-olefin of 4 to 20 carbon atoms, and contains the recurring units ($U_{pr}$) in amounts of 90 to 100% by mol, preferably 92 to 100% by mol, more preferably 92 to 98% by mol, the recurring units ($U_{et}$) in amounts of 0 to 10% by mol, preferably 0 to 8% by mol, more preferably 0.2 to 8% by mol, and the recurring units ($U_{ol}$) in amounts of 0 to 9.5% by mol, preferably 0 to 8.5% by mol, more preferably 0 to 7% by mol.

Examples of the α-olefins of 4 to 20 carbon atoms include 1-butene, 1-pentene, 1-hexene, 1-octene, 4-methyl-1-pentene, 3-methyl-1-pentene, 1-decene, 1-dodecene, 1-tetradecene, 1-hexadecene, 1-octadecene and 1-eicosene. Of these, 1-butene is preferable.

The syndiotactic propylene polymer (A) desirably has an intrinsic viscosity (η), as measured in decalin at 135° C., of 0.5 to 10 dl/g, preferably 1.0 to 6 dl/g, more preferably 1.0 to 4 dl/g. When the intrinsic viscosity (η) is in the above range, the syndiotactic propylene polymer (A) exhibits good flowability and is readily blended with other components, and from the resulting composition, molded products having excellent mechanical strength tend to be obtained.

The propylene units to constitute the syndiotactic propylene polymer (A) for use in the invention have a substantially syndiotactic structure, and the syndiotacticity of the polymer (A), that is based on triad sequences of the propylene units, is not less than 0.6, preferably not less than 0.7. When the syndiotacticity is in the above range, the composition has a high crystallizing rate and excellent processability. By the expression "have a substantially syndiotactic structure" used in this specification is meant that the syndiotacticity that is based on triad sequences of the propylene units is not less than 0.6.

The triad syndiotacticity (sometimes referred to as "rr fraction" hereinafter) of the syndiotactic propylene polymer (A) is determined by a $^{13}$C-NMR spectrum of the polymer (A) and the following formula (1), and is obtained as an intensity(area) ratio of a side chain methyl group of the second unit in the head-to-tail linked triad sequence portion.

rr fraction=PPP(rr)/(PPP(mm)+PPP(mr)+PPP(rr)) (1)

wherein PPP(mm), PPP(mr) and PPP(rr) are areas of side chain methyl groups of the second units in the head-to-tail linked triad sequence portion observed in the following shift regions of the $^{13}$C-NMR spectrum, respectively.

| First Region 21.0–21.9 ppm | Second Region 20.3–21.0 ppm | Third Region 19.5–20.3 ppm |
|---|---|---|
| PPP (mm) | PPP (mr) | PPP (rr) |

The PPP(mm), PPP(mr) and PPP(rr) indicate the following head-to-tail linked three-propylene unit sequences, respectively.

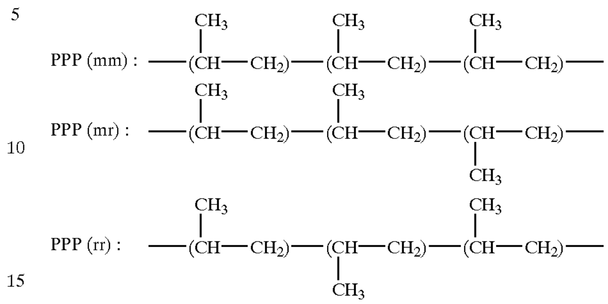

In the methyl carbon region (19–23 ppm), additionally to the side chain methyl groups of the propylene units in the above-mentioned head-to-tail linked triad sequences, peaks of the following side chain methyl groups of the propylene units in other sequences are observed. To determine the rr fraction, peak areas of the methyl groups not based on the triad sequences are corrected in the following manner. In the following description, P indicates a recurring unit derived from propylene, and E indicates a recurring unit derived from ethylene.

(1) In the second region, there is observed a peak derived from a side chain methyl group of the second unit (propylene unit) in the PPE 3-unit sequence wherein propylene units are head-to-tail linked. The area of the methyl group peak can be determined from the peak area of the methine group (which resonates at about 30.6 ppm) of the second unit (propylene unit) in the PPE sequence.

(2) In the third region, there is observed a peak derived from a side chain methyl group of the second unit (propylene unit) in the EPE 3-unit sequence. The area of the methyl group peak can be determined from the peak area of the methine group (which resonates at about 32.9 ppm) of the second unit (propylene unit) in the EPE sequence.

(3) In the second and the third regions, there are observed peaks derived from methyl groups C–E' of such regio-irregular units as represented by the following partial structures (i), (ii) and (iii), said regio-irregular units being contained in the ethylene/ethylene random copolymer in small amounts.

In the second region, a methyl group C peak, a methyl group D peak and a methyl group D' peak are observed, and in the third region, a methyl group E peak and a methyl group E' peak are observed.

Of the methyl groups in the regio-irregular units (i) to (iii), a peak of the methyl group A and a peak of the methyl group B are observed at 17.3 ppm and 17.0 ppm, respectively, but they are not observed in the first to the third regions.

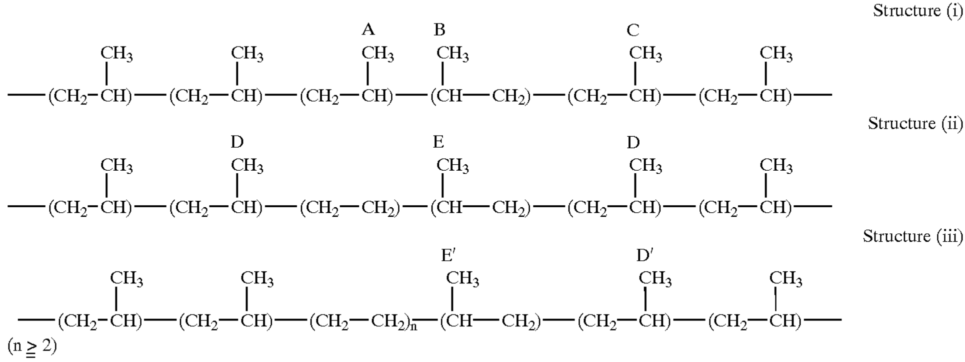

The peak area of the methyl group C can be determined from the peak area of the adjacent methine group (which resonates at about 31.3 ppm).

The peak area of the methyl group D can be determined from ½ of the total of the areas of the peaks based on αβ methylene carbons of the structure (ii) (which resonate at about 34.3 ppm and about 34.5 ppm).

The peak area of the methyl group D' can be determined from the area of the peak based on a methine group adjacent to the methyl group E' of the structure (iii) (which resonates at about 33.3 ppm).

The peak area of the methyl group E can be determined from the peak area of the adjacent methine group (which resonates at about 33.7 ppm).

The peak area of the methyl group E' can be determined from the peak area of the adjacent methine group (which resonates at about 33.3 ppm).

Accordingly, by subtracting these peak areas from the total of all peak areas of the second and the third regions, the peak area of the side chain methyl group of the second propylene unit in the head-to-tail linked propylene 3-unit sequence can be determined.

Each carbon peak in the spectrum can be assigned referring to the literature (Polymer, 30, 1350 (1989)).

Process for Preparing Syndiotactic Propylene Polymer (A)

In the preparation of the syndiotactic propylene polymer (A), a metallocene catalyst (1) that is used for preparing the later-described α-olefin polymer (B) is preferably used as a catalyst.

In the preparation of the syndiotactic propylene polymer (A), catalyst systems described in Japanese Patent Laid-Open Publications No. 41303/1990, No. 41305/1990. No. 274703/1990, No. 274704/1990, No. 179005/1991, No. 179006/1991, No. 69394/1992, No. 17589/1993 and No. 120127/1996 can be used instead of the above-mentioned catalyst system.

More specifically, a catalyst system descried in the literature "J. Am. Chem. Soc.", 1988, 110, 6255–6256, by J. A. Ewen, et al., that is mentioned in the above section "BACKGROUND ART", is also employable. Further, even a catalyst system having a structure different from that of the compound described in the above literature is also employable, provided that use of the catalyst system makes it possible to prepare a polymer of relatively high tacticity having a syndiotactic triad fraction (A. Zambelli, et. al, "Macromolecules", vol. 6, 687 (1973), vol. 8, 925 (1975)) of the aforesaid value, for example, about 0.5 or higher. For example, a catalyst system comprising a crosslinked transition metal compound having an asymmetric ligand and a co-catalyst such as organoaluminum is available.

Examples of the crosslinked transition metal compounds having an asymmetric ligand to constitute such a catalyst system include compounds described in the above literature, such as diphenylmethylene(cyclopentadienyl)(fluorenyl) hafnium dichloride, diphenylmethylene(cyclopentadienyl)(fluorenyl)zirconium dichloride, isopropyl(cyclopentadienyl-1-fluorenyl)hafnium dichloride, isopropyl(cyclopentadienyl-1-fluorenyl)zirconium dichloride, and (t-butylamido)dimethyl(fluorenyl) silanetitanium dimethyl.

Examples of the co-catalysts include the same ionizing ionic compound, organoaluminum oxy-compound (also referred to as "aluminoxane" or "alumoxane") and organoaluminum compound as those to constitute the metallocene catalyst (1) that is used in the preparation of the later-described α-olefin polymer (B).

To prepare the syndiotactic propylene polymer (A) for use in the invention in the presence of the above catalyst, propylene and if necessary at least one olefin selected from ethylene and α-olefins of 4 to 20 carbon atoms are so polymerized that the resulting polymer finally has the aforesaid properties. The polymerization can be carried out as any of liquid phase polymerization such as suspension polymerization or solution polymerization and gas phase polymerization.

In the liquid phase polymerization, an inert hydrocarbon solvent can be used as a polymerization medium. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof. Propylene may be used as a solvent.

When the suspension polymerization is adopted, the polymerization is desirably conducted at a temperature of usually −50 to 100° C., preferably 0 to 90° C. When the solution polymerization is adopted, the polymerization is desirably conducted at a temperature of usually 0 to 250° C., preferably 20 to 200° C. When the gas phase polymerization is adopted, the polymerization is desirably conducted at a temperature of usually 0 to 120° C., preferably 20 to 100° C. The polymerization is carried out at a pressure of usually atmospheric pressure to 100 $kg/cm^2$, preferably atmospheric pressure to 50 $kg/cm^2$.

The polymerization can be carried out by any of batchwise, semi-continuous and continuous processes. It is possible to conduct the polymerization in two or more stages under different reaction conditions.

The molecular weight of the resulting syndiotactic propylene polymer (A) can be regulated by allowing hydrogen to be present in the polymerization system or changing the reaction conditions such as polymerization temperature and polymerization pressure.

The syndiotactic propylene polymer (A) can be used singly or in combination of two or more kinds.

(B) α-Olefin Polymer

The α-olefin polymer (B) is a homopolymer of one α-olefin selected from α-olefins of 2 to 20 carbon atoms or a random copolymer of two or more α-olefins selected from α-olefins of 2 to 20 carbon atoms. The α-olefin polymer (B) comprises at least one kind of recurring units derived from an α-olefin selected from α-olefins of 2 to 20 carbon atoms, and contains one kind of the recurring units out of said one or more kinds of recurring units in amounts of 50 to 100% by mol, preferably 60 to 90% by mol, more preferably 65 to 85% by mol.

The α-olefin polymer (B) containing the α-olefin units in the above amounts has good compatibility with the syndiotactic propylene polymer (A), and the resulting soft syndiotactic polypropylene composition tends to exhibit sufficient flexibility, heat-sealing properties and impact resistance.

The α-olefin polymer (B) is amorphous and has a Young's modulus of not more than 150 MPa, preferably not more than 100 MPa, more preferably not more than 50 MPa. For reference, the Young's modulus of the syndiotactic propylene polymer (A) is usually not less than 300 MPa.

Examples of the α-olefin copolymers (B) include ethylene bipolymers, such as ethylene/propylene copolymer (the former mentioned α-olefin is the main component, as well as hereinafter), ethylene/butene copolymer, ethylene/pentene copolymer, ethylene/4-methyl-1-pentene copolymer, ethylene/hexene copolymer, ethylene/heptene copolymer, ethylene/octene copolymer, ethylene/nonene copolymer, ethylene/decene copolymer, ethylene/norbornene copolymer, ethylene/tetracyclododecene copolymer, ethylene/butadiene copolymer, ethylene/isoprene copolymer, ethylene/1,5-hexadiene copolymer, ethylene/acrylic acid copolymer, ethylene/methacrylic acid copolymer, ethylene/ester acrylate copolymer and ethylene/ester methacrylate copolymer, propylene bipolymers, such as isotactic propylene/ethylene copolymer, atactic propylene/ethylene copolymer, syndiotactic propylene/ethylene copolymer, isotactic propylene/butene copolymer, atactic propylene/butene copolymer, syndiotactic propylene/butene copolymer, isotactic propylene/pentene copolymer, atactic propylene/pentene copolymer, syndiotactic propylene/pentene copolymer, isotactic propylene/hexene copolymer, atactic propylene/hexene copolymer, syndiotactic propylene/hexene copolymer, isotactic propylene/heptene copolymer, atactic propylene/heptene copolymer, syndiotactic propylene/heptene copolymer, isotactic propylene/octene copolymer, atactic propylene/octene copolymer, syndiotactic propylene/octene copolymer, isotactic propylene/decene copolymer, atactic propylene/decene copolymer, syndiotactic propylene/decene copolymer, isotactic propylene/styrene copolymer, atactic propylene/styrene copolymer, syndiotactic propylene/styrene copolymer, isotactic propylene/norbornene copolymer, atactic propylene/norbornene copolymer, syndiotactic propylene/norbornene copolymer, isotactic propylene/tetracyclododecene copolymer, atactic propylene/tetracyclododecene copolymer, syndiotactic propylene/tetracyclododecene copolymer, isotactic propylene/butadiene copolymer, atactic propylene/butadiene copolymer, syndiotactic propylene/butadiene copolymer, isotactic propylene/isoprene copolymer, atactic propylene/isoprene copolymer, syndiotactic propylene/isoprene copolymer, isotactic propylene/1,5-hexadiene copolymer, atactic propylene/1,5-hexadiene copolymer and syndiotactic propylene/1,5-hexadiene copolymer, ethylene terpolymers, such as ethylene/propylene/norbornene copolymer, ethylene/butene/norbornene copolymer, ethylene/octene/norbornene copolymer, ethylene/propylene/tetracyclododecene copolymer, ethylene/butene/tetracyclododecene copolymer, ethylene/octene/tetracyclododecene copolymer, ethylene/propylene/butadiene copolymer, ethylene/butene/butadiene copolymer, ethylene/octene/butadiene copolymer, ethylene/propylene/isoprene copolymer, ethylene/butene/isoprene copolymer, ethylene/octene/isoprene copolymer, ethylene/propylene/ethylidenenorbornene copolymer, ethylene/butene/ethylidenenorbornene copolymer and ethylene/octene/ethylidenenorbornene copolymer, and propylene terpolymers, such as isotactic propylene/butene/ethylene copolymer, atactic propylene/butene/ethylene copolymer, syndiotactic propylene/butene/ethylene copolymer, isotactic propylene/octene/ethylene copolymer, atactic propylene/octene/ethylene copolymer, syndiotactic propylene/octene/ethylene copolymer, isotactic propylene/octene/ethylene copolymer, atactic propylene/octene/ethylene copolymer, syndiotactic propylene/octene/ethylene copolymer, isotactic propylene/norbornene/ethylene copolymer, atactic propylene/norbornene/ethylene copolymer, syndiotactic propylene/norbornene/ethylene copolymer, isotactic propylene/tetracyclododecene/ethylene copolymer, atactic propylene/tetracyclododecene/ethylene copolymer, syndiotactic propylene/tetracyclododecene/ethylene copolymer, isotactic propylene/butadiene/ethylene copolymer, atactic propylene/butadiene/ethylene copolymer, syndiotactic propylene/butadiene/ethylene copolymer, isotactic propylene/isoprene/ethylene copolymer, atactic propylene/isoprene/ethylene copolymer and syndiotactic propylene/isoprene/ethylene copolymer.

The α-olefin polymer (B) desirably has an intrinsic viscosity (η), as measured in decalin at 135° C., of usually 0.01 to 10 dl/g, preferably 0.5 to 10 dl/g, more preferably 1 to 8 dl/g. When the intrinsic viscosity (η) of the α-olefin polymer (B) is in the above range, the resulting soft syndiotactic polypropylene composition is excellent in properties such as weathering resistance, ozone resistance, heat aging resistance, low-temperature properties and dynamic fatigue resistance.

The α-olefin polymer (B) desirably has a single glass transition temperature, and the glass transition temperature (Tg) as measured by a differential scanning calorimeter (DSC) is desired to be usually not higher than −5° C., preferably −80 to −5° C., more preferably −80 to −10° C., still more preferably −80 to −20° C. When the glass transition temperature (Tg) of the α-olefin polymer (B) is in the above range, the cold temperature resistance and the low-temperature properties become excellent.

The molecular weight distribution (Mw/Mn, in terms of polystyrene, Mw: weight-average molecular weight, Mn: number-average molecular weight) of the polymer (B), as measured by gel permeation chromatography (GPC), is preferably not more than 4.0, more preferably not more than 3.5.

The α-olefin copolymer (B) can be used singly or in combination of two or more kinds. When two kinds of the α-olefin copolymers (B) are used, their compatibility with the syndiotactic propylene polymer (A) becomes good, and the resulting syndiotactic polypropylene composition tends to exhibit sufficient flexibility, heat-sealing properties and impact resistance.

If two or more kinds of the α-olefin copolymers (B) are used and if their main components are the same, the copolymers are desired to be different in their regularity. Examples of combinations of the copolymers include a combination of an isotactic propylene/ethylene copolymer and an atactic propylene/ethylene copolymer, a combination of an isotactic propylene/ethylene copolymer and a syndiotactic propylene/ethylene copolymer, a combination of an atactic propylene/ethylene copolymer and a syndiotactic propylene/ethylene copolymer, a combination of an isotactic propylene/butene copolymer and an atactic propylene/butene copolymer, a combination of an isotactic propylene/butene copolymer and a syndiotactic propylene/butene copolymer, and a combination of an atactic propylene/butene copolymer and a syndiotactic propylene/butene copolymer.

Process for Preparing (B)

The α-olefin copolymer (B) is obtained, for example, by (co)polymerizing at least one kind α-olefin selected from α-olefins of 2 to 20 carbon atoms in the presence of the below mentioned metallocene catalyst (1).

As the metallocene catalyst, employable is at least one catalyst system comprising (a1) the transition metal compound represented by the following general formula (I) or (II) and (b) at least one compound selected from (b-1) a compound which reacts with the transition metal M in the transition metal compound (al) to form an ion complex (referred to as "ionizing ionic compound" hereinafter), (b-2) an organoaluminum oxy compound (b-3) an organoaluminum compound.

First, the transition metal compound represented by the general formula (I) which form the metallocene catalyst (1) is explained below.

In the present invention, a transition metal compound used as the transition metal compound (a1) is represented by the following general formula (I).

(I)

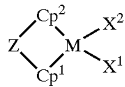

In the formula, M is Ti, Zr, Hf, Rn, Nd, Sm or Ru, preferably Ti, Zr or Hf.

$Cp^1$ and $Cp^2$ are each a cyclopentadienyl group, an indenyl group, a fluorenyl group or a derivative group thereof which is π-bonded with M, and in a detailed explanation, $Cp^1$ and $Cp^2$ are each a ligand coordinating with a transition metal and a ligand having a cyclopentadienyl skeleton, such as a cyclopentadienyl group, an indenyl group, a 4,5,6,7-tetrahydroindenyl group, or a fluorenyl group, provided that the ligand having a cyclopentadienyl skeleton may have a substituent such as an alkyl group, a cycloalkyl group, a trialkylsilyl group, a halogen atom and the like.

$X^1$ and $X^2$ are each an anionic ligand or a neutral Lewis base ligand. Examples include a hydrocarbon group of 1 to 12 carbon atoms, an alkoxy group, an aryloxy group, a sulfonic acid-containing group (—$SO_3R^a$, wherein $R^a$ is an alkyl group, an alkyl group substituted by a halogen atom, an aryl group, an aryl group substituted by a halogen atom or an aryl group substituted by an alkyl group.), a halogen atom, a hydrogen atom and the like.

Z is a C, O, B, S, Ge, Si or Sn atom, or a group containing these atoms, such as a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —CO—, —SO—, —$SO_2$— and —$BR^5$—, wherein $R^5$ is a hydrogen atom, a halogen atom, a hydrocarbon group of 1 to 20 carbon atoms or a halogenated hydrocarbon group of 1 to 20 carbon atoms. Further, groups represented by Z may form a ring. Of these, Z is preferably a group containing O, Si or C.

Examples of the transition metal compound represented by the general formula (I) include diphenylmethylene (cyclopentadienyl)(fluorenyl)hafnium dichloride, diphenylmethylene(cyclopentadienyl)(fluorenyl)zirconium dichloride, isopropyl(cyclopentadienyl-1-fluorenyl)hafnium dichloride, isopropyl(cyclopentadienyl-1-fluorenyl) zirconium dichloride, diphenylmethylene(cyclopentadienyl) fluorenylzirconium dichloride, rac-dimethylsilylene-bis(1-(2,7-dimethyl-4-ethylindenyl))zirconium dichloride, rac-dimethylsilylene-bis(1-(2,7-dimethyl-4-n-propylindenyl)) zirconium dichloride, rac-dimethylsilylene-bis(1-(2,7-dimethyl-4-i-1-propylindenyl))zirconium dichloride, rac-dimethylsilylene-bis(1-(2,7-dimethyl-4-n-butylindenyl)) zirconium dichloride, rac-dimethylsilylene-bis(1-(2,7-dimethyl-4-sec-butylindenyl))zirconium dichloride, rac-dimethylsilylene-bis(1-(2,7-dimethyl-4-t-butylindenyl)) zirconium dichloride, rac-dimethylsilylene-bis(1-(2,7-dimethyl-4-n-pentylindenyl))zirconium dichloride, rac-dimethylsilylene-bis(1-(2,7-dimethyl-4-n-hexylindenyl)) zirconium dichloride, rac-dimethylsilylene-bis(1-(2,7-dimethyl-4-cyclohexylindenyl))zirconium dichloride, rac-dimethylsilylene-bis(1-(2,7-dimethyl-4-methylcyclohexylindenyl))zirconium dichloride, rac-dimethylsilylene-bis(1-(2,7-dimethyl-4-phenylethylindenyl))zirconium dichloride, rac-dimethylsilylene-bis(1-(2,7-dimethyl-4-phenyldichloromethylindenyl))zirconium dichloride, rac-dimethylsilylene-bis(1-(2,7-dimethyl-4-chloromethylindenyl))zirconium dichloride, rac-dimethylsilylene-bis(1-(2,7-dimethyl-4-trimethylsilylenemethylindenyl))zirconium dichloride, rac-dimethylsilylene-bis(1-(2,7-dimethyl-4-trimethylsiloxymethylindenyl))zirconium dichloride, rac-diethylsilylene-bis(1-(2,7-dimethyl-4-i-propylindenyl)) zirconium dichloride, rac-di(i-propyl)silylenebis(1-(2,7-dimethyl-4-i-propylindenyl))zirconium dichloride, rac-di(n-butyl)silylene-bis(1-(2,7-dimethyl-4-i-propylindenyl)) zirconium dichloride, rac-di(cyclohexyl)silylenebis(1-(2,7-dimethyl-4-i-propylindenyl))zirconium dichloride, rac-methylphenylsilylenebis(1-(2,7-dimethyl-4-i-propylindenyl))zirconium dichloride, rac-methylphenylsilylenebis(1-(2,7-dimethyl-4-t-butylindenyl))

zirconium dichloride, rac-diphenylsilylenebis(1-(2,7-dimethyl-4-t-butylindenyl))zirconium dichloride, rac-diphenylsilylenebis(1-(2,7-dimethyl-4-i-propylindenyl)) zirconium dichloride, rac-diphenylsilylenebis(1-(2,7-dimethyl-4-ethylindenyl))zirconium dichloride, rac-di(p-tolyl)silylenebis(1-(2,7-dimethyl-4-i-propylindenyl)) zirconium dichloride, rac-di(p-chlorophenyl)silylenebis(1-(2,7-dimethyl-4-i-propylindenyl))zirconium dichloride, rac-dimethylsilylenebis(1-(2-methyl-4-i-propyl-7-ethylindenyl))zirconium dibromide, rac-dimethylsilylene-bis(1-(2,7-dimethyl-4-i-propyl-1-indenyl))zirconium dimethyl, rac-dimethylsilylene-bis(1-(2,7-dimethyl-4-i-propyl-1-indenyl))zirconium methylchloride, rac-dimethylsilylene-bis(1-(2,7-dimethyl-4-i-propyl-1-indenyl))zirconium-bis(1-(trifluoromethanesulfonato)), rac-dimethylsilylene-bis(1-(2,7-dimethyl-4-i-propyl-1-indenyl))zirconium-bis(1-(p-phenylsulfinato)), rac-dimethylsilylene-bis(1-(2-phenyl-4-i-propyl-7-methyl-1-indenyl))zirconium dichloride, (cyclopentadienyl)(fluorenyl)hafnium dichloride, (cyclopentadienyl)(fluorenyl)zirconium dichloride, bis(1-(2,7-dimethyl-4-ethylindenyl)zirconium dichloride, bis(cyclopentadienyl) hafnium dichloride, bis(cyclopentadienyl)zirconium dichloride, bisindenylhafnium dichloride, bisindenylzirconium dichloride, bis(1-(2,7-dimethyl-4-n-propylindenyl)) zirconium dichloride, bis(1-(2,7-dimethyl-4-i-propylindenyl))zirconium dichloride, bis(1-(2,7-dimethyl-4-n-butylindenyl))zirconium dichloride, bis(1-(2,7-dimethyl-4-sec-butylindenyl))zirconium dichloride, bis(1-(2,7-dimethyl-4-t-butylindenyl))zirconium dichloride, bis(1-(2,7-dimethyl-4-n-pentylindenyl))zirconium dichloride, bis(1-(2,7-dimethyl-4-n-hexylindenyl))zirconium dichloride, bis(1-(2,7-dimethyl-4-cyclohexylindenyl))zirconium dichloride, bis(1-(2,7-dimethyl-4-methylcyclohexylindenyl))zirconium dichloride, bis(1-(2,7-dimethyl-4-phenylethylindenyl))zirconium dichloride, bis(1-(2,7-dimethyl-4-phenyldichloromethylindenyl)) zirconium dichloride, bis(1-(2,7-dimethyl-4-chloromethylindenyl))zirconium dichloride, bis(1-(2,7-dimethyl-4-trimethylsilylenemethylindenyl))zirconium dichloride, bis(1-(2,7-dimethyl-4-trimethylsiloxymethylindenyl))zirconium dichloride, bis(1-(2,7-dimethyl-4-ethylindenyl))zirconium dichloride, bis(1-(2-methyl-4-i-propyl-7-ethylindenyl))zirconium dibromide, bis(1-(2,7-dimethyl-4-i-propyl-1-indenyl))zirconium dimethyl, bis(1-(2,7-dimethyl-4-i-propyl-1-indenyl)) zirconium methylchloride, bis(1-(2,7-dimethyl-4-i-propyl-1-indenyl))zirconium-bis(1-(trifluoromethanesulfonato)), bis(1-(2,7-dimethyl-4-i-propyl-1-indenyl))zirconium-bis(1-(p-phenylsulfinato)) and bis(1-(2-phenyl-4-i-propyl-7-methyl-1-indenyl))zirconium dichloride.

Further, there can be mentioned transition metal compounds wherein a zirconium metal of the above-mentioned compounds is substituted by a titanium metal or a hafnium metal.

In the present invention, a transition metal compound used as the transition metal compound (a1) is represented by the following general formula (II).

(II)

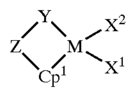

In the formula (II), M is a transition metal of Group 4 of the periodic table or a lanthamide type, specifically Ti, Zr, Hf, Rn, Nd, Sm or Ru, preferably Ti, Zr or Hf.

$Cp^1$ is a cyclopentadienyl group, an indenyl group, a fluorenyl group or a derivative group thereof which is π-bonded with M, and in a detailed explanation, $Cp^1$ is a ligand coordinating with a transition metal and a ligand having a cyclopentadienyl skeleton, such as a cyclopentadienyl group, an indenyl group, a fluorenyl group or a derivative group thereof, provided that the ligand having a cyclopentadienyl skeleton may have a substituent such as an alkyl group, a cycloalkyl group, a trialkylsilyl group, a halogen atom and the like.

$X^1$ and $X^2$ are each an anionic ligand or a neutral Lewis base ligand, may be the same or different, and are each a hydrogen atom or halogen atom, or a hydrocarbon group of 20 or less carbon atoms, a silyl group of 20 or less silicon atoms or a germill group of 20 or less germanium atoms.

Z is carbon, oxygen, sulfur, boron or an atom of the Group 14 of the periodic table, such as silicon, germanium and tin, preferably carbon, oxygen, or silicon. Z may contain a substituent, such as an alkyl group and an alkoxy group, and these substituents may bond each other to form a ring. Further, Z and Y may bond each other to form a fuzed ring.

Examples of the transition metal compound represented by the general formula (II) include (t-butylamide)dimethyl(fluorenyl)silanetitane dimethyl, (t-butylamide)dimethyl(fluorenyl)silanetitane dichloride, (t-butylamide)dimethyl(fluorenyl)silanezirconium dimethyl, (t-butylamide)dimethyl(fluorenyl)silanezirconium dichloride, dimethyl(t-butylamide)(tetramethyl-$\eta^5$cyclopentadienyl)silylene)titane dichloride, ((t-butylamide)(tetramethyl-$\eta^5$cyclopentadienyl)-1,2-ethanediyl)titane dichloride, (dimethyl(phenylamide)(tetramethyl-$\eta^5$cyclopentadienyl)silylene)titane dichloride, (dimethyl(t-butylamide)(tetramethyl-$\eta^5$cyclopentadienyl)silylene)titane dimethyl, (dimethyl(4-methylphenylamide)(tetramethyl-$\eta^5$cyclopentadienyl)silylene)titane dichloride, (dimethyl(t-butylamide)($\eta^5$cyclopentadienyl) silylene)titane dichloride, (tetramethyl(t-butylamide)(tetramethyl-$\eta^5$cyclopentadienyl)disilylene)titane dichloride and (t-butylamide)dimethyl(fluorenyl)silanetitane dimethyl.

The transition metal compounds can be used singly or in combination of two or more kinds.

Particulate Carrier

The above mentioned transition metal compounds (a1) can be supported on a particle carrier.

Examples of the particulate carrier include inorganic carriers such as $SiO_2$, $Al_2O_3$, $B_2O_3$, MgO, $ZrO_2$, CaO, $TiO_2$, ZnO, $SnO_2$, BaO, ThO and organic carriers such as polyethylene, polypropylene, poly-1-butene, poly-4-methyl-1-pentene, styrene-divinylbenzene copolymer. The particulate carrier can be used singly or in combination of two or more kinds.

Next, the component (b) forming the metallocene catalyst (1), that is a ionizing ionic compound (b-1), an organoaluminum-oxy compound (b-2) and a organoaluminium compound (b-3), is explained.

(b-1) Ionizing Ionic Compound

The ionizing ionic compound (b-1) is a compound which reacts with the transition metal M in the transition metal compound (a1) to form an ion complex.

Examples of such compounds includes Lewis acids, an ionic compounds, borane compounds and carborane compounds described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106.

The Lewis acids are, for example, compounds represented by $BR_3$ (R is a fluorine atom or a phenyl group which may have a substituent such as a fluorine atom, a methyl group or a trifluoromethyl group). Examples of such compounds include trifluoroboron, triphenylboron, tris(4-fluorophenyl) boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, $MgCl_2$, $Al_2O_3$ and $SiO_2$—$Al_2O_3$.

Employable as the ionic compound is trialkyl-substituted ammonium salt, N,N-dialkylanilinium salt, dialkylammonium salt or triarylphosphonium salt.

Examples of the trialkyl-substituted ammonium salts include triethylammoniumtetra(phenyl)boron, tripropylammoniumtetra(phenyl)boron and tri(n-butyl) ammoniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, tri(n-butyl)ammoniumtetrakis(pentafluorophenyl)borate, N,N-dimethylaniliniumtetrakis(pentafluorophenyl)borate, and ferroceniumtetra(pentafluorophenyl)borate.

Examples of the borane compounds include salts of metallic borane anions, such as decaborane(14), bis[tri(n-butyl)ammonium]nonaborate, bis[tri(n-butyl)ammonium] decaborate, and bis[tri(n-butyl)ammonium]bis-(dodecahydridododecaborate)nickelate(III).

Examples of the carborane compounds include salts of metallic carborane anions, such as 4-carbanonaborane(14), 1,3-dicarbanonaborane(13), bis[tri(n-butyl)ammonium]bis (undecahydrido-7-carbaundecaborate)nickelate(IV), dodecaborane, 1-carbaundecaborane, bis(n-butyl) ammounium(1-carbedodeca)borate, tri(n-butyl)ammonium (7,8-dicarbaundeca)borate, and tri(n-butyl)ammonium (tridecahydrido-7-carbaundeca)borate.

The above mentioned ionizing ionic compounds (b-1) can be used singly or in combination of two or more kinds.

The ionizing ionic compound (b-1) can be supported on the above particulate carrier.

(b-2) Organoaluminum Oxy-Compound

The organoaluminum oxy-compound (b-2) may be aluminoxane hitherto known or such a benzene-insoluble organoaluminum oxy-compound as exemplified in Japanese Patent Laid-Open Publication No. 78687/1990.

The hitherto known aluminoxane (alumoxane) is represented by the following formula:

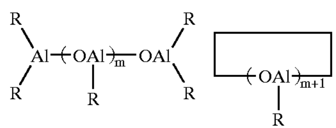

wherein R is a hydrocarbon group, such as methyl, ethyl, propyl or butyl, preferably methyl or ethyl, particularly preferably methyl; and m is an integer of 5 or more, preferably an integer of 5 to 40, particularly preferably an integer of 10 to 40.

The aluminoxane may be composed of mixed alkyloxyaluminum units consisting of alkyloxyaluminum units represented by the formula $OAl(R^1)$ and alkyloxyaluminum units represented by the formula $OAl(R^2)$ (each of $R^1$ and $R^2$ is the same hydrocarbon group as indicated by R, and $R^1$ and $R^2$ are groups different from each other).

The hitherto known aluminoxane can be prepared by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and then the remainder is dissolved in a solvent or suspended in a poor solvent for aluminoxane.

Examples of the organoaluminum compounds used for preparing the aluminoxane include the same compounds as described later with respect to the organoaluminum compound (b-3).

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons and aliphatic hydrocarbons.

The organoaluminum oxy-compounds mentioned above can be used singly or in combination of two or more kinds.

The organoaluminum oxy-compound (b-2) may be used in the supported form on the aforesaid particulate carrier.

Organoaluminum Compound (b-3)

As the organoalminum compound (b-3), a compound containing one or more Al-carbon bond(s) in a molecular can be employable. Examples of the compound include an organoaluminum compound represented by the following general formula (III), $$R^9{}_nAlX_{3-n} \quad \text{(III)}$$

wherein $R^9$ is a hydrocarbon group of 1 to 12 carbon atoms, X is a halogen atom or a hydrogen atom, and n is an integer of 1 to 3.)

In the formula (III), $R^9$ is a hydrocarbon group of 1 to 12 carbon atoms such as an alkyl group, a cycloalkyl group or an aryl group. Concrete examples of $R^9$ include a methyl group, an ethyl group, a n-propyl group, an isopropyl group, an isobutyl group, a pentyl group, a hexyl group, an octyl group, a cyclopentyl group, a cyclohexyl group, a phenyl group, and a tolyl group.

Examples of the organoaluminum compound include the following compounds; trialkylaluminums such as trimethylaluminum, triethylaluminum, triisopropylaluminum, triisobutylaluminum, trioctylaluminum, tri(2-ethylhexyl)aluminum and tridecylaluminum;

- alkenylaluminums such as isoprenylaluminum;
- dialkylaluminum halides, such as dimethylaluminum chloride, diethylaluminum chloride, diisopropylaluminum chloride, diisobutylaluminum chloride and dimethylaluminum bromide;
- alkylaluminum sesquihalides, such as methylaluminum sesquichloride, ethylaluminum sesquichloride, isopropylaluminum sesquichloride, butylaluminum sesquichloride and ethylaluminum sesquibromide;
- alkylaluminum dihalides, such as methylaluminum dichloride, ethylaluminum dichloride, isopropylaluminum dichloride and ethylaluminum dibromide; and
- alkylaluminum hydrides, such as diethylaluminum hydride and diisobutylaluminum hydride.

Further examples of the organoaluminum compound (b-3) may include a compound represented by the following formula (IV), $$R^9_nAlL_{3-n} \quad \text{(IV)}$$

wherein $R^9$ has the same meanings as those of the above; L is —$OR^{10}$ group, —$OSiR^{11}_3$ group, —$OAlR^{12}_2$ group, —$NR^{13}_2$ group, —$SiR^{14}_3$ group or —$N(R^{15})AlR^{16}_2$ group; n is an integer of 1 or 2; $R^{10}$, $R^{11}$, $R^{12}$ and $R^{16}$ are each a methyl group, an ethyl group, an isopropyl group, an isobutyl group, a cyclohexyl group and a phenyl group; $R^{13}$ is a hydrogen atom, a methyl group, an ethyl group, an isopropyl group, a phenyl group or a trimethylsilyl group; and $R^{14}$ and $R^{15}$ are each a methyl group and an ethyl group.

Of the organoaluminum compounds, preferable is a compound represented by the formula $R^9_nAl(OAlR^{10}_2)_{3-n}$ such as $Et_2AlOAlEt_2$ and $(iso\text{-}Bu)_2AlOAl(iso\text{-}Bu)_2$.

Of the organoaluminum compounds represented by the above formulas (III) and (IV), preferable is a compound represented by the formula $R^9_3Al$, particularly preferable is a compound wherein $R^9$ is an isoalkyl group.

In the present invention, the metallocene catalyst (1) is preferably used as a catalyst for preparing the α-olefin polymer (B), but besides the metallocene catalyst (1), there can be also used:

(i) a titanium catalyst comprising a solid titanium catalyst component and an organoaluminum compound, and (ii) a vanadium catalyst comprising a soluble vanadium compound and an organoaluminum compound.

In the present invention, at least one α-olefin selected from α-olefins of 2 to 20 carbon atoms is copolymerized in the presence of the metallocene catalyst (1) usually in a liquid phase. In the copolymerization, an inert hydrocarbon solvent is generally used, but propylene may be used as a solvent. The copolymerization can be carried out by any of batchwise and continuous processes.

Examples of the inert hydrocarbon solvents for preparing the α-olefin polymer (B) include the same inert hydrocarbon solvents as used for preparing the syndiotactic propylene polymer (A).

When the copolymerization is carried out by a batchwise process using the metallocene catalyst (1), the transition metal compound (a1) is used in the polymerization system in an amount of usually 0.00005 to 1 mmol, preferably 0.0001 to 0.5 mmol, based on 1 liter of the polymerization volume.

The ionizing ionic compound (b-1) is used in such an amount that the molar ratio ((b-1)/(a1)) of the ionizing ionic compound to the transition metal compound (a1) becomes 0.5 to 20, preferably 1 to 10.

The organoaluminum oxy-compound (b-2) is used in such an amount that the molar ratio (Al/M) of the aluminum atom (Al) to the transition metal atom (M) in the transition metal compound (a1) becomes 1 to 10000, preferably 10 to 5000.

The organoaluminum compound (b-3) is used in an amount of usually about 0 to 5 mmol, preferably about 0 to 2 mmol, based on 1 liter of the polymerization volume.

The copolymerization reaction is carried out under the conditions of a temperature of usually −20 to 150° C., preferably 0 to 120° C., more preferably 0 to 100° C., and a pressure of more than 0 kg/cm$^2$ and not more than 80 kg/cm$^2$, preferably more than 0 kg/cm$^2$ and not more than 50 kg/cm$^2$.

The reaction time (average residence time in case of continuous polymerization) is in the range of usually 5 minutes to 3 hours, preferably 10 minutes to 1.5 hours, though it varies depending upon the conditions such as catalyst concentration and polymerization temperature.

At least one olefin selected from α-olefins of 2 to 20 carbon atoms is fed to the polymerization system in such an amount that the α-olefin polymer (B) having the aforesaid specific composition can be obtained. In the copolymerization, a molecular weight modifier such as hydrogen may be used.

When at least one α-olefin selected from α-olefins of 2 to 20 carbon atoms is polymerized, the α-olefin polymer (B) is obtained usually as a polymer solution containing it. The polymer solution is then treated in a conventional way to obtain the α-olefin polymer (B).

(C) Crystal Nucleating Agent

The crystal nucleating agent (C) optionally used in the invention can be various kinds of conventionally known crystal nucleating agents and is not limited to specific one. Preferable examples of nucleating agents are represented by the following formulas.

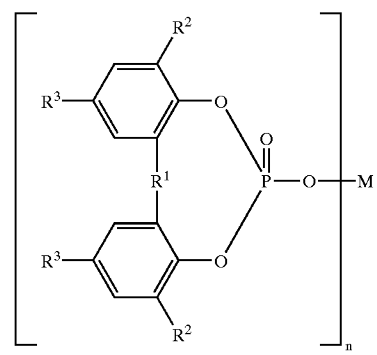

In the above formula, $R^1$ is an oxygen atom, a sulfur atom or a hydrocarbon group of 1 to 10 carbon atoms; $R^2$ and $R^3$ are each a hydrogen atom or hydrocarbon group of 1 to 10 carbon atoms and may be the same or different, and $R^2$s, $R^3$s or $R^2$ and $R^3$ may be bonded to each other to form a ring; M is a metal atom having a valency of 1 to 3; and n is an integer of 1 to 3.

Concrete examples of the above nucleating agents include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-1-propyl-6-t-butylphenyl) phosphate, lithium-2,2'-methylene-bis(4-methyl-6-t-butylphenyl) phosphate,
lithium-2,2'-methylene-bis(4-ethyl-6-t-butylphenyl) phosphate,
calcium-bis(2,2'-thiobis(4-methyl-6-t-butylphenyl) phosphate),
calcium-bis(2,2'-thiobis(4-ethyl-6-t-butylphenyl) phosphate),
calcium-bis(2,2'-thiobis(4,6-di-t-butylphenyl)phosphate),
magnecium-bis(2,2'-thiobis(4,6-di-t-butylphenyl) phosphate),
magnecium-bis(2,2'-thiobis(4-t-octylphenyl)phosphate),
sodium-2,2'-butylidene-bis(4,6-di-methylphenyl)phosphate,
sodium-2,2'-butylidene-bis(4,6-di-t-buthylphenyl) phosphate,
sodium-2,2'-t-octylmethylene-bis(4,6-di-methylphenyl) phosphate,
sodium-2,2'-t-octylmethylene-bis(4,6-di-t-butylphenyl) phosphate,
calcium-bis(2,2'-methylene-bis(4,6-di-t-butylphenyl) phosphate),
magnecium-bis(2,2'-methylene-bis(4,6-di-t-butylphenyl) phosphate),
barium-bis(2,2'-methylene-bis(4,6-di-t-butylphenyl) phosphate),
sodium-2,2'-methylene-bis(4-methyl-6-t-butylphenyl) phosphate,
sodium-2,2'-methylene-bis(4-ethyl-6-t-butylphenyl) phosphate,
sodium-(4,4'-dimethyl-5,6'-di-t-butyl-2,2'-biphenylyl) phosphate,
calcium-bis-((4,4'-dimethyl-6,6'-di-t-butyl-2,2'-biphenylyl) phosphate),
sodium-2,2'-ethylidene-bis(4-m-butyl-6-t-butylphenyl) phosphate,
sodium-2,2'-methylene-bis(4,6-di-methylphenyl)phosphate,
sodium-2,2'-methylene-bis(4,6-di-ethylphenyl)phosphate,
potassium-2,2'-ethylidene-bis(4,6-di-t-butylphenyl) phosphate,
calcium-bis(2,2'-ethylidene-bis(4,6-di-t-butylphenyl) phosphate),
magnecium-bis(2,2'-ethylidene-bis(4,6-di-t-butylphenyl) phosphate),
barium-bis(2,2'-ethylidene-bis(4,6-di-t-butylphenyl) phosphate),
aluminium-tris(2,2'-methylene-bis(4,6-di-t-butylphenyl) phosphate) and
aluminium-tris(2,2'-ethylidene-bis(4,6-di-t-butylphenyl) phosphate), and mixtures of two or more thereof.

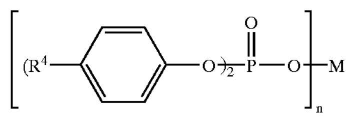

In the above formula, $R^4$ is a hydrogen atom or hydrocarbon group of 1 to 10 carbon atoms; M is a metal atom having a valency of 1 to 3; and n is an integer of 1 to 3.

Concrete examples of the above nucleating agents include
sodium-bis(4-t-butylphenyl)phosphate,
sodium-bis(4-methylphenyl)phosphate,
sodium-bis(4-ethylphenyl)phosphate,
sodium-bis(4-i-propylphenyl)phosphate,
sodium-bis(4-t-octylphenyl)phosphate,
potassium-bis(4-t-butylphenyl)phosphate,
calcium-bis(4-t-butylphenyl)phosphate,
magnecium-bis(4-t-butylphenyl)phosphate, lithium-bis(4-t-butylphenyl)phosphate,
aluminum-bis(4-t-butylphenyl)phosphate, and
mixtures of two or more thereof.

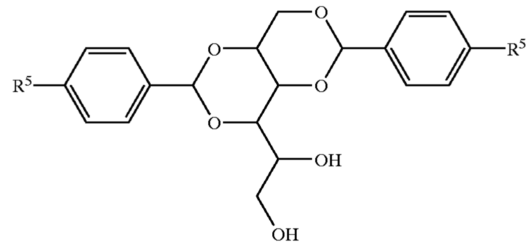

In the above formula, $R^5$ is a hydrogen atom or hydrocarbon group of 1 to 10 carbon atoms.

Concrete examples of the above nucleating agents include
1,3,2,4-dibenzylidene sorbitol,
1,3-benzylidene-2,4-p-methylbenzylidene sorbitol,
1,3-benzylidene-2,4-p-ethylbenzylidene sorbitol,
1,3-p-methylbenzylidene-2,4-benzylidene sorbitol,
1,3-p-ethylbenzylidene-2,4-benzylidene sorbitol,
1,3-p-methylbenzylidene-2,4-p-ethylbenzylidene sorbitol,
1,3-p-ethylbenzylidene-2,4-p-methylbenzylidene sorbitol,
1,3,2,4-di(p-methylbenzylidene)sorbitol,
1,3,2,4-di(p-ethylbenzylidene)sorbitol,
1,3,2,4-di(p-n-propylbenzylidene)sorbitol,
1,3,2,4-di(p-i-propylbenzylidene)sorbitol,
1,3,2,4-di(p-n-butylbenzylidene)sorbitol,
1,3,2,4-di(p-s-butylbenzylidene)sorbitol,
1,3,2,4-di(p-t-butylbenzylidene)sorbitol,
1,3,2,4-di(2',4'-dimethylbenzylidene)sorbitol,
1,3,2,4-di(p-methoxybenzylidene)sorbitol,
1,3,2,4-di(p-ethoxybenzylidene)sorbitol,
1,3-benzylidene-2-4-p-chlorobenzylidene sorbitol,
1,3-p-chlorobenzylidene-2,4-benzylidene sorbitol,
1,3-p-chlorobenzylidene-2,4-p-methylbenzylidene sorbitol,
1,3-p-chlorobenzylidene-2,4-p-ethylbenzylidene sorbitol,
1,3-p-methylbenzylidene-2,4-p-chlorobenzylidene sorbitol,
1,3-p-ethylbenzylidene-2,4-p-chlorobenzylidene sorbitol and
1,3,2,4-di(p-chlorobenzylidene)sorbitol, and mixtures of two or more thereof. Particularly preferable examples include 1,3,2,4-dibenzylidene sorbitol,
1,3,2,4-di(p-methylbenzylidene)sorbitol,
1,3,2,4-di(p-ethylbenzylidene)sorbitol,
1,3-p-chlorobenzylidene-2,4-p-methylbenzylidene sorbitol,
1,3,2,4-di(p-chlorobenzylidene)sorbitol, and mixtures of two or more thereof.

Examples of other crystal nucleating agents include aliphatic amides, metallic salts of aromatic carboxylic acids and metallic salts of aliphatic carboxylic acids. Specifically, there can be mentioned ethylene bis-stearylamide, aluminum benzoate, aluminum p-t-butylbenzoate, sodium adipate, sodium thiophenecarboxylate and sodium pyrrolecarboxylate. Also a fluorine-containing polymer such as Teflon is employable as the crystal nucleating agent.

(D) Ethylene-Based Polymer

Examples of the ethylene-based polymers (D) optionally used in the invention include an ethylene homopolymer; bipolymers, such as an ethylene/propylene copolymer, an ethylene/butene copolymer, an ethylene/4-methyl-1-pentene copolymer and an ethylene/hexene copolymer; and terpolymers, such as an ethylene/butene/4-methyl-1-pentene copolymer. Of these, an ethylene homopolymer and an ethylene/propylene copolymer are preferable.

The density of the ethylene-based polymer (D) is desired to be in the range of 0.91 to 0.97 g/cm$^3$, preferably 0.92 to 0.97 g/cm$^3$, more preferably 0.93 to 0.97 g/cm$^3$.

The intrinsic viscosity (η) thereof as measured in decalin at 135° C. is desired to be in the range of 0.5 to 20 dl/g, preferably 1 to 20 dl/g, more preferably 1 to 15 dl/g.

The catalyst used for preparing the ethylene-based polymer (D) is not specifically limited, and any catalyst such as a titanium catalyst or a metallocene catalyst is employable.

Composition

The soft syndiotactic polypropylene composition (1) of the invention comprises the syndiotactic propylene polymer (A), the α-olefin polymer (B), and if necessary, the crystal nucleating agent (C) and/or the ethylene-based polymer (D).

In the soft syndiotactic polypropylene composition (1), the weight ratio (A/B) of the component (A) to the component (B) is desired to be in the range of 90/10 to 10/90, preferably 80/20 to 20/80, more preferably 75/25 to 40/60.

The component (C) is desirably contained in an amount of 0.01 to 1 part by weight, preferably 0.1 to 0.8 part by weight, based on 100 parts by weight of the total of the components (A) and (B).

The component (D) is desirably contained in an amount of 0.01 to 5 parts by weight, preferably 0.01 to 4 parts by weight, more preferably 0.01 to 3 parts by weight, based on 100 parts by weight of the total of the components (A) and (B).

The soft syndiotactic polypropylene composition (1) comprising the components (A) and (B) in the above proportion and optionally further comprising the component (C) and/or the component (D) tends to have excellent transparency, flexibility, heat resistance and scratch resistance.

The soft syndiotactic polypropylene composition (1), in a preferred embodiment, comprises the syndiotactic propylene polymer (A), the α-olefin polymer (B) and the crystal nucleating agent (C).

In this case, the component (C) is desirably contained in an amount of 0.01 to 1 part by weight, preferably 0.1 to 0.8 part by weight, based on 100 parts by weight of the total of the components (A) and (B). As the crystal nucleating agent (C), a sorbitol type compound is preferable.

The soft syndiotactic polypropylene composition (1) comprising the components (A), (B) and (C) in the above proportion tends to have a good balance among transparency, flexibility, heat resistance and impact resistance. Further, the composition tends to also have excellent heat-sealing properties and impact resistance.

The soft syndiotactic polypropylene composition (1), in another preferred embodiment, comprises the syndiotactic propylene polymer (A), two or more kinds of the α-olefin polymers (B), and if necessary, the crystal nucleating agent (C).

In this case, the weight ratio (A/total of B) of the component (A) to the total of two or more kinds of the components (B) is desired to be in the range of 90/10 to 10/90, preferably 80/20 to 20/80, more preferably 75/25 to 40/60, and each of the components (B) is desirably contained in an amount of not less than 1% by weight, more preferably not less than 2% by weight, particularly preferably not less than 4% by weight.

The component (C) is desirably contained in an amount of 0.01 to 1 part by weight, preferably 0.01 to 0.8 part by weight, based on 100 parts by weight of the total of the components (A) and (B). As the crystal nucleating agent (C), a sorbitol type compound is preferable.

The soft syndiotactic polypropylene composition (1) comprising the components (A) and (B) in the above proportion and further optionally comprising the component (C) tends to have a good balance among transparency, flexibility, heat resistance and impact resistance. Further, the composition tends to also have excellent heat-sealing properties and impact resistance.

The soft syndiotactic polypropylene composition (1) has a melt flow rate (ASTM D 1238, 230° C., load of 2.16 kg) of usually 0.0001 to 1000 g/10 min, preferably 0.0001 to 900 g/10 min, more preferably 0.0001 to 800 g/10 min, and an intrinsic viscosity (η), as measured in decahydronaphthalene at 135° C., of usually 0.01 to 10 dl/g, preferably 0.05 to 10 dl/g, more preferably 0.1 to 10 dl/g.

When the soft syndiotactic polypropylene composition (1) of the invention has a melt tension (MT) of usually 0.5 to 10 g, preferably 1 to 10 g, the moldability of the composition such as film molding properties is excellent. The melt tension (MT) is determined by measuring a tension that is applied to a filament when a strand extruded under the conditions of a measuring temperature of 200° C. and an extrusion rate of 15 mm/min is taken off at a given rate (10 m/min), and the tension is measured by a melt tension tester (manufactured by Toyo Seiki Seisakusho K. K.).

Process for Preparing the Composition (1)

The soft syndiotactic polypropylene composition (1) can be prepared by mixing the above components in the above amounts by various known means such as a Henschel mixer, a V-blender, a ribbon blender and a tumbling blender, or after mixing, by melt kneading the mixture using a single-screw extruder, a twin-screw extruder, a kneader, a Banbury mixer or the like, followed by granulation or pulverization.

To the soft syndiotactic polypropylene composition (1), additives such as heat stabilizer, weathering stabilizer, antistatic agent, pigment, dye, rust preventive and the below-described "other copolymers" may be added in amounts not detrimental to the objects of the invention.

Other Copolymers

Examples of the "other copolymers" which may be optionally contained in the soft syndiotactic polypropylene composition (1) include the following aromatic hydrocarbon block copolymer (P) which may be hydrogenated, the following ethylene/α-olefin block copolymer (Q), the following ethylene/triene copolymer (R), an ethylene/styrene copolymer and an ethylene diene copolymer. These copolymers are used singly or in combination of two or more kinds.

The "other copolymers" are used in amounts of usually 0 to 40 parts by weight, preferably 0 to 30 parts by weight, based on 100 parts by weight of the soft syndiotactic polypropylene composition.

When the "other copolymers" are used in the above amounts, a composition capable of producing molded products having a good balance among rigidity, hardness, transparency and impact resistance is obtained.

Aromatic Hydrocarbon Block Copolymer (P) which May be Hydrogenated

The aromatic hydrocarbon-block copolymer (P) which may be hydrogenated, that is optionally used in the invention, is an aromatic vinyl/conjugated diene block copolymer (P1) comprising a block polymer unit (X)

derived from aromatic vinyl and a block polymer unit (Y) derived from conjugated diene, or its hydrogenated product (P2).

The aromatic vinyl/conjugated diene block copolymer (P1) of the above structure is represented by, for example, X(YX)n or (XY)n (n is an integer of 1 or more).

Above all, a block copolymer of X(YX)n, particularly X-Y-X, is preferable, and specifically, a styrene block copolymer in the form of polystyrene-polybutadiene (or polyisoprene or polyisoprene/butadiene)-polystyrene is preferable.

In the aromatic hydrocarbon block copolymer, the aromatic vinyl block polymer unit (X) that is a hard segment is present as a crosslinking point of the conjugated diene block polymer unit (Y) and forms physical crosslinking (domain). The conjugated diene block polymer unit (Y) present between the aromatic vinyl block polymer units (X) is a soft segment and has elastomeric properties.

Examples of the aromatic vinyls for forming the aromatic vinyl block polymer units (X) include styrene and styrene derivatives such as α-methylstyrene, 3-methylstyrene, p-methylstyrene, 4-propylstyrene, 4-dodecylstyrene, 4-cyclohexylstyrene, 2-ethyl-4-benzylstyrene and 4-(phenylbutyl)styrene. Of these, styrene is preferable.

Examples of the conjugated dienes for forming the conjugated diene block polymer units (Y) include butadiene, isoprene, pentadiene, 2,3-dimethylbutadiene and combinations thereof. Of these, butadiene, isoprene or a combination of butadiene and isoprene is preferable.

When the conjugated diene block polymer units (Y) are derived from butadiene and isoprene, the units derived from isoprene are desirably contained in amounts of not less than 40% by mol.

The conjugated diene block polymer units (Y) comprising the butadiene/isoprene copolymer units may be random copolymer units of butadiene and isoprene, block copolymer units thereof, or tapered copolymer units thereof.

In the aromatic vinyl/conjugated diene block copolymer (P1), the aromatic vinyl block polymer units (X) are contained in amounts of not more than 22% by weight, preferably 5 to 22% by weight. The content of the aromatic vinyl polymer units can be measured by a conventional method such as infrared spectrometry or NMR spectrometry.

The aromatic vinyl/conjugated diene block copolymer (P1) has a melt flow rate (MFR, ASTM D 1238, 200° C., load of 2.16 kg) of usually 5 g/10 min, preferably 5 to 100 g/10 min.

The aromatic vinyl/conjugated diene copolymer (P1) can be prepared by various processes, for example, the following processes.

(1) Using an alkyllithium compound such as n-butyllithium as an initiator, an aromatic vinyl compound is polymerized and then a conjugated diene is polymerized successively.

(2) An aromatic vinyl compound is polymerized and then a conjugated diene is polymerized, followed by coupling with a coupling agent.

(3) Using a lithium compound as an initiator, a conjugated diene is polymerized and then an aromatic vinyl compound is polymerized successively.

The hydrogenated product (P2) of the aromatic vinyl/conjugated diene block copolymer can be obtained by hydrogenating the aromatic vinyl/conjugated diene block copolymer (P1) in a conventional manner. The hydrogenated product (P2) of the aromatic vinyl/conjugated diene block copolymer has a degree of hydrogenation of usually not less than 90%.

The degree of hydrogenation is a value given when the whole amount of the carbon-to-carbon double bonds in the conjugated diene block polymer units (Y) is 100%.

Examples of the hydrogenated products (P2) of the aromatic vinyl/conjugated diene block copolymers include a styrene/isoprene block copolymer hydrogenated product (SEP), a styrene/isoprene/styrene block copolymer hydrogenated product (SEPS, polystyrene/polyethylene/propylene/polystyrene block copolymer), and a styrene/butadiene block copolymer hydrogenated product (SEBS, polystyrene/polyethylene/butylene/polystyrene block copolymer). More specifically, there can be mentioned HYBRAR (available from Kraray Co., Ltd.), Crayton (available from Shell Japan, Ltd.), Cariflex TR (available from Shell Japan, Ltd.), Solprene (available from Philips Petrolifam Co.), Europrene SOLT (available from Annitch Co.), Toughprene (available from Asahi Chemical Industry Co., Ltd.), Solprene-T (available from Nippon Elastomer Co.), JSR-TR (available from JSR Co., Ltd.), Denka STR (available from Denki Kagaku Kogyo K. K.), Quintac (available from Nippon Geon Co., Ltd.), Crayton G (available from Shell Japan, Ltd.) and Toughtech (available from Asahi Chemical Industry Co., Ltd.), all of which are trade names.

Of these, SEBS or SEPS is preferably used as the hydrogenated product (P2) of an aromatic vinyl/conjugated diene block copolymer.

The aromatic hydrocarbon block copolymer (P) which may be hydrogenated is desirably used in an amount of usually 0 to 30% by weight, preferably 0 to 25% by weight, based on 100 parts by weight of the soft syndiotactic polypropylene composition. When the aromatic hydrocarbon block copolymer (P) which may be hydrogenated is used in the above amount, a composition capable of producing molded products having a good balance among rigidity, hardness, transparency and impact resistance is obtained.

Ethylene/α-olefin Block Copolymer (Q)

The ethylene/α-olefin block copolymer (Q) that is optionally used in the invention comprises:

a crystalline polyethylene portion comprising 100 to 80% by mol of recurring units derived from ethylene and 0 to 20% by mol of recurring units derived from an α-olefin of 3 to 10 carbon atoms, and a low-crystalline copolymer portion or an amorphous copolymer portion, comprising two or more kinds of recurring units derived from α-olefins of 2 to 20 carbon atoms.

In the present invention, an ethylene/α-olefin block copolymer comprising 30 to 95% by mol of recurring units derived from ethylene and 70 to 5% by mol of recurring units derived from α-olefins of 3 to 20 carbon atoms is preferable. In particular, an ethylene/α-olefin block copolymer comprising 60 to 90% by mol of recurring units derived from ethylene and 40 to 10% by mol of recurring units derived from α-olefins of 3 to 20 carbon atoms is preferable.

Examples of the α-olefins of 3 to 20 carbon atoms include propylene, 1-butene, 1-pentene, 1-hexene, 4-methyl-1-pentene, 3-methyl-1-pentene, 1-octene, 3-methyl-1-butene, 1-decene, 1-dodecene, 1-tetradodecene, 1-hexadecene, 1-octadecene, 1-eicosene, cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene.

In the crystalline polyethylene portion, two or more kinds of recurring units derived from the α-olefins of 3 to 20 carbon atoms may be contained.

In the ethylene/α-olefin block copolymer (Q) for use in the invention, recurring units derived from a diene compound of 4 to 20 carbon atoms may be contained in amounts of not more than 5% by mol.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidene norbornene, vinyl norbornene and dicyclopentadiene.

The ethylene/α-olefin block copolymer (Q) has a melt flow rate (MFR, ASTM D 1238, 190° C., load of 2.16 kg) of usually 0.0001 to 500 g/10 min, preferably 0.0001 to 300 g/10 min, more preferably 0.0001 to 200 g/10 min, and a density (ASTM D 1505) of 0.85 to 0.90 g/cm$^3$, preferably 0.85 to 0.89 g/cm$^3$, more preferably 0.86 to 0.89 g/cm$^3$.

The ethylene/α-olefin block copolymer (Q) has a crystallinity of usually 0 to 30%, preferably 0 to 28%, more preferably 0 to 25%.

The crystallinity of the ethylene/α-olefin block copolymer (Q) is determined by X-ray diffractometry of a boiling heptane-insoluble component.

The boiling heptane-insoluble component is prepared in the following manner. In a 1-liter flask equipped with a stirrer, 3 g of a polymer sample, 20 mg of 2,6-di-tert-butyl-4-methylphenol and 500 ml of n-decane are placed, and they are heated in an oil bath at 145° C. to dissolve the polymer sample. After the polymer sample is dissolved, the solution is cooled to room temperature over a period of about 8 hours and then kept in a water bath at 23° C. for 8 hours. The n-decane suspension containing a precipitated polymer (23° C. decane-insoluble component) is separated by filtration using a glass filter of G-4 (or G-2), followed by vacuum drying. Then, 1.5 g of the polymer was subjected to Soxhlet extraction for 6 hours or more using heptane to obtain a boiling heptane-insoluble component.

The crystallinity is measured in the following manner using the above-obtained boiling heptane-insoluble component as a sample. The sample is molded at 180° C. by a pressure molding machine to prepare a square bar of 1 mm thickness, immediately followed by water cooling, to obtain a pressed sheet. Using the pressed sheet, the crystallinity is measured by a rotor flex RU300 measuring device manufactured by Rigaku Denki K. K. (output: 50 kV, 250 mA). For the measurement, a transmission method is used, and the measurement is carried out with rotating the sample.

The boiling heptane-insoluble component in the ethylene/α-olefin block copolymer (Q) has a density of usually not less than 0.86 g/cm$^3$, preferably not less than 0.87 g/cm$^3$.

The quantity of the 23° C. n-decane-soluble component in the ethylene/α-olefin block copolymer (Q) is in the range of 0.1 to 99%, preferably 0.5 to 99%, more preferably 1 to 99%.

The quantity of the 23° C. n-decane-soluble component in the ethylene/α-olefin block copolymer (Q) is measured in the following manner. In a 1-liter flask equipped with a stirrer, 3 g of a polymer sample, 20 mg of 2,6-di-tert-butyl-4-methylphenol and 500 ml of n-decane are placed, and they are heated in an oil bath at 145° C. to dissolve the polymer sample. After the polymer sample is dissolved, the solution is cooled to room temperature over a period of about 8 hours and then kept in a water bath at 23° C. for 8 hours. The n-decane solution containing a dissolved polymer is separated from a precipitated polymer by filtration using a glass filter of G-4 (or G-2). The resulting solution is heated under the conditions of 10 mmHg and 150° C. to dry the polymer dissolved in the n-decane solution until the constant weight is reached. This weight is taken as the quantity of the 23° C. decane-soluble component, and the quantity of the 23° C. n-decane-soluble component in the ethylene/α-olefin block copolymer (Q) is calculated as percentage to the weight of the polymer sample.

The ethylene/α-olefin block copolymer (Q) that is optionally used can be prepared by a hitherto known process.

The ethylene/α-olefin block copolymer (Q) is desirably used in an amount of usually 0 to 40% by weight, preferably 0 to 35% by weight, based on 100 parts by weight of the soft syndiotactic polypropylene composition. When the ethylene/α-olefin block copolymer (Q) is used in this amount, a composition capable of producing molded products having a good balance among rigidity, hardness, transparency and impact resistance is obtained.

Ethylene/triene Copolymer (R)

The ethylene/triene copolymer (R) that is optionally used in the invention is a random copolymer of ethylene and triene.

Examples of the trienes include non-conjugated trienes, such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene; and conjugated trienes, such as 1,3,5-hexatriene. These trienes can be used singly or in combination of two or more kinds.

The above trienes can be prepared by hitherto known processes such as those described in EP0691354A1 and WO96/20150.

In the ethylene/triene copolymer (R), constituent units derived from triene are desirably contained in amounts of usually 0.1 to 30% by mol, preferably 0.1 to 20% by mol, more preferably 0.5 to 15% by mol. The ethylene/triene copolymer (R) desirably has an iodine value of usually 1 to 200, preferably 1 to 100, more preferably 1 to 50.

The ethylene/triene copolymer (R) desirably has an intrinsic viscosity (η), as measured in decahydronaphthalene at 135° C., of 0.01 to 10 dl/g, preferably 0.05 to 10 dl/g, more preferably 0.1 to 10 dl/g.

The ethylene/triene copolymer (R) can be prepared by a hitherto known process.

The ethylene/triene copolymer (R) is desirably used in an amount of usually 0 to 40% by weight, preferably 0 to 35% by weight, based on 100 parts by weight of the soft syndiotactic polypropylene composition. When the ethylene/triene copolymer (R) is used in this amount, a composition capable of producing molded products having a good balance among rigidity, hardness, transparency and impact resistance is obtained.

Soft Syndiotactic Polypropylene Composition (2)

The soft syndiotactic polypropylene composition (2) of the invention comprises a specific syndiotactic propylene polymer (A), a specific α-olefin polymer (B), a specific isotactic propylene polymer (E), and optionally, a crystal nucleating agent (C) and/or an ethylene-based polymer (D).

The syndiotactic propylene polymer (A), the α-olefin polymer (B), the crystal nucleating agent (C) and the ethylene-based polymer (D) for forming the soft syndiotactic polypropylene composition (2) are the same as the aforesaid components (A), (B), (C) and (D) used for forming the soft syndiotactic polypropylene composition (1).

(E) Isotactic Propylene Polymer

The isotactic propylene polymer (E) is a homopolymer of propylene or a propylene random copolymer obtained from propylene and at least one olefin selected from ethylene and α-olefins of 4 to 20 carbon atoms. The isotactic propylene polymer (E) comprises recurring units ($U_{pr}$) derived from propylene, and optionally, recurring units ($U_{et}$) derived from ethylene and/or recurring units ($U_{ol}$) derived from an α-olefin of 4 to 20 carbon atoms, and contains the recurring units ($U_{pr}$) in amounts of 90 to 100% by mol, preferably 90 to 99% by mol, more preferably 92 to 98% by mol, the recurring units ($U_{et}$) in amounts of 0 to 10% by mol, preferably 0.5 to 9% by mol, more preferably 1.5 to 8% by mol, and the recurring units ($U_{ol}$) in amounts of 0 to 9.5% by mol, preferably 0 to 8.5% by mol, more preferably 0 to 7% by mol.

Examples of the α-olefins of 4 to 20 carbon atoms include 1-butene, 1-pentene, 1-hexene, 1-octene, 4-methyl-1-pentene, 3-methyl-1-pentene, 1-decene, 1-dodecene, 1-tetradecene, 1-hexadecene, 1-octadecene and 1-eicosene. Of these 1-butene is preferable.

The isotactic propylene polymer (E) desirably has an intrinsic viscosity (η), as measured in decalin at 135° C., of 0.5 to 6 dl/g, preferably 1.0 to 4 dl/g. When the intrinsic viscosity (η) is in the above range, the isotactic propylene polymer (E) exhibits good flowability and is readily blended with other components, and from the resulting composition, molded products having excellent mechanical strength tend to be obtained.

The melting point (Tm (° C.)) of the isotactic propylene polymer (E), as measured by a scanning calorimeter (DSC), is desired to be in the following range:

$70<Tm<155-5.5(100-P)$ preferably $90<Tm<155-5.5(100-P)$, more preferably $100<Tm<155-5.5(100-P)$ wherein P is a propylene unit content (% by mol) in the polymer.

When the melting point (Tm) is in the above range, the transparency and the blocking resistance tend to be excellent.

The propylene units to constitute the isotactic propylene polymer (E) for use in the invention have a substantially isotactic structure, and the microisotacticity of the polymer (E), that is based on triad sequences of the propylene units, is not less than 0.8, preferably not less than 0.85. When the microisotacticity is in the above range, the crystallizing rate is increased and the processability becomes excellent. By the expression "have a substantially isotactic structure" used in this specification is meant that the isotacticity based on triad sequences of the propylene units is not less than 0.8.

The microisotacticity based on the triad sequences of the propylene units is described below.

The triad isotacticity (sometimes referred to as "mm fraction" hereinafter) of the isotactic propylene polymer (E) is determined by a $^{13}$C-NMR spectrum of the polymer (E) and the following formula (2), and is obtained as an intensity (area) ratio of a side chain methyl group of the second unit in the head-to-tail linked triad sequence portion.

$$mm\ \text{fraction}=PPP(mm)/(PPP(mm)+PPP(mr)+PPP(rr)) \quad (2)$$

wherein PPP(mm), PPP(mr) and PPP(rr) have the same meanings as those of PPP(mm), PPP(mr) and PPP(rr) in the aforesaid formula (1).

Process for Preparing Polymer (E)

In the process for preparing of such an isotactic propylene polymer (E), for example, a conventionally known titanium catalyst or metallocene catalyst (2) can be used as a catalyst.

As the metallocene catalyst (2), for example, employable is a catalyst comprising (a2) a transition metal compound represented by the following formula (V) and (b) at least one compound selected from the group consisting of (b-1) a compound which reacts with the transition metal compound (a2) to form an ion pair (b-2) an organoaluminum oxy-compound, and (b-3) an organoaluminum compound.

The transition metal compound (a2) is represented by the following formula (V).

(V)

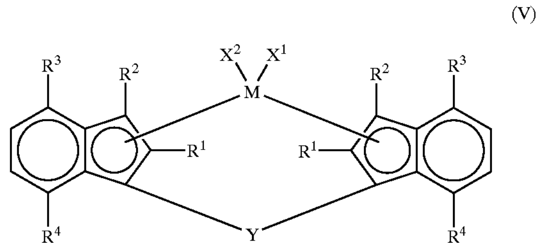

In the formula, M is a transition metal of the Group 4 to 6 of the periodic table, and concretely titanium, zirconium, hafnium, vanadium, niobium, tantalum, chromium, molybdenum and tungsten. Of these, preferable are titanium, zirconium and hafnium, and particularly preferable is zirconium.

$R^1$ and $R^2$ may be the same or different, and are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group and a phosphorus-containing group.

Concretely there can be mentioned the halogen atom such as fluorine, chlorine, bromine and iodine;

the hydrocarbon groups of 1 to 20 carbon atoms such as alkyl groups, e.g., methyl, ethyl, propyl, butyl, hexyl, cyclohexyl, octyl, nonyl, dodecyl, eicosyl, norbornyl and adamantyl; alkenyl groups, e.g., vinyl, propenyl and cyclohexenyl; arylalkyl groups, e.g., benzyl, phenylethyl and phenylpropyl; and aryl groups, e.g., phenyl, tolyl, dimethylphenyl, trimethylphenyl, ethylphenyl, propylphenyl, biphenyl, naphthyl, methylnaphthyl, anthryl and phenanthryl;

the halogenated hydrocarbon groups in which the above hydrocarbon group is substituted with a halogen atom;

the silicon-containing groups such as mono-hydrocarbon substituted silyl groups, e.g., methylsilyl and phenylsilyl; di-hydrocarbon substituted silyl groups, e.g., dimethylsilyl and diphenylsilyl; tri-hydrocarbon substituted silyl groups, e.g., trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of a hydrocarbon substituted silyl, e.g., trimethylsilyl ether; silicon substituted alkyl groups, e.g., trimethylsilylmethyl; and silicon substituted aryl groups, e.g., trimethylphenyl;

the oxygen-containing groups such as a hydroxyl group; alkoxy groups, e.g., methoxy, ethoxy, propoxy and butoxy; aryloxy groups, e.g., phenoxy, methylphenoxy, dimethylphenoxy and naphthoxy; and arylalkoxy groups, e.g., phenylmethoxy and phenylethoxy;

the sulfur-containing groups in which oxygen in the above oxygen-containing group is substituted with sulfur;

the nitrogen-containing groups such as an amino group; alkylamino groups, e.g., methylamino, dimethylamino, diethylamino, dipropylamino, dibutylamino and dicyclohexylamino; and arylamino or alkylarylamino groups, e.g., phenylamino, diphenylamino, ditolylamino, dinaphthylamino and methylphenylamino; and the phosphorus-containing groups such as phosphino groups, e.g., dimethylphosphino and diphenylphosphino.

Of these, $R^1$ is preferably a hydrogen atom, a methyl group, a hydrocarbon group of 2 to 6 carbon atoms and an aromatic group and particularly preferable are a methyl group and a hydrocarbon group of 2 to 6 carbon atoms.

Of these, $R^2$ is preferably a hydrogen atom and a hydrocarbon group and particularly preferable is a hydrogen atom.

$R^3$ is a hydrocarbon group of 1 to 20 carbon atoms or a group where the hydrocarbon group may be substituted with a halogen atom or a silicon-containing group, and of these, desirable is a secondary or tertiary alkyl group of 3 to 20 carbon atoms or an aromatic group.

Examples of a secondary or tertiary alkyl groups include i-propyl, i-butyl, sec-butyl, tert-butyl, 1,2-dimethylpropyl, 2,3-dimethylbutyl, iso-pentyl, tert-pentyl, neopentyl, cyclopentyl, cyclohexyl, 4-methylcyclohexyl, iso-hexyl, norbornyl and adamantyl.

And examples of an aromatic groups include aryl groups such as phenyl, tolyl, dimethylphenyl, trimethylphenyl, ethylphenyl, propylphenyl, biphenyl, α- or β-naphthyl, methylnaphthyl, anthryl, phenanthryl, benzylphenyl, pyrenyl, acenaphthyl, phenalenyl, aceanthrylenyl, tetrahydronaphthyl, indanyl and biphenyl; and arylalkyl groups such as benzyl, phenylethyl, phenylpropyl and tolylmethyl, and these may contain a double bond and a triple bond.

These groups may be substituted with the halogen atom or silicon-containing group, as defined in $R^1$.

$R^4$ is a hydrogen atom or an alkyl group of 1 to 20 carbon atoms.

Examples of alkyl groups include straight-chain alkyl groups and cyclic alkyl groups such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl.

These groups may be substituted with the halogen atom or silicon-containing group, as defined in $R^1$.

$X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group and a sulfur-containing group.

Specifically, examples of the halogen atom, oxygen-containing group, hydrocarbon group of 1 to 20 carbon atoms and halogenated hydrocarbon group of 1 to 20 carbon atoms are the same as those defined in $R^1$.

Employable as the sulfur-containing group are those defined in $R^1$, and further sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinate groups such as methylsulfinate, phenylsulfinate, benzenesulfinate, p-toluenesulfinate, trimethylbenzenesulfinate and pentafluorobenzenesulfinate.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —$SO_2$—, —$NR^5$—, —$P(R^5)$—, —$P(O)(R^5)$—, —$BR^5$— or —$AlR^5$—, wherein $R^5$ is a hydrogen atom, a halogen atom, a hydrocarbon group of 1 to 20 carbon atoms and a halogenated hydrocarbon group of 1 to 20 carbon atoms.

Concretely, there can be mentioned divalent hydrocarbon groups of 1 to 20 carbon atoms such as alkylene groups, e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene and arylalkylene groups, e.g., diphenylmethylene and diphenyl-1,2-ethylene;

divalent halogenated hydrocarbon groups of 1 to 20 carbon atoms such as chloromethylene and the like;

divalent silicon-containing groups include alkylsilylene, alkylarylsilylene and arylsilylene groups, e.g., methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene and alkyldisilyl, alkylaryldisilyl, and arylsilyl groups, e.g., tetramethyl-1,2-disilyl and tetraphenyl-1,2-disilyl;

divalent germanium-containing groups where silicon in the divalent silicon-containing group is substituted with germanium; and divalent tin-containing groups where silicon in the divalent silicon-containing group is substituted with tin.

$R^5$ is a halogen atom, a hydrocarbon group of 1 to 20 carbon atoms and a halogenated hydrocarbon group of 1 to 20 carbon atoms which are the same as previously described with respect to $R^1$.

Of these, preferable are divalent silicon-containing groups, divalent germanium-containing groups and divalent tin-containing groups. More preferable are divalent silicon-containing groups, and particularly preferable examples include alkylsilylene, alkylarylsilylene and arylsilylene.

Specific examples of transition metal compounds represented by the formula (V) include rac-dimethylsilylene-bis(1-(2,7-dimethyl-4-ethylindenyl))zirconium dichloride, rac-dimethylsilylene-bis(1-(2,7-dimethyl-4-n-propylindenyl))zirconium dichloride, rac-dimethylsilylene-bis(1-(2,7-dimethyl-4-i-propylindenyl))zirconium dichloride, rac-dimethylsilylene-bis(1-(2,7-dimethyl-4-n-butylindenyl))zirconium dichloride, rac-dimethylsilylene-bis(1-(2,7-dimethyl-4-sec-butylindenyl))zirconium dichloride, rac-dimethylsilylene-bis(1-(2,7-dimethyl-4-t-butylindenyl))zirconium dichloride, rac-dimethylsilylene-bis(1-(2,7-dimethyl-4-n-pentylindenyl))zirconium dichloride, rac-dimethylsilylene-bis(1-(2,7-dimethyl-4-n-hexylindenyl))zirconium dichloride, rac-dimethylsilylene-bis(1-(2,7-dimethyl-4-cyclohexylindenyl))zirconium dichloride, rac-dimethylsilylene-bis(1-(2,7-dimethyl-4-methylcyclohexylindenyl))zirconium dichloride, rac-dimethylsilylene-bis(1-(2,7-dimethyl-4-phenylethylindenyl))zirconium dichloride, rac-dimethylsilylene-bis(1-(2,7-dimethyl-4-phenyldichloromethylindenyl))zirconium dichloride, rac-dimethylsilylene-bis(1-(2,7-dimethyl-4-chloromethylindenyl))zirconium dichloride, rac-dimethylsilylene-bis(1-(2,7-dimethyl-4-trimethylsilylenemethylindenyl))zirconium dichloride, rac-dimethylsilylene-bis(1-(2,7-dimethyl-4-trimethylsiloxymethylindenyl))zirconium dichloride, rac-diethylsilylene-bis(1-(2,7-dimethyl-4-i-propylindenyl)) zirconium dichloride, rac-di(i-propyl)silylenebis(1-(2,7-dimethyl-4-i-propylindenyl))zirconium dichloride, rac-di(n-butyl)silylene-bis(1-(2,7-dimethyl-4-i-propylindenyl))zirconium dichloride, rac-di(cyclohexyl)silylenebis(1-(2,7-dimethyl-4-i-propylindenyl))zirconium dichloride, rac-methylphenylsilylenebis(1-(2,7-dimethyl-4-i-propylindenyl))zirconium dichloride, rac-methylphenylsilylenebis(1-(2,7-dimethyl-4-t-butylindenyl))zirconium dichloride, rac-diphenylsilylenebis(1-(2,7-dimethyl-4-t-butylindenyl)) zirconium dichloride, rac-diphenylsilylenebis(1-(2,7-dimethyl-4-i-propylindenyl))zirconium dichloride, rac-diphenylsilylenebis(1-(2,7-dimethyl-4-ethylindenyl)) zirconium dichloride, rac-di(p-tolyl)silylenebis(1-(2,7-dimethyl-4-i-propylindenyl))zirconium dichloride, rac-di(p-chlorophenyl)silylenebis(1-(2,7-dimethyl-4-i-propylindenyl))zirconium dichloride, rac-dimethylsilylenebis(1-(2-methyl-4-i-propyl-7-ethylindenyl))zirconium dibromide, rac-dimethylsilylene-bis(1-(2,7-dimethyl-4-i-propyl-1-indenyl))zirconium dimethyl, rac-dimethylsilylene-bis(1-(2,7-dimethyl-4-i-propyl-1-indenyl))zirconium methylchloride, rac-dimethylsilylene-bis(1-(2,7-dimethyl-4-i-propyl-1-indenyl))zirconium-bis(1-(trifluoromethanesulfonato)), rac-dimethylsilylene-bis(1-(2,7-dimethyl-4-i-propyl-1-indenyl))zirconium-bis(1-(p-phenylsulfinato)) and rac-dimethylsilylene-bis(1-(2-phenyl-4-i-propyl-7-methyl-1-indenyl))zirconium dichloride.

In the present invention, of the transition metal compounds represented by the formula (V), preferably employable is a transition metal compound represented by the following formula (VI), (VI)

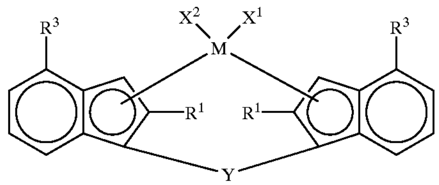

wherein M, $X^1$, $X^2$, $R^1$, $R^3$ and Y are each the same as those defined in M, $X^1$, $X^2$, $R^1$, $R^3$ and Y in the formula (V), and preferably $R^1$ is a hydrogen atom, a methyl group and an aromatic group.

Preferable examples of the transition metal compounds represented by the general formula (VI) include rac-dimethylsilylene-bis(1-(4-phenyl-1-indenyl))zirconium dichloride, rac-dimethylsilylene-bis(1-(2-methyl-4-phenylindenyl)) zirconium dichloride, rac-dimethylsilylene-bis(1-(2-methyl-4-(α-naphthyl) indenyl))zirconium dichloride, rac-dimethylsilylene-bis(1-(2-methyl-4-(β-naphthyl) indenyl))zirconium dichloride, rac-dimethylsilylene-bis(1-(2-methyl-4-(1 -anthryl) indenyl))zirconium dichloride, rac-dimethylsilylene-bis(1-(2-methyl-4-(2-anthryl)indenyl)) zirconium dichloride, rac-dimethylsilylene-bis(1-(2-methyl-4-(9-anthryl)indenyl)) zirconium dichloride, rac-dimethylsilylene-bis(1-(2-methyl-4-(9-phenanthryl) indenyl))zirconium dichloride, rac-dimethylsilylene-bis(1-(2-methyl-4-(p-fluorophenyl) indenyl))zirconium dichloride, rac-dimethylsilylene-bis(1-(2-methyl-4-(pentafluorophenyl) indenyl))zirconium dichloride, rac-dimethylsilylene-bis(1-(2-methyl-4-(p-chlorophenyl) indenyl))zirconium dichloride, rac-dimethylsilylene-bis(1-(2-methyl-4-(m-chlorophenyl) indenyl))zirconium dichloride, rac-dimethylsilylene-bis(1-(2-methyl-4-(o-chlorophenyl) indenyl))zirconium dichloride, rac-dimethylsilylene-bis(1-(2-methyl-4-(o,p-dichlorophenyl)phenyl-1-indenyl))zirconium dichloride, rac-dimethylsilylene-bis(1-(2-methyl-4-(p-bromophenyl) indenyl))zirconium dichloride, rac-dimethylsilylene-bis(1-(2-methyl-4-(p-tolyl)-1-indenyl))zirconium dichloride, rac-dimethylsilylene-bis (1-(2-methyl-4-(m-tolyl)-1-indenyl))zirconium dichloride, rac-dimethylsilylene-bis(1-(2-methyl-4-(o-tolyl)-1-indenyl))zirconium dichloride, rac-dimethylsilylene-bis(1-(2-methyl-4-(o,o'-dimethylphenyl)-1-indenyl))zirconium dichloride, rac-dimethylsilylene-bis(1-(2-methyl-4-(p-ethylphenyl) indenyl))zirconium dichloride, rac-dimethylsilylene-bis(1-(2-methyl-4-(p-1-propylphenyl) indenyl))zirconium dichloride, rac-dimethylsilylene-bis(1-(2-methyl-4-(p-benzylphenyl) indenyl))zirconium dichloride, rac-dimethylsilylene-bis(1-(2-methyl-4-(p-biphenylyl) indenyl))zirconium dichloride, rac-dimethylsilylene-bis(1-(2-methyl-4-(m-biphenylyl) indenyl))zirconium dichloride, rac-dimethylsilylene-bis(1-(2-methyl-4-(p-trimethylsilylenephenyl)indenyl))zirconium dichloride, rac-dimethylsilylene-bis(1-(2-methyl-4-(m-trimethylsilylenephenyl)-1-indenyl))zirconium dichloride, rac-dimethylsilylene-bis(2-phenyl-4-phenylindenyl)) zirconium dichloride, rac-dimethylsilylene-bis(1-(2-methyl-4-phenylindenyl)) zirconium dichloride, rac-di(i-propyl)silylene-bis(1-(2-methyl-4-phenylindenyl)) zirconium dichloride, rac-di(n-butyl)silylene-bis(1-(2-methyl-4-phenylindenyl)) zirconium dichloride, rac-dicyclohexylsilylene-bis(1-(2-methyl-4-phenylindenyl)) zirconium dichloride, rac-methylphenylsilylene-bis(1-(2-methyl-4-phenylindenyl))zirconium dichloride, rac-diphenylsilylene-bis(1-(2-methyl-4-phenylindenyl)) zirconium dichloride, rac-di(p-tolyl)silylene-bis(1-(2-methyl-4-phenylindenyl)) zirconium dichloride, rac-di(p-chlorophenyl)silylene-bis(1-(2-methyl-4-phenylindenyl))zirconium dichloride, rac-methylene-bis(1-(2-methyl-4-phenylindenyl))zirconium dichloride, rac-ethylene-bis(1-(2-methyl-4-phenylindenyl))zirconium dichloride, rac-dimethylgermylene-bis(1-(2-methyl-4-phenylindenyl)) zirconium dichloride, rac-dimethylstannylene-bis(1-(2-methyl-4-phenylindenyl)) zirconium dichloride, rac-dimethylsilylene-bis(1-(2-methyl-4-phenylindenyl)) zirconium dibromide, rac-dimethylsilylene-bis(1-(2-methyl-4-phenylindenyl)) zirconium dimethyl, rac-dimethylsilylene-bis(1-(2-methyl-4-phenylindenyl)) zirconium methylchloride, rac-dimethylsilylene-bis(1-(2-methyl-4-phenylindenyl)) zirconium chloride $SO_2Me$, rac-dimethylsilylene-bis(1-(2-methyl-4-phenylindenyl)) zirconium chloride $OSO_2Me$, rac-dimethylsilylene-bis(1-(2-methyl-4-phenylindenyl)) titanium dichloride and rac-dimethylsilylene-bis(1-(2-methyl-4-phenylindenyl)) hafnium dichloride.

Of these, preferable is a compound where $R^1$ is a methyl group.

Further, a transition metal compound represented by the formula (VI) in which $R^1$ is a hydrocarbon group of 2 to 6 carbon atoms and $R^3$ is an aryl group of 6 to 16 carbon atoms is also preferably used. Examples of the preferable compounds include rac-dimethylsilylene-bis(1-(2-ethyl-4-phenylindenyl)) zirconium dichloride, rac-dimethylsilylene-bis(1-(2-ethyl-4-(α-naphthyl) indenyl))zirconium dichloride, rac-dimethylsilylene-bis(1-(2-ethyl-4-(β-naphthyl)indenyl)) zirconium dichloride, rac-dimethylsilylene-bis(1-(2-ethyl-4-(2-methyl-1-naphthyl)indenyl))zirconium dichloride, rac-dimethylsilylene-bis(1-(2-ethyl-4-(5-acenaphthyl) indenyl))zirconium dichloride, rac-dimethylsilylene-bis(1-(2-ethyl-4-(9-anthryl)indenyl)) zirconium dichloride, rac-dimethylsilylene-bis(1-(2-ethyl-4-(9-phenanthryl) indenyl))zirconium dichloride, rac-dimethylsilylene-bis(1-(2-ethyl-4-(o-methylphenyl) indenyl))zirconium dichloride, rac-dimethylsilylene-bis(1-(2-ethyl-4-(m-methylphenyl) indenyl))zirconium dichloride, rac-dimethylsilylene-bis(1-(2-ethyl-4-(p-methylphenyl) indenyl))zirconium dichloride, rac-dimethylsilylene-bis(1-(2-ethyl-4-(2,3-dimethylphenyl) indenyl))zirconium dichloride, rac-dimethylsilylene-bis(1-(2-ethyl-4-(2,4-dimethylphenyl) indenyl))zirconium dichloride, rac-dimethylsilylene-bis(1-(2-ethyl-4-(2,5-dimethylphenyl) indenyl))zirconium dichloride, rac-dimethylsilylene-bis(1-(2-ethyl-4-(2,4,6-trimethylphenyl)indenyl))zirconium dichloride, rac-dimethylsilylene-bis(1-(2-ethyl-4-(o-chlorophenyl) indenyl))zirconium dichloride, rac-dimethylsilylene-bis(1-(2-ethyl-4-(m-chlorophenyl) indenyl))zirconium dichloride, rac-dimethylsilylene-bis(1-(2-ethyl-4-(p-chlorophenyl) indenyl))zirconium dichloride, rac-dimethylsilylene-bis(1-(2-ethyl-4-(2,3-dichlorophenyl) indenyl))zirconium dichloride, rac-dimethylsilylene-bis(1-(2-ethyl-4-(2,6-dichlorophenyl) indenyl))zirconium dichloride, rac-dimethylsilylene-bis (1-(2-ethyl-4-(3,5-dichlorophenyl) indenyl))zirconium dichloride, rac-dimethylsilylene-bis(1-(2-ethyl-4-(2-bromophenyl) indenyl))zirconium dichloride, rac-dimethylsilylene-bis(1-(2-ethyl-4-(3-bromophenyl) indenyl))zirconium dichloride, rac-dimethylsilylene-bis(1-(2-ethyl-4-(4-bromophenyl) indenyl))zirconium dichloride, rac-dimethylsilylene-bis(1-(2-ethyl-4-(4-biphenylyl) indenyl))zirconium dichloride, rac-dimethylsilylene-bis(1-(2-ethyl-4-(4-trimethylsilylenephenyl)indenyl))zirconium dichloride, rac-dimethylsilylene-bis(1-(2-n-propyl-4-phenylindenyl)) zirconium dichloride, rac-dimethylsilylene-bis(1-(2-n-propyl-4-(α-naphthyl) indenyl))zirconium dichloride, rac-dimethylsilylene-bis(1-(2-n-propyl-4-(β-naphthyl) indenyl))zirconium dichloride, rac-dimethylsilylene-bis(1-(2-n-propyl-4-(2-methyl-1-naphthyl)indenyl))zirconium dichloride, rac-dimethylsilylene-bis(1-(2-n-propyl-4-(5-acenaphthyl) indenyl))zirconium dichloride, rac-dimethylsilylene-bis(1-(2-n-propyl-4-(9-anthryl) indenyl))zirconium dichloride, rac-dimethylsilylene-bis(1-(2-n-propyl-4-(9-phenanthryl) indenyl))zirconium dichloride, rac-dimethylsilylene-bis(1-(2-1-propyl-4-phenylindenyl)) zirconium dichloride, rac-dimethylsilylene-bis(1-(2-1-propyl-4-(α-naphthyl) indenyl))zirconium dichloride, rac-dimethylsilylene-bis(1-(2-1-propyl-4-(β-naphthyl) indenyl))zirconium dichloride, rac-dimethylsilylene-bis(1-(2-1-propyl-4-(2-methyl-1-naphthyl)indenyl))zirconium dichloride, rac-dimethylsilylene-bis(1-(2-1-propyl-4-(5-acenaphthyl) indenyl))zirconium dichloride, rac-dimethylsilylene-bis(1-(2-1-propyl-4-(9-anthryl) indenyl))zirconium dichloride, rac-dimethylsilylene-bis(1-(2-1-propyl-4-(9-phenanthryl) indenyl))zirconium dichloride, rac-dimethylsilylene-bis(1-(2-s-butyl-4-phenylindenyl)) zirconium dichloride, rac-dimethylsilylene-bis(1-(2-s-butyl-4-(α-naphthyl) indenyl))zirconium dichloride, rac-dimethylsilylene-bis(1-(2-s-butyl-4-(β-naphthyl) indenyl))zirconium dichloride, rac-dimethylsilylene-bis(1-(2-s-butyl-4-(8-methyl-9-naphthyl)indenyl))zirconium dichloride, rac-dimethylsilylene-bis(1-(2-s-butyl-4-(5-acenaphthyl) indenyl))zirconium dichloride, rac-dimethylsilylene-bis(1-(2-s-butyl-4-(9-anthryl)indenyl)) zirconium dichloride, rac-dimethylsilylene-bis(1-(2-s-butyl-4-(9-phenanthryl) indenyl))zirconium dichloride, rac-dimethylsilylene-bis(1-(2-n-pentyl-4-phenylindenyl)) zirconium dichloride, rac-dimethylsilylene-bis(1-(2-n-pentyl-4-(α-naphthyl) indenyl))zirconium dichloride, rac-dimethylsilylene-bis(1-(2-n-butyl-4-phenylindenyl)) zirconium dichloride, rac-dimethylsilylene-bis(1-(2-n-butyl-4-(α-naphthyl) indenyl))zirconium dichloride, rac-dimethylsilylene-bis(1-(2-n-butyl-4-(β-naphthyl) indenyl))zirconium dichloride, rac-dimethylsilylene-bis(1-(2-n-butyl-4-(2-methyl-1-naphthyl)indenyl))zirconium dichloride, rac-dimethylsilylene-bis(1-(2-n-butyl-4-(5-acenaphthyl) indenyl))zirconium dichloride, rac-dimethylsilylene-bis(1-(2-n-butyl-4-(9-anthryl) indenyl))zirconium dichloride, rac-dimethylsilylene-bis(1-(2-n-butyl-4-(9-phenanthryl) indenyl))zirconium dichloride, rac-dimethylsilylene-bis(1-(2-1-butyl-4-phenylindenyl)) zirconium dichloride, rac-dimethylsilylene-bis(1-(2-1-butyl-4-(α-naphthyl) indenyl))zirconium dichloride, rac-dimethylsilylene-bis(1-(2-1-butyl-4-(β-naphthyl) indenyl))zirconium dichloride, rac-dimethylsilylene-bis(1-(2-1-butyl-4-(2-methyl-1-naphthyl)indenyl))zirconium dichloride, rac-dimethylsilylene-bis(1-(2-1-butyl-4-(5-acenaphthyl) indenyl))zirconium dichloride, rac-dimethylsilylene-bis(1-(2-1-butyl-4-(9-anthryl) indenyl))zirconium dichloride, rac-dimethylsilylene-bis(1-(2-1-butyl-4-(9-phenanthryl) indenyl))zirconium dichloride, rac-dimethylsilylene-bis(1-(2-neopentyl-4-phenylindenyl)) zirconium dichloride, rac-dimethylsilylene-bis(1-(2-neopentyl-4-(α-naphthyl) indenyl))zirconium dichloride, rac-dimethylsilylene-bis(1-(2-n-hexyl-4-phenylindenyl)) zirconium dichloride, rac-dimethylsilylene-bis(1-(2-n-hexyl-4-(α-naphthyl) indenyl))zirconium dichloride, rac-methylphenylsilylene-bis(1-(2-ethyl-4-phenylindenyl)) zirconium dichloride, rac-methylphenylsilylene-bis(1-(2-ethyl-4-(α-naphthyl) indenyl))zirconium dichloride, rac-methylphenylsilylene-bis(1-(2-ethyl-4-(9-anthryl) indenyl))zirconium dichloride, rac-methylphenylsilylene-bis(1-(2-ethyl-4-(9-phenanthryl) indenyl))zirconium dichloride, rac-diphenylsilylene-bis(1-(2-ethyl-4-phenylindenyl)) zirconium dichloride, rac-diphenylsilylene-bis(1-(2-ethyl-4-(α-naphthyl)indenyl)) zirconium dichloride, rac-diphenylsilylene-bis(1-(2-ethyl-4-(9-anthryl)indenyl)) zirconium dichloride, rac-diphenylsilylene-bis(1-(2-ethyl-4-(9-phenanthryl) indenyl))zirconium dichloride, rac-diphenylsilylene-bis(1-(2-ethyl-4-(4-biphenylyl) indenyl))zirconium dichloride, rac-methylene-bis(1-(2-ethyl-4-phenylindenyl))zirconium dichloride, rac-methylene-bis(1-(2-ethyl-4-(α-naphthyl)indenyl)) zirconium dichloride, rac-ethylene-bis(1-(2-ethyl-4-phenylindenyl))zirconium dichloride, rac-ethylene-bis(1-(2-ethyl-4-(α-naphthyl)indenyl)) zirconium dichloride, rac-ethylene-bis(1-(2-n-propyl-4-(α-naphthyl)indenyl)) zirconium dichloride, rac-dimethylgermylene-bis(1-(2-ethyl-4-phenylindenyl)) zirconium dichloride, rac-dimethylgermylene-bis(1-(2-ethyl-4-(α-naphthyl) indenyl))zirconium dichloride, rac-dimethylgermylene-bis(1-(2-n-propyl-4-phenylindenyl))zirconium dichloride, rac-dimethylstannylene-bis(1-(2-ethyl-4-phenylindenyl)) zirconium dichloride, rac-dimethylstannylene-bis(1-(2-ethyl-4-(α-naphthyl) indenyl))zirconium dichloride, rac-dimethylstannylene-bis(1-(2-n-ethyl-4-(9-phenanthryl) indenyl))zirconium dichloride, and rac-dimethylstannylene-bis(1-(2-n-propyl-4-phenylindenyl))zirconium dichloride.

In the present invention, transition metal compounds wherein the zirconium metal is replaced with a titanium metal, a hafnium metal, a vanadium metal, a niobium metal, a tantalum metal, a chromium metal, a molybdenum metal or a tungsten metal in the above compounds are also employable.

The transition metal compound is usually used in the form of a racemic modification as an olefin polymerization compound, but R-form or S-form is also available.

The transition metal compound (a2) represented by the formula (V) can be prepared in accordance with "Journal of Organometallic Chem.", 288 (1985), pp. 63–67 and the specification and the examples of European Patent Laid-Open Publication No. 0,320,762.

As the compound (b-1) which forms an ion pair by the reaction with the transition metal compound (a2) for forming the metallocene catalyst that is used for preparing the isotactic propylene polymer (E), the same compound as the compound (b-1) for forming the metallocene catalyst (1) is employable. As the organoaluminum oxy-compound (b-2) and the organoaluminum compound (b-2), the same compounds as the organoaluminum oxy-compound (b-2) and the organoaluminum compound (b-2) for forming the metallocene catalyst (1) are employable.

The metallocene catalyst (2) that is used for preparing the isotactic propylene polymer (E) can be prepared by mixing the component (a2) with the component (b) in an inert hydrocarbon solvent or an olefin solvent.

Examples of the inert hydrocarbon solvents used in the preparation of the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures thereof.

In the preparation of the catalyst from the above components, the components can be contacted in any order, but preferable is:

- to contact the component (a2) with the component (b-2) (or the component (b-1)),
- to contact the component (b-2) with the component (b-3) and then with the component (a2),
- to contact the component (a2) with the component (b-2) (or the component (b-1)) and then with the component (b-3), or
- to contact the component (a2) with the component (b-3) and then with the component (b-2) (or the component (b-1)).

In the contact of the above components, the transition metal compound (a2) is used in an amount of about $10^{-8}$ to $10^{-1}$ mol/liter-polymerization volume, preferably $10^{-7}$ to $5\times10^{-2}$ mol/liter.

When the component (b-1) is adopted, the component (b-1) is used in such an amount that the molar ratio ((a2)/(b-1)) of the component (a2) to the component (b-1) becomes usually 0.01 to 10, preferably 0.1 to 5.

The component (b-2) is used in such an amount that the molar ratio (Al/transition metal) of the aluminum atom in the component (b-2) to the transition metal in the component (a2) becomes 10 to 10000, preferably 20 to 5000.

The component (b-3) is used in such an amount that the atomic ratio ($Al_{b-3}$/Alb-2) of the aluminum atom ($Al_{b-3}$) in the component (b-3) to the aluminum atom ($Al_{b-2}$) in the component (b-2) becomes usually 0.02 to 20, preferably 0.2 to 10.

The catalyst components may be mixed in a polymerization reactor to contact them, or they may be previously contacted and then fed to a polymerization reactor.

The previous contact is carried out at a temperature of usually −50 to 150° c., preferably −20 to 120° C., for 1 to 1000 minutes, preferably 5 to 600 minutes. In the contact process, the contact temperature may be changed.

In the preparation of the metallocene catalyst (2), at least one of the component (a2) and the component (b) may be supported on a particulate carrier in the form of grain or fine particle to form a solid catalyst.

Examples of the particulate carriers include those exemplified as the inorganic and organic carriers which may be used for the metallocene catalyst (1).

Onto the metallocene catalyst (2) for use in the invention, an olefin, such as propylene, ethylene or 1-butene, or a mixture of the olefin and other olefins may be prepolymerized.

The metallocene catalyst (2) for use in the invention may contain, in addition to the above components, other components useful for the olefin polymerization, such as water as a catalyst component.

The isotactic propylene polymer (E) for use in the invention can be prepared by homopolymerizing propylene or copolymerizing propylene and at least one olefin selected from ethylene and α-olefins of 4 to 20 carbon atoms in the presence of the metallocene catalyst (2) so as to finally impart the aforesaid properties to the resulting polymer. The polymerization can be carried out as any of liquid phase polymerization such as suspension polymerization or solution polymerization and gas phase polymerization.

In the liquid phase polymerization, the same inert hydrocarbon solvent as used in the preparation of the aforesaid catalyst is employable, or propylene may be used as a solvent.

When the suspension polymerization is adopted, the polymerization is desirably conducted at a temperature of usually −50 to 100° C., preferably 0 to 90° C. When the solution polymerization is adopted, the polymerization is desirably conducted at a temperature of usually 0 to 250° C., preferably 20 to 200° C. When the gas phase polymerization is adopted, the polymerization is desirably conducted at a temperature of usually 0 to 120° C., preferably 20 to 100° C. The polymerization is carried out at a pressure of usually atmospheric pressure to 100 $kg/cm^2$, preferably atmospheric pressure to 50 $kg/cm^2$.

The polymerization can be carried out by any of batchwise, semi-continuous and continuous processes. It is possible to conduct the polymerization in two ore more stages under different reaction conditions.

The molecular weight of the resulting isotactic propylene polymer (E) can be regulated by allowing hydrogen to be present in the polymerization system or changing the reaction conditions such as polymerization temperature and polymerization pressure.

Composition

The soft syndiotactic polypropylene composition (2) of the invention comprises the syndiotactic propylene polymer (A), the α-olefin polymer (B), the isotactic propylene polymer (E), and if necessary, the crystal nucleating agent (C) and/or the ethylene-based polymer (D).

In the soft syndiotactic polypropylene composition (2), the weight ratio (A/E) of the component (A) to the component (E) is desired to be in the range of 99/1 to 1/99, preferably 95/5 to 10/90, more preferably 90/10 to 30/70, and the weight ratio ((A+E)/B) of the total of the components (A) and (E) to the component (B) is desired to be in the range of 90/10 to 10/90, preferably 80/20 to 20/80, more preferably 75/25 to 40/60.

The component (C) is desirably contained in an amount of 0.01 to 1 part by weight, preferably 0.1 to 0.8 part by weight, based on 100 parts by weight of the total of the components (A), (B) and (E).

The component (D) is desirably contained in an amount of 0.01 to 5 parts by weight, preferably 0.01 to 4 parts by weight, more preferably 0.01 to 3 parts by weight, based on 100 parts by weight of the total of the components (A), (B) and (E).

The soft syndiotactic polypropylene composition (2) comprising the components (A), (B) and (E) in the above proportion and optionally further comprising the component (C) and/or the component (D) tends to have a good balance among transparency, flexibility, heat resistance and scratch resistance.

The soft syndiotactic polypropylene composition (2), in a preferred embodiment, comprises the syndiotactic propylene polymer (A), the α-olefin polymer (B), the isotactic propylene polymer (E), and if necessary, the crystal nucleating agent (C).

In this case, the component (C) is desirably contained in an amount of 0.01 to 1 part by weight, preferably 0.1 to 0.8 part by weight, based on 100 parts by weight of the total of the components (A), (B) and (E). As the crystal nucleating agent (C), a sorbitol type compound is preferable.

The soft syndiotactic polypropylene composition (2) comprising the components (A), (B) and (E) in the above proportion and optionally further comprising the component (C) tends to have a good balance among transparency, flexibility, heat resistance and impact resistance. Further, the composition tends to also have excellent heat-sealing properties and impact resistance.

The soft syndiotactic polypropylene composition (2), in another preferred embodiment, comprises the syndiotactic propylene polymer (A), two or more kinds of the α-olefin polymers (B), the isotactic propylene polymer (E), and if necessary, the crystal nucleating agent (C).

In this case, the weight ratio ((A+E)/total of B) of the total of the components (A) and (E) to the total of two or more kinds of the components (B) is desired to be in the range of 90/10 to 10/90, preferably 80/20 to 20/80, more preferably 75/25 to 40/60, and each of the components (B) is desirably contained in an amount of not less than 1% by weight, more preferably not less than 2% by weight, particularly preferably not less than 4% by weight.

The component (C) is desirably contained in an amount of 0.01 to 1 part by weight, preferably 0.1 to 0.8 part by weight, based on 100 parts by weight of the total of the components (A), (B) and (E). As the crystal nucleating agent (C), a sorbitol type compound is preferable.

The soft syndiotactic polypropylene composition comprising the components (A), (B) and (E) in the above proportion tends to have a good balance among transparency, flexibility, heat resistance and scratch resistance. Further, the composition tends to also have excellent heat-sealing properties and impact resistance.

The soft syndiotactic polypropylene composition (2) comprising the components (A), (B) and (E) in the above proportion and optionally further comprising the component (C) tends to have a good balance among transparency, flexibility, heat resistance and scratch resistance. Further, the composition tends to also have excellent heat-sealing properties and impact resistance.

The soft syndiotactic polypropylene composition (2), in another preferred embodiment, comprises the syndiotactic propylene polymer (A), the α-olefin polymer (B), the isotactic propylene polymer (E) and the ethylene-based polymer (D). If the crystal nucleating agent (C) is used in this composition, a crystal nucleating agent, such as the aforesaid aliphatic amide, metallic salt of aromatic carboxylic acid, metallic salt of aliphatic carboxylic acid or fluorine-containing polymer, is employable, and it is preferable to use the aliphatic amide or the fluorine-containing polymer.

The soft syndiotactic polypropylene composition (2) comprising the components (A), (B), (D) and (E) in the above proportion has a good balance among transparency, flexibility, heat resistance and scratch resistance, and shows excellent moldability. Further, the composition tends to also have excellent heat-sealing properties and impact resistance.

The soft syndiotactic polypropylene composition (2) of the invention, in another preferred embodiment, is a composition comprising the syndiotactic propylene polymer (A), the α-olefin polymer (B), the isotactic propylene polymer (E) and the ethylene-based polymer (D), wherein the α-olefin polymer (B) consists of the following syndiotactic-structure propylene/ethylene copolymer (Bl), the following amorphous α-olefin copolymer (B2) and the following ethylene/α-olefin copolymer (B3).

(B1) Syndiotactic-Structure Propylene/Ethylene Copolymer

The syndiotactic-structure propylene/ethylene copolymer (B1) contains propylene units having syndiotactic structure in amounts of not less than 60% by mol and less than 90% by mol, preferably not less than 63% by mol and less than 90% by mol, more preferably not less than 65% by mol and less than 90% by mol, and contains ethylene units in amounts of more than 10% by mol and not more than 40% by mol, preferably more than 10% by mol and not more than 37% by mol, more preferably more than 10% by mol and not more than 35% by mol.

The syndiotactic-structure propylene/ethylene copolymer (B1) containing the ethylene units and the propylene units in the above amounts has good compatibility with the syndiotactic propylene polymer (A), and the resulting soft syndiotactic polypropylene composition (2) tends to exhibit sufficient transparency, flexibility and scratch resistance.

The syndiotactic-structure propylene/ethylene copolymer (B1) desirably has an intrinsic viscosity (η), as measured in decalin at 135° C., of usually 0.01 to 10 dl/g, preferably 0.05 to 10 dl/g. When the intrinsic viscosity (η) of the syndiotactic-structure propylene/ethylene copolymer (B1) is in the above range, this copolymer is excellent in properties such as weathering resistance, ozone resistance, heat aging resistance, low-temperature properties and dynamic fatigue resistance.

The syndiotactic-structure propylene/ethylene copolymer (B1) desirably has a single glass transition temperature, and the glass transition temperature (Tg) as measured by a differential scanning calorimeter (DSC) is desired to be usually not higher than −15° C., preferably not higher than −20° C. When the glass transition temperature (Tg) of the syndiotactic-structure propylene/ethylene copolymer (B1) is in the above range, the resulting soft syndiotactic polypropylene composition (2) has excellent cold temperature resistance and low-temperature properties.

The molecular weight distribution (Mw/Mn, in terms of polystyrene, Mw: weight-average molecular weight, Mn: number-average molecular weight) as measured by GPC is preferably not more than 4.0.

The peak strength of the syndiotactic-structure propylene/ethylene copolymer (B1), that is observed at about 20.2 ppm in $^{13}$C-NMR measured using a 1,2,4-trichlorobenzene solution of the copolymer, is desired to be not less than 0.3, preferably not less than 0.5, particularly preferably not less than 0.6, as a ratio to the strength of the peaks assigned to all the methyl groups of the propylene units. When the peak strength is not less than 0.3, the transparency, scratch resistance and impact resistance become excellent, so that the above range is preferable.

The syndiotactic structure is measured in the following manner.

A sample of 0.35 g is dissolved in 2.0 ml of hexachlorobutadiene under heating. The solution is filtered through a glass filter (G2), then 0.5 ml of deuterobenzene is added, and the mixture is introduced into a NMR tube of 10 mm diameter. Then, measurement of $^{13}$C-NMR is conducted at 120° C. using a Japan Electron Optics Laboratory GX-500 model NMR measuring device. The number of integration times is 10,000 or more.

The syndiotactic-structure propylene/ethylene copolymer (B1) can be prepared by copolymerizing propylene and ethylene in the presence of the metallocene catalyst (1).

In the present invention, the metallocene catalyst (1) is preferably used as a catalyst for preparing the syndiotactic-structure propylene/ethylene copolymer (B1), but catalysts other than the metallocene catalyst (1) are also employable. For example, hitherto known catalysts such as a titanium catalyst comprising a solid titanium catalyst component and an organoaluminum compound and a vanadium catalyst comprising a soluble vanadium compound and an organoaluminum compound are also employable.

The syndiotactic-structure propylene/ethylene copolymer (B1) for use in the invention can be prepared by copolymerizing propylene and ethylene in the presence of preferably the metallocene catalyst (1), usually in a liquid phase. In the copolymerization, a hydrocarbon solvent is generally used, but propylene may be used as a solvent. The copolymerization can be carried out by any of batchwise and continuous processes.

When the copolymerization of propylene and ethylene is carried out by a batchwise process using the metallocene catalyst (1), the transition metal compound (a1) is used in the polymerization system in an amount of usually 0.00005 to 1 mmol, preferably 0.0001 to 0.5 mmol, based on 1 liter of the polymerization volume.

When the ionizing ionic compound (b-1) is used as the component (b), it is desirable to use the ionizing ionic compound (b-1) in such an amount that the molar ratio ((b-1)/(a1)) of the ionizing ionic compound (b-1) to the transition metal compound (al) becomes 0.5 to 20, preferably 1 to 10.

When the organoaluminum oxy-compound (b-2) is used as the component (b), it is desirable to use the organoaluminum oxy-compound (b-2) in such an amount that the molar ratio (Al/M) of the aluminum atom (Al) in the organoaluminum oxy-compound (b-2) to the transition metal atom (M) in the transition metal compound (a1) becomes 1 to 10000, preferably 10 to 5000.

The organoaluminum compound (b-3) is desirably used in an amount of usually about 0 to 5 mmol, preferably about 0 to 2 mmol, based on 1 liter of the polymerization volume.

The copolymerization reaction is carried out under the conditions of a temperature of usually −20 to 150° C., preferably 0 to 120° C., more preferably 0 to 100° C., and a pressure of more than 0 $kg/cm^2$ and not more than 80 $kg/cm^2$, preferably more than 0 $kg/cm^2$ and not more than 50 $kg/cm^2$.

The reaction time (average residence time in case of continuous polymerization) is in the range of usually 5 minutes to 3 hours, preferably 10 minutes to 1.5 hours, though it varies depending upon the conditions such as catalyst concentration and polymerization temperature.

The monomers, i.e., propylene and ethylene, are each fed to the polymerization system in such an amount that the aforesaid syndiotactic-structure propylene/ethylene copolymer (B1) can be obtained. In the copolymerization, a molecular weight modifier such as hydrogen may be used.

Through the above polymerization, the syndiotactic-structure propylene/ethylene copolymer (B1) is obtained usually as a polymer solution containing it. The polymer solution is then treated in a conventional way to obtain the syndiotactic-structure propylene/ethylene copolymer (B1).

(B2) Amorphous α-olefin Copolymer

The amorphous α-olefin copolymer (B2) is a copolymer containing recurring units derived from an α-olefin of 3 to 20 carbon atoms in amounts of not less than 50% by mol, and is preferably a copolymer containing propylene units in amounts of 50 to 99% by mol and recurring units derived from at least one olefin selected from ethylene and α-olefins of 4 to 20 carbon atoms in amounts of 1 to 50% by mol (with the proviso that the total of all recurring units in the copolymer (B2) is 100% by mol).

The amorphous α-olefin copolymer (B2) containing recurring units derived from the α-olefin of 3 to 20 carbon atoms in the above amounts has good compatibility with the syndiotactic propylene polymer (A), and the resulting soft syndiotactic polypropylene composition tends to exhibit sufficient flexibility, impact resistance and heat-sealing properties.

The α-olefin of 3 to 20 carbon atoms used for preparing the amorphous α-olefin copolymer (B2) may be linear or branched.

Examples of the α-olefins of 3 to 20 carbon atoms include propylene, 1-butene, 2-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene. Of these, preferable are propylene, 1-butene, 1-hexene, 1-octene, 1-decene and 4-methyl-1-pentene, and particularly preferable are propylene, 1-butene, 1-hexene, 1-octene and 1-decene. The α-olefins of 3 to 20 carbon atoms may be used singly or in combination of two or more kinds.

In the amorphous α-olefin copolymer (B2), ethylene units, recurring units derived from a polyene unsaturated compound having two or more double bonds and recurring units derived from alcohol, carboxylic acid, amine and derivatives thereof may be contained in addition to the recurring units derived from the α-olefin of 3 to 20 carbon atoms.

Examples of the polyene unsaturated compounds include chain ethylenically unsaturated bond group-containing norbornenes, such as ethylidene norbornene (e.g., 5-ethylidene-2-norbornene) and 5-vinylidene-2-norbornene; chain ethylenically unsaturated compounds, such as butadiene, isoprene, 1,4-hexadiene, 4-ethylidene-1,6-octadiene, 4-ethylidene-8-methyl-1,7-nonadiene (EMND) and 4,8-diemthyl-1,4,8-decatriene; and alicyclic ethylenically unsaturated compounds, such as dicyclopentadiene.

The amorphous α-olefin copolymer (B2) is, for example, one comprising:

- recurring units derived from an α-olefin of 3 to 20 carbon atoms (e.g., propylene units) in amounts of not less than 50% by mol, preferably 50 to 99% by mol,
- ethylene units in amounts of not more than 50% by mol, preferably 1 to 50% by mol, more preferably 1 to 49% by mol, and
- recurring units derived from a polyene unsaturated compound in amounts of 0 to 30% by mol, preferably 0 to 29% by mol (with the proviso that the total of all recurring unit in the copolymer (B2) is 100% by mol).

The amorphous α-olefin copolymer (B2) comprising the various recurring units in the above amounts has good efficiency of crosslinking, and a vulcanized molded product of the soft syndiotactic polypropylene composition (2) containing the copolymer tends to have excellent scratch resistance and oil resistance.

A melting peak of the amorphous α-olefin copolymer (B2) is not substantially observed when measured using a differential scanning calorimeter (DSC). The soft syndiotactic polypropylene composition (2) containing such an amorphous α-olefin copolymer (B2) tends to have excellent flexibility, transparency and impact resistance.

The amorphous α-olefin copolymer (B2) desirably has an iodine value of usually 0 to 150, preferably 0 to 100. When the iodine value of the amorphous α-olefin copolymer (B2) is in the above range, the crosslinking rate in the crosslinking process is high, and the resulting crosslinked product has excellent low-temperature properties.

The amorphous α-olefin copolymer (B2) desirably has an intrinsic viscosity (η), as measured in decalin at 135° C., of usually 0.01 to 10 dl/g, preferably 0.05 to 10 dl/g. When the intrinsic viscosity (η) of the amorphous α-olefin copolymer (B2) is in the above range, the resulting soft syndiotactic polypropylene composition (2) is excellent in properties such as weathering resistance, ozone resistance, heat aging resistance, low-temperature properties and dynamic fatigue resistance.

The amorphous α-olefin copolymer (B2) desirably has a single glass transition temperature, and the glass transition temperature (Tg) as measured by a differential scanning calorimeter (DSC) is desired to be usually not higher than 40° C., preferably not higher than 20° C. When the glass transition temperature (Tg) of the amorphous α-olefin copolymer (B2) is in the above range, this copolymer has excellent low-temperature impact resistance.

The molecular weight distribution (Mw/Mn, in terms of polystyrene, Mw: weight-average molecular weight, Mn: number-average molecular weight) of the amorphous α-olefin copolymer (B2), as measured by GPC, is preferably not more than 4.0, more preferably not more than 3.5.

The amorphous α-olefin copolymer (B2) can be prepared by copolymerizing not less than 50% by mol of an α-olefin of 3 to 20 carbon atoms, preferably an α-olefin of 3 to 12 carbon atoms, particularly preferably propylene; and if necessary, not more than 50% by mol of ethylene.

The amorphous α-olefin copolymer (B2) can be prepared by copolymerizing the above monomers in the presence of the metallocene catalyst (1).

Preparation of the amorphous α-olefin copolymer (B2) can be carried out under the same conditions as previously described in detail in the preparation of the syndiotactic-structure propylene/ethylene copolymer (B1).

(B3) Ethylene/α-olefin Copolymer

The ethylene/α-olefin copolymer (B3) comprises ethylene and at least one monomer selected from the group consisting of α-olefin of 3 to 20 carbon atoms, diene and triene.

Examples of α-olefins of 3 to 20 carbon atoms include propylene, 1-butene, 1-hexene, 3-methyl-1-pentene, 3-ethyl-1-pentene, 4-methyl-1-pentene, 1-octene, 1-decene, 1-dodecene and 1-eicosene. Preferable are propylene, 1-butene, 1-hexene, 4-methyl-1-pentene, 1-octene, 1-decene, 1-dodecene and 1-eicosene. Of these, preferably used are α-olefins of 4 to 10 carbon atoms such as 1-butene, 1-hexene, 4-methyl-1-pentene and 1-octene.

Examples of dienes include non-conjugated dienes such as 1,4-pentadiene, 1,5-hexadiene, 1,4-hexadiene, 1,4-octadiene, 1,5-octadiene, 1,6-octadiene, 1,7-octadiene, ethylidenenorbornene, vinylnorbornene, dicyclopentadiene, 7-methyl-1,6-octadiene and 4-ethylidene-8-methyl-1,7-nonadiene; and conjugated dienes such as butadiene and isoprene. Of these, preferable are dienes having a norbornene skeleton.

The above mentioned dienes can be used singly or in combination of two or more kinds.

Examples of trienes include nonconjugated trienes such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecanediene; and conjugated trienes such as 1,3,5-hexatriene and the like. Of these, preferable are 4,8-dimethyl-1,4,8-decatriene and 4-ethylidene-8-methyl-1,7-nonadiene (EMND).

The trienes mentioned above can be used singly or in combination of two or more kinds.

The dienes and the trienes may be used in combination. Of the above dienes and trienes, particularly preferable are those having norbornene skeleton.

The ethylene/α-olefin copolymer (B3) desirably has a density of 0.855 to 0.895 g/cm$^3$, preferably 0.860 to 0.890 g/cm$^3$, more preferably 0.860 to 0.885 g/cm$^3$.

The ethylene unit content in the ethylene/α-olefin copolymer (B3) is desired to be not less than 60% by mol, preferably 60 to 100% by mol, more preferably 70 to 90% by mol.

The ethylene/α-olefin copolymer (B3) desirably has a melt flow rate (MFR, ASTM D 1238, 190° C., load of 2.16 kg) of usually 0.01 to 200 g/10 min, preferably 0.05 to 100 g/10 min, more preferably 0.05 to 80 g/10 min.

The ethylene/α-olefin copolymer (B3) has a molecular weight distribution (Mw/Mn, in terms of polystyrene, Mw: weight-average molecular weight, Mn: number-average molecular weight), as measured by GPC, of preferably not more than 4.0, more preferably not more than 3.5.

The ethylene/α-olefin copolymer (B3) using the above diene or triene as a starting material has an iodine value of usually not more than 80, preferably 5 to 60.

As the ethylene/α-olefin copolymer (B3), an unmodified copolymer is preferably used, but a copolymer modified with a polar group-containing monomer such as an unsaturated carboxylic acid or its derivative is also employable.

The ethylene/α-olefin copolymer (B3) can be prepared by, for example, using ethylene and at least one monomer selected from α-olefins of 3 to 20 carbon atoms, dienes and trienes in such amounts as to satisfy the aforesaid ethylene content, and copolymerizing these monomers in the presence of the metallocene catalyst (1).

The copolymerization to prepare the ethylene/α-olefin copolymer (B3) can be carried out under the same conditions as previously described in detail in the preparation of the syndiotactic-structure propylene/ethylene copolymer (B1).

When the soft syndiotactic polypropylene composition (2) comprises the syndiotactic propylene polymer (A), the syndiotactic-structure propylene/ethylene copolymer (B1), the amorphous α-olefin copolymer (B2), the ethylene/α-olefin copolymer (B3), the isotactic propylene polymer (E) and the ethylene-based polymer (D), the composition (2) desirably contains:

- the component (A) in an amount of 20 to 60 parts by weight, preferably 30 to 60 parts by weight,
- the component (B1) in an amount of 1 to 30 parts by weight, preferably 3 to 30 parts by weight,
- the component (B2) in an amount of 1 to 30 parts by weight, preferably 3 to 30 parts by weight,
- the component (B3) in an amount of 5 to 30 parts by weight, preferably 5 to 25 parts by weight,
- the component (E) in an amount of 1 to 40 parts by weight, preferably 5 to 35 parts by weight,
- the total of the components (A), (B1), (B2), (B3) and (E) being 100 parts by weight, and
- the component (D) in an amount of 0.01 to 5 parts by weight, preferably 0.01 to 4 parts by weight, more preferably 0.01 to 3 parts by weight, based on 100 parts by weight of the total of the components (A), (B1), (B2), (B3) and (E).

The soft syndiotactic polypropylene composition (2) comprising the components (A), (B1), (B2), (B3), (C) and (D) in the above proportion is excellent not only in balance among transparency, flexibility, heat resistance and scratch resistance but also in strain recovery properties, low-temperature impact resistance and moldability.

When the crystal nucleating agent (C) is used in this composition, a crystal nucleating agent, such as the aforesaid aliphatic amide, metallic salt of aromatic carboxylic acid, metallic salt of aliphatic carboxylic acid or fluorine-containing polymer, is employable, and it is preferable to use an aliphatic amide or a fluorine-containing polymer.

The soft syndiotactic polypropylene composition (2) has a melt flow rate (ASTM D 1238, 230° C., load of 2.16 kg) of usually 0.0001 to 1000 g/10 min, preferably 0.0001 to 900 g/10 min, more preferably 0.0001 to 800 g/10 min, and an intrinsic viscosity (η), as measured in decahydronaphthalene at 135° C., of usually 0.01 to 10 dl/g, preferably 0.05 to 10 dl/g, more preferably 0.1 to 10 dl/g.

The soft syndiotactic polypropylene composition (2) of the invention has a melt tension (MT) of usually 0.5 to 10 g, preferably 1 to 10 g, and is excellent in moldability such as film molding properties.

Process for Preparing the Composition (2)

The soft syndiotactic polypropylene composition (2) can be prepared by various known processes, for example, the same process for preparing the composition (1) as previously described, using the above components in the above amounts.

To the soft syndiotactic polypropylene composition (2), additives such as heat stabilizer, weathering stabilizer, antistatic agent, pigment, dye, rust preventive and the aforesaid "other copolymers" may be added when needed in amounts not detrimental to the objects of the invention.

The "other copolymers" are used singly or in combination.

The "other copolymers" are used in amounts of usually 0 to 40 parts by weight, preferably 0 to 30 parts by weight, based on 100 parts by weight of the soft syndiotactic polypropylene composition (2).

When the "other copolymers" are used in the above amounts, a soft syndiotactic polypropylene composition capable of producing molded products having an excellent balance among heat-sealing properties, transparency and heat resistance is obtained, so that the above amounts are preferable.

Soft Syndiotactic Polypropylene Composition (3)

The soft syndiotactic polypropylene composition (3) of the invention comprises a specific syndiotactic propylene polymer (A), a specific α-olefin polymer (B), a specific isotactic propylene polymer (E), a copolymer (F) of polar group-containing vinyl and ethylene, and a specific ethylene-based polymer (D).

The syndiotactic propylene polymer (A), the α-olefin polymer (B), the isotactic propylene polymer (E) and the ethylene-based polymer (D) for forming the soft syndiotactic polypropylene composition (3) are the same as the aforesaid components (A), (B), (E) and (D) used for forming the soft syndiotactic polypropylene composition (1).

(F) Copolymer of Polar Group-Containing Vinyl and Ethylene

The copolymer (F) of polar group-containing vinyl and ethylene for use in the invention is a copolymer of polar group-containing vinyl selected from methacrylic acid, acrylic acid, vinyl acetate and their derivatives, and ethylene.

In the copolymer (F), recurring units derived from the polar group-containing vinyl are desirably contained in amounts of usually 5 to 40% by weight, preferably 10 to 35% by weight. The content of the recurring units can be calculated from a strength ratio between the methylene chain and the carbonyl chain by means of IR.

The copolymer (F) desirably has a density of usually 0.92 to 0.97 g/cm$^3$, preferably 0.93 to 0.96 g/cm$^3$.

The copolymer (F) desirably has an intrinsic viscosity (η), as measured in decalin at 135° C., of usually 0.5 to 20 dl/g, preferably 1 to 20 dl/g, more preferably 1 to 15 dl/g.

Composition

The soft syndiotactic polypropylene composition (3) of the invention comprises the syndiotactic propylene polymer (A), the α-olefin polymer (B), the isotactic propylene polymer (E), the copolymer (F) of polar group-containing vinyl and ethylene, and the ethylene-based polymer (D).

In the soft syndiotactic polypropylene composition (3), the weight ratio (A/E) of the component (A) to the component (E) is desired to be in the range of 99/1 to 1/99, preferably 95/S to 10/90, more preferably 90/10 to 30/70, and the weight ratio ((A+E)/B) of the total of the components (A) and (E) to the α-olefin polymer (B) is desired to be in the range of 90/10 to 10/90, preferably 80/20 to 20/80, more preferably 75/25 to 40/60.

The component (F) is desirably contained in an amount of 10 to 40 parts by weight, preferably 10 to 30 parts by weight, based on 100 parts by weight of the total of the components (A), (E) and (B).

The component (D) is desirably contained in an amount of 0.01 to 5 parts by weight, preferably 0.01 to 4 parts by weight, more preferably 0.01 to 3 parts by weight, based on 100 parts by weight of the total of the components (A), (E) and (B).

The soft syndiotactic polypropylene composition (3) comprising the components (A), (B), (E), (D) and (F) in the above proportion has a good balance among transparency, flexibility, heat resistance and scratch resistance, and shows excellent moldability and tearability.

The soft syndiotactic polypropylene composition (3) has an intrinsic viscosity (η), as measured in decalin at 135° C., of usually 0.01 to 10 dl/g, preferably 0.05 to 10 dl/g, more preferably 0.1 to 10 dl/g.

The soft syndiotactic polypropylene composition (3) of the invention has a melt tension (MT) of usually 0.5 to 10 g, preferably 1 to 10 g, and is excellent in moldability such as film molding properties.

Process for Preparing the Composition (3)

The soft syndiotactic polypropylene composition (3) can be prepared by various known processes, for example, the same process for preparing the composition (1) as previously described, using the above components in the above amounts.

To the soft syndiotactic polypropylene composition (3), additives such as heat stabilizer, weathering stabilizer, antistatic agent, pigment, dye, rust preventive and the aforesaid "other copolymers" may be added when needed in amounts not detrimental to the objects of the invention.

The "other copolymers" are used singly or in combination.

The "other copolymers" are used in amounts of usually 0 to 40 parts by weight, preferably 0 to 30 parts by weight, based on 100 parts by weight of the soft syndiotactic polypropylene composition (3).

When the "other copolymers" are used in the above amounts, a soft syndiotactic polypropylene composition capable of producing molded products having a good balance among heat-sealing properties, transparency and heat resistance is obtained, so that the above amounts are preferable.

Laminate

Next, the laminate according to the invention is described.

The laminate of the invention comprises a layer comprising a thermoplastic resin and a layer comprising the syndiotactic polypropylene composition (1), (2) or (3).

The layer comprising the thermoplastic resin is preferably a layer containing at least one resin selected from polyolefin, polyamide, polyester, polyacetal, polyvinyl chloride, polystyrene, an acrylonitrile/butadiene/styrene copolymer (ABS) and polycarbonate, more preferably a layer containing polyolefin, polyester, polycarbonate or polyamide, particularly preferably a layer containing polyolefin.

The polyolefin is preferably an ethylene-based polymer or an isotactic propylene polymer, more preferably an ethylene/vinyl acetate copolymer or an ethylene/vinyl acetate copolymer saponification product.

The ethylene/vinyl acetate copolymer desirably has an ethylene unit content of 15 to 60% by mol, preferably 25 to 50% by mol, and desirably has a melt flow rate, as measured at 190° C., of 0.1 to 500 g/10 min, preferably 0.1 to 400 g/10 min, more preferably 1 to 300 g/10 min.

The ethylene/vinyl acetate copolymer saponification product is desired to be one obtained by saponifying an ethylene/vinyl acetate copolymer having an ethylene unit content of 15 to 60% by mol, preferably 25 to 50% by mol, in such a manner that the degree of saponification of the resulting product becomes not less than 50%, preferably not less than 90%. When the ethylene unit content is in the above range, the saponification product is hardly thermally decomposed, can be readily melt molded and has excellent extensibility, water resistance and gas permeation resistance.

When the degree of saponification is not less than 50%, the saponificaiton product has excellent gas permeation resistance.

In the laminate of the invention, the layer comprising the thermoplastic resin and the layer comprising the syndiotactic polypropylene composition may be directly laminated to each other, but between those layers, a layer comprising an adhesive resin such as a maleic anhydride-graft copolymerized ethylene-based polymer or propylene-based polymer may be interposed.

In order to produce the laminate of the invention, a coextrusion molding method, in which the thermoplastic resin, the adhesive resin and the syndiotactic polypropylene composition are melted in separate extruders, fed to a die of three-layer structure and coextruded so as to form an intermediate layer of the adhesive resin, and a sandwich laminating method, in which a film or sheet of the thermoplastic resin and a film or sheet of the syndiotactic polypropylene composition are previously formed and between those films or sheets the adhesive resin is melt extruded, are adoptable. Of these, the coextrusion molding method is preferable because excellent interlaminar strength is obtained.

The coextrusion molding method includes a T-die method using a flat die and an inflation method using a circular die. As the flat die, any of a die of single-manifold type using a black box and a die of multi-manifold type may be used. As the die for the inflation method, any of known dies is employable.

The thickness of each layer of the laminate can be appropriately determined according to the use of the laminate, but when the laminate is obtained as a sheet or a film, the thickness of the layer comprising the thermoplastic resin is usually in the range of 0.005 to 1 mm, the thickness of the layer comprising the adhesive resin is usually in the range of 0.005 to 1 mm, and the thickness of the layer comprising the syndiotactic polypropylene composition is usually in the range of about 0.005 to 5 mm.

Possibility of Industrial Use

The soft syndiotactic polypropylene compositions of the invention mentioned above can be widely applied to not only laminates but also polyolefin uses hitherto known, and for example, they can be used after molded into variously shaped products including sheets, unstretched or stretched films and filaments.

Examples of the molded products include those obtained by known thermal-molding methods such as extrusion molding, injection molding, inflation molding, blow molding, extrusion blow molding, injection blow molding, press molding, vacuum molding, calendering and expansion molding.

Some examples of the molded products are described below.

When the molded product of the invention is an extrusion molded product, the shape and type of the product are not specifically limited. Examples of the molded products include sheets, films (unstretched), pipes, hoses, wire coatings and filaments. Of these, particularly preferable are sheets, films and filaments.

In the extrusion molding of the soft syndiotactic polypropylene composition, hitherto known extruders and molding conditions are adoptable. For example, using a single-screw extruder, a kneading extruder, a ram extruder, a gear extruder or the like, a molten syndiotactic polypropylene composition is extruded from a T-die to form a sheet or a film (unstretched).

The stretched film can be obtained by stretching the extruded sheet or the extruded film (unstretched) by a known method such as tentering (lengthwise-crosswise stretching, crosswise-lengthwise stretching), simultaneous biaxial orientation or monoaxial stretching.

When the sheet or the unstretched film is stretched, the stretch ratio is in the range of usually about 20 to 70 times in case of biaxial orientation, and about 2 to 10 times in case of monoaxial stretching. It is desirable to obtain a stretched film having a thickness of about 5 to 200 μm.

An inflation film may be produced as the molded product in the form of a film. When the soft syndiotactic polypropylene composition of the invention is subjected to inflation molding, drawdown hardly takes place.

The molded products in the form of sheet or film comprising the soft syndiotactic polypropylene composition of the invention are hardly electrostatically charged, are excellent in flexibility such as tensile modulus, heat resistance, heat-sealing properties, impact resistance, aging resistance, transparency, see-through, gloss, rigidity, moisture resistance and gas barrier properties, and can be widely used as packaging films and the like. Because of particularly excellent moisture resistance, they can be favorably used as press-through packs for packaging medicine tablets or capsules.

The filament can be produced by, for example, extruding a molten soft syndiotactic polypropylene composition through a spinneret. The thus obtained filament may be further subjected to stretching. The stretching has only to be carried out to such an extent that molecular orientation may be made at least monoaxially, and is desirably carried out in a stretch ratio of usually about 5 to 10 times. The filament comprising the soft syndiotactic polypropylene composition of the invention is hardly electrostatically charged and has excellent transparency, rigidity, heat resistance and impact resistance.

The injection molded products can be produced by injection molding the soft syndiotactic polypropylene composition of the invention into various shapes using hitherto known injection molding machines under the known conditions. The injection molded products comprising the soft syndiotactic polypropylene composition of the invention are hardly electrostatically charged and have excellent rigidity, heat resistance, impact resistance, surface gloss, chemical resistance and abrasion resistance. Hence, they can be widely used for automobile interior trim, automobile exterior trim, housings of electrical appliances and containers.

The blow molded products can be produced by blow molding the soft syndiotactic polypropylene composition of the invention using hitherto known blow molding machines under the known conditions.

For example, in the extrusion blow molding, the syndiotactic polypropylene composition in a molten state is extruded from a die at a resin temperature of 100 to 300° C. to form a tubular parison, then the parison is held in a mold of desired shape, and air is blown to fit the parison into the mold at a resin temperature of 130 to 300° C., whereby a blow molded product can be produced.

The stretch (blow) ratio is desired to be in the range of about 1.5 to 5 times in the cross direction.

In the injection blow molding, the syndiotactic polypropylene composition is injected into a parison mold at a resin temperature of 100 to 300° C. to form a parison, then the parison is held in a mold of desired shape, and air is blown to fit the parison into the mold at a resin temperature of 120 to 300° C., whereby a blow molded product can be produced.

The stretch (blow) ratio is desired to be in the range of 1.1 to 1.8 times in the machine direction and 1.3 to 2.5 times in the cross direction.

The blow molded products comprising the soft syndiotactic polypropylene composition of the invention are excellent in moisture resistance as well as in transparency, rigidity, heat resistance and impact resistance.

The press molded product is, for example, a mold stamping product, and when a substrate material and a skin material are pressed at the same time to perform integral molding (mold stamping), the substrate can be formed from the soft syndiotactic polypropylene composition of the invention.

Examples of the mold stamping products include automobile interior trim such as door trim, rear package trim, sheet back garnish and instrument panel.

The soft syndiotactic polypropylene composition of the invention exhibits transparency and high rigidity. For example, even if the composition contains an elastomer component, it exhibits sufficiently high rigidity, and hence it can be favorably used especially for automobile interior trim, housings of electrical appliances and various containers.

The press molded products comprising the soft syndiotactic polypropylene composition of the invention are hardly electrostatically charged and have excellent rigidity, heat resistance, transparency, impact resistance, aging resistance, surface gloss, chemical resistance and abrasion resistance.

The soft syndiotactic polypropylene composition of the invention is molded by the above-mentioned various molding methods and can be favorably applied to, for example, the following uses:

- films, such as multi-layer stretched films, multi-layer unstretched films, laminated films, shrink films, stretched films, wrapping films, protective films, retort films, porous films, barrier films, metal-deposited films and agricultural films;
- sheets and sheet products, such as wall paper, expanded sheets, wire coverings, blister packages, trays, stationary products, food containers, toys, cosmetic containers, medical appliances, detergent containers, floorings, cushioning floors, cosmetic sheets and shoe soles;
- blow molded products, such as bottles;
- extrusion molded products, such as tubes, wire coverings, cable coverings, pipes and gaskets;
- fiber products, such as fibers and flat yarns;
- nonwoven fabrics and nonwoven articles, such as nonwoven fabrics and filters;
- injection molded products, such as automobile interior trim skins, automobile exterior trim, daily use miscellaneous goods, electrical appliances, caps, containers and pallets;
- modifiers, such as adhesives, lubricating oil additives, hot melt adhesives, toner release agents, pigment dispersants and asphalt modifiers; and
- other products, such as sealants, vacuum molded products and powder slush molded product.

EFFECT OF THE INVENTION

The soft syndiotactic polypropylene composition (1) of the invention has an excellent balance among transparency, flexibility, heat resistance and scratch resistance.

The soft syndiotactic polypropylene composition (2) of the invention has an excellent balance among transparency, flexibility, heat resistance and scratch resistance.

The soft syndiotactic polypropylene composition (3) of the invention has an excellent balance among transparency, flexibility, heat resistance and scratch resistance, and shows excellent moldability. From this composition, films or sheets having excellent tearability can be produced.

The laminate of the invention is hardly thermally decomposed and is excellent in various properties such as extensibility, water resistance and gas permeation resistance.

EXAMPLE

The present invention is further described with reference to the following examples, but it should be construed that the invention is in no way limited to those examples.

The property measuring conditions are described below.

1. Tensile Modulus (Young's Modulus)

The tensile modulus was measured using a JIS No. 3 dumbbell under the conditions of a span of 30 mm and a stress rate of 30 mm/min in accordance with JIS K6301.

2. Martens' Hardness (1/mm)

Using a Martens' scratch hardness tester manufactured by Tokyo Shoki, a specimen of 3 mm thickness was scratched by a scratch indenter with applying a load of 20 g to the indenter to form a scratch mark, and the width of the scratch mark was measured. A reciprocal number of the obtained value was calculated.

3. Penetration Temperature (° C.)

A pressure of 2 kg/cm$^2$ was applied to a flat penetrator having a diameter of 1.8 mm on a specimen of 2 mm thickness at a heating rate of 5° C./min in accordance with JIS K7196 to obtain a TMA curve, from which the penetration temperature (° C.) was determined.

4. Haze (%)

The haze was measured by a digital hazeometer (NDH-20D) manufactured by Nippon Denshoku Kogyo K.K. using a specimen of 1 mm thickness.

5. Melting Point (Tm), Glass Transition Temperature (Tg)

An endothermic curve of DSC was obtained, and the temperature at the maximum peak position on the curve was taken as Tm.

The measurement was carried out by placing a sample in an aluminum pan, heating the sample up to 200° C. at a rate of 100° C./min, keeping it at 200° C. for 5 minutes, then cooling it to −150° C. at a rate of 10° C./min and heating it at a rate of 10° C./min to obtain an endothermic curve, from which Tm was determined.

6. Intrinsic Viscosity (η)

The intrinsic viscosity was measured in decalin at 135° C.

7. Molecular Weight Distribution (Mw/Mn)

The molecular weight distribution was measured by GPC (Gel permeation chromatography) using an orthodichlorobenzene solvent at 140° C.

8. Moldability (Crystallizing Rate)

An exothermic curve of DSC was obtained, from which a temperature corresponding to ½ of the peak area was read off. The measurement was carried out by placing a sample in an aluminum pan, heating the sample up to 200° C. at a rate of 320° C./min, keeping it at 200° C. for 5 minutes, cooling it to 100° C. at a rate of 320° C./min and keeping it at that temperature to obtain an exothermic curve.

9. Film Property Test

A cast film of 20 μm thickness was produced by a single-screw extruder of 30 mmØ under the conditions of a die temperature of 230° C., a roll temperature of 40° C. and a take-up rate of 10 m/min. The film was measured on the film properties.

The film haze (%) was measured by a digital hazeometer NDH-20D manufactured by Nippon Denshoku Kogyo K. K.

The film impact (KJ/m) was measured at −30° C. in accordance with ASTM D3420.

11. Strain recovery (%)

To an unstretched cast film having a thickness of 20 μ and a diameter of 50 mm, displacement of 15 mm was given by a ½ inch ejector rod at a speed of 100 mm/min to measure a permanent set, and the strain recovery was calculated from the following formula.

$$\text{Strain recovery (\%)} = (15\text{ mm} - \text{permanent set (mm)})/15\text{ mm} \times 100$$

As an Elmendorf tear strength (N/cm), a tear strength of the film in the perpendicular direction to the stream of the resin was measured in accordance with JIS Z1702.

Synthesis Example 1

Synthesis of Syndiotactic Polypropylene

Syndiotactic polypropylene was obtained by bulk polymerization of propylene in the presence of hydrogen using a catalyst consisting of diphenylmethylene (cyclopentadienyl)fluorenylzirconium dichloride and methylaluminoxane in accordance with a process described in Japanese Patent Laid-Open Publication No. 274763/1990.

The syndiotactic polypropylene obtained above had a melt flow index of 4.4 g/10 min, a molecular weight distribution, as measured by GPC, of 2.3, a syndiotactic triad fraction, as measured by $^{13}$C-NMR, of 0.823, Tm, as measured by differential scanning colorimetry, of 127° C., and Tc of 57° C.

Synthesis Example 2

Synthesis of α-olefin Polymer

In a 1.5-liter autoclave vacuum dried and purged with nitrogen, 750 ml of heptane was placed at room temperature. Successively, 0.3 ml of a toluene solution of triisobutylaluminum (abbreviated to TIBA hereinafter) (concentration: 1.0 mmol/ml) was added so that the amount of aluminum atom would become 0.3 mmol, and 30 liters of propylene (25° C., 1 atm.) was fed with stirring. Then, raising of temperature was started, and a temperature of 60° C. was attained. Thereafter, the system was pressurized to 5.9 kg/cm$^2$-G with ethylene, and 3.75 ml of a toluene solution of (dimethyl(t-butylamido)(tetramethyl-η$^5$-cyclopentadienyl)silane)dichloride titanium (0.0001 mM/ml) synthesized by a known process and 2.0 ml of a toluene solution of triphenylcarbeniumtetra (pentafluorophenyl)borate (0.001 mM/ml) were added to initiate copolymerization of propylene and ethylene. As for the catalyst concentration in the copolymerization, a concentration of (dimethyl(t-butylamido)(tetramethyl-η$^5$-cyclopentadienyl)silane)dichloride titanium in the whole system was 0.0005 mmol/liter, and a concentration of triphenylcarbeniumtetra(pentafluorophenyl)borate in the whole system was 0.002 mmol/liter. During the polymerization, ethylene was continuously fed to maintain the internal pressure at 5.9 kg/cm$^2$-G. After 15 minutes, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the atactic propylene/ethylene copolymer obtained above was 29 g, and this copolymer had an intrinsic viscosity (η), as measured in decalin at 135° C., of 3.2 dl/g, a glass transition temperature (Tg) of −22° C., an ethylene content of 16.0% by mol, an activity of 310 kg/mmolZr·hr, and a molecular weight distribution, as measured by GPC, of 2.6. The Young's modulus was 3 MPa.

Synthesis Example 3

Synthesis of α-olefin Polymer

In a 1.5-liter autoclave vacuum dried and purged with nitrogen, 750 ml of heptane was placed at room temperature. Successively, 0.3 ml of a toluene solution of TIBA (concentration: 1.0 mmol/ml) was added so that the amount of aluminum atom would become 0.3 mmol, and 28 liters of propylene (25° C., 1 atm.) was fed with stirring. Then, raising of temperature was started, and a temperature of 60° C. was attained. Thereafter, the system was pressurized to 5.9 kg/cm$^2$-G with ethylene, and 3.75 ml of a toluene solution of rac-dimethylsilylene-bis(1-(2-methyl-4-phenylindenyl))zirconium dichloride (0.0001 mM/ml) synthesized by a known process and 9.38 ml of a toluene solution of methylaluminoxane (0.01 mM/ml) were added to initiate copolymerization of propylene and ethylene. As for the catalyst concentration in the copolymerization, a concentration of rac-dimethylsilylene-bis(1-(2-methyl-4-phenylindenyl))zirconium dichloride in the whole system was 0.0005 mmol/liter, and a concentration of methylaluminoxane in the whole system was 0.125 mmol/liter. During the polymerization, ethylene was continuously fed to maintain the internal pressure at 5.9 kg/cm$^2$-G. After 15 minutes, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the isotactic propylene/ethylene copolymer obtained above was 26 g, and this copolymer had an intrinsic viscosity (η), as measured in decalin at 135° C., of 2.8 dl/g, a glass transition temperature (Tg) of −47° C., an ethylene content of 30.0% by mol, an activity of 276 kg/mmol-Zr·hr, and a molecular weight distribution, as measured by GPC, of 2.7.

Although a melting peak measured by DSC was observed, quantitative determination thereof could not be made because the peak was broad. The Young's modulus was 3 MPa.

Synthesis Example 4

Synthesis of α-olefin Polymer

In a 1.5-liter autoclave vacuum dried and purged with nitrogen, 750 ml of heptane was placed at room temperature. Successively, 0.3 ml of a toluene solution of TIBA (concentration: 1.0 mmol/ml) was added so that the amount of aluminum atom would become 0.3 mmol, and 50.7 liters of propylene (25° C., 1 atm.) was fed with stirring. Then, raising of temperature was started, and a temperature of 30° C. was attained. Thereafter, the system was pressurized to 5.5 kg/cm$^2$-G with ethylene, and 3.75 ml of a heptane solution of diphenylmethylene(cyclopentadienyl) fluorenylzirconium dichloride (0.0002 mM/ml) synthesized by a known process and 2.0 ml of a toluene solution of triphenylcarbeniumtetra(pentafluorophenyl)borate (0.002 mM/ml) were added to initiate copolymerization of propylene and ethylene. As for the catalyst concentration in the copolymerization, a concentration of diphenylmethylene (cyclopentadienyl)fluorenylzirconium dichloride in the whole system was 0.001 mmol/liter, and a concentration of triphenylcarbeniumtetra(pentafluorophenyl)borate in the whole system was 0.004 mmol/liter.

During the polymerization, ethylene was continuously fed to maintain the internal pressure at 5.5 kg/cm$^2$-G. After 30 minutes from initiation of the polymerization, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the syndiotactic propylene/ethylene copolymer obtained above was 50 g, and this copolymer had an intrinsic viscosity (η), as measured in decalin at 135° C., of 2.4 dl/g, a glass transition temperature (Tg) of −28° C., an ethylene content of 24.0% by mol, and a molecular weight distribution, as measured by GPC, of 2.9. The Young's modulus was 2 MPa. Under the aforesaid DSC measuring conditions, no melting peak was substantially observed.

Synthesis Example 5

Synthesis of α-olefin Polymer

In a 1.5-liter autoclave vacuum dried and purged with nitrogen, 710 ml of heptane was placed at room temperature. Successively, 1.0 ml of a toluene solution of TIBA (concentration: 1.0 mmol/ml) was added so that the amount of aluminum atom would become 1.0 mmol, and 25 g of 1-butene was fed with stirring. Then, raising of temperature was started, and a temperature of 30° C. was attained. Thereafter, the system was pressurized to 6.0 kg/cm$^2$-G with propylene, and 0.75 ml of a toluene solution of (dimethyl (t-butylamido)(tetramethyl-$\eta^5$-cyclopentadienyl)silane) dichloride titanium (0.01 mM/ml) synthesized by a known process and 4.5 ml of a toluene solution of methylaluminoxane (1 mM/ml) were added to initiate copolymerization of propylene and 1-butene. As for the catalyst concentration in the copolymerization, a concentration of (dimethyl(t-butylamido)(tetramethyl-$\eta^5$-cyclopentadienyl)silane) dichloride titanium in the whole system was 0.01 mmol/liter, and a concentration of methylaluminoxane in the whole system was 6.0 mmol/liter.

During the polymerization, propylene was continuously fed to maintain the internal pressure at 6.0 kg/cm$^2$-G. After 15 minutes from initiation of the polymerization, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the atactic propylene/butene copolymer obtained above was 130 g, and this copolymer had an intrinsic viscosity (1), as measured in decalin at 135° C., of 1.1 dl/g, a glass transition temperature (Tg) of −18° C., a butene content of 6.2% by mol, and a molecular weight distribution, as measured by GPC, of 2.8. The Young's modulus was 5 MPa. Under the aforesaid DSC measuring conditions, no melting peak was substantially observed.

Synthesis Example 6

Synthesis of α-olefin Polymer

In a 1.5-liter autoclave vacuum dried and purged with nitrogen, 675 ml of heptane was placed at room temperature.

Successively, 1.0 ml of a toluene solution of TIBA (concentration: 1.0 mmol/ml) was added so that the amount of aluminum atom would become 1.0 mmol, and 30 g of 1-butene was fed with stirring. Then, raising of temperature was started, and a temperature of 30° C. was attained. Thereafter, the system was pressurized to 6.0 kg/cm$^2$-G with propylene, and 0.75 ml of a toluene solution of diphenylmethylene(cyclopentadienyl)fluorenylzirconium dichloride (0.01 mM/ml) synthesized by a known process and 4.5 ml of a toluene solution of methylaluminoxane (1.0 mM/ml) were added to initiate copolymerization of propylene and 1-butene. As for the catalyst concentration in the copolymerization, a concentration of diphenylmethylene (cyclopentadienyl)fluorenylzirconium dichloride in the whole system was 0.01 mmol/liter, and a concentration of methylaluminoxane in the whole system was 6.0 mmol/liter.

During the polymerization, propylene was continuously fed to maintain the internal pressure at 6.0 kg/cm$^2$-G. After 15 minutes from initiation of the polymerization, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the syndiotactic propylene/butene copolymer obtained above was 75 g, and this copolymer had an intrinsic viscosity (η), as measured in decalin at 135° C., of 2.7 dl/g, a glass transition temperature (Tg) of −5.3° C., a melting heat quantity of 20 J/g, a butene content of 11% by mol, and a molecular weight distribution, as measured by GPC, of 2.4. The Young's modulus was 145 MPa.

Synthesis Example 7

Synthesis of α-olefin Polymer

In a 1.5-liter autoclave vacuum dried and purged with nitrogen, 535 ml of heptane was placed at room temperature. Successively, 0.23 ml of a toluene solution of TIBA (concentration: 1.0 mmol/ml) was added so that the amount of aluminum atom would become 0.3 mmol, and 150 g of 1-octene was fed with stirring. Then, raising of temperature was started, and a temperature of 30° C. was attained. Thereafter, the system was pressurized to 6.0 kg/cm$^2$-G with propylene, and 0.75 ml of a toluene solution of diphenylmethylene(cyclopentadienyl)fluorenylzirconium dichloride (0.01 mM/ml) synthesized by a known process and 1.5 ml of a toluene solution of triphenylcarbeniumtetra (pentafluorophenyl)borate (0.02 mM/ml) were added to initiate copolymerization of propylene and 1-octene. As for the catalyst concentration in the copolymerization, a concentration of diphenylmethylene(cyclopentadienyl) fluorenylzirconium dichloride in the whole system was 0.01 mmol/liter, and a concentration of triphenylcarbeniumtetra (pentafluorophenyl)borate in the whole system was 0.04 mmol/liter.

During the polymerization, propylene was continuously fed to maintain the internal pressure at 6.0 kg/cm$^2$-G. After 15 minutes from initiation of the polymerization, methyl alcohol was added to terminate the polymerization reaction. After the pressure release, the polymer solution was drawn out and then washed with an aqueous solution of 5 ml of concentrated hydrochloric acid in 1 liter of water using those solutions in a ratio of 1:1 (polymer solution:aqueous solution), to transfer the catalyst residue into the aqueous phase. After the contact mixed solution was allowed to stand still, the aqueous phase was removed by separation, and the remainder was washed twice with distilled water, followed by oil-water separation, to separate the polymer solution phase. The thus separated polymer solution phase was contacted with acetone in an amount of 3 times as much as the polymer solution phase with vigorous stirring to precipitate a polymer, followed by sufficient washing with acetone. Then, the solid (copolymer) was collected by filtration and dried at 130° C. and 350 mmHg for 12 hours in a stream of nitrogen.

The yield of the syndiotactic propylene/octene copolymer obtained above was 53 g, and this copolymer had an intrinsic viscosity (η), as measured in decalin at 135° C., of 2.7 dl/g, a glass transition temperature (Tg) of −18° C., an octene content of 18% by mol, and a molecular weight distribution, as measured by GPC, of 2.4. The Young's modulus was 2 MPa. Under the aforesaid DSC measuring conditions, no melting peak was substantially observed.

Example 1

70 Parts by weight of the syndiotactic polypropylene obtained in Synthesis Example 1, 30 parts by weight of the atactic propylene/ethylene copolymer obtained in Synthesis Example 2 and 0.02 part by weight of a sorbitol type crystal nucleating agent (trade name: Gelol MD, available from Shinnihon Rikagaku) were mixed and melt kneaded to obtain a soft syndiotactic polypropylene composition.

Example 2

A soft syndiotactic polypropylene composition was obtained in the same manner as in Example 1, except that the isotactic propylene/ethylene copolymer obtained in Synthesis Example 3 was used instead of the atactic propylene/ethylene copolymer obtained in Synthesis Example 2, the amount of the syndiotactic polypropylene was 50 parts by weight, and the amount of the isotactic propylene/ethylene copolymer was 50 parts by weight.

Example 3

A soft syndiotactic polypropylene composition was obtained in the same manner as in Example 1, except that the syndiotactic propylene/ethylene copolymer obtained in Synthesis Example 4 was used instead of the atactic propylene/ethylene copolymer obtained in Synthesis Example 2, the amount of the syndiotactic polypropylene was 60 parts by weight, and the amount of the syndiotactic propylene/ethylene copolymer was 40 parts by weight.

Example 4

A soft syndiotactic polypropylene composition was obtained in the same manner as in Example 1, except that the atactic propylene/ethylene copolymer obtained in Synthesis Example 5 was used instead of the atactic propylene/ethylene copolymer obtained in Synthesis Example 2.

Example 5

A soft syndiotactic polypropylene composition was obtained in the same manner as in Example 1, except that the syndiotactic propylene/butene copolymer obtained in Synthesis Example 6 was used instead of the atactic propylene/ethylene copolymer obtained in Synthesis Example 2, the amount of the syndiotactic polypropylene was 10 parts by weight, and the amount of the syndiotactic propylene/butene copolymer was 90 parts by weight.

Example 6

A soft syndiotactic polypropylene composition was obtained in the same manner as in Example 1, except that the syndiotactic propylene/octene copolymer obtained in Synthesis Example 7 was used instead of the atactic propylene/ethylene copolymer obtained in Synthesis Example 2.

Comparative Example 1

A polypropylene composition was obtained in the same manner as in Example 1, except that no sorbitol type crystal nucleating agent was used.

Comparative Example 2

A polypropylene composition was obtained in the same manner as in Example 2, except that no sorbitol type crystal nucleating agent was used.

Comparative Example 3

A polypropylene composition was obtained in the same manner as in Example 3, except that no sorbitol type crystal nucleating agent was used.

Comparative Example 4

A polypropylene composition was obtained in the same manner as in Example 4, except that no sorbitol type crystal nucleating agent was used.

Comparative Example 5

A polypropylene composition was obtained in the same manner as in Example 5, except that no sorbitol type crystal nucleating agent was used.

Comparative Example 6

A polypropylene composition was obtained in the same manner as in Example 6, except that no sorbitol type crystal nucleating agent was used.

The compositions obtained in the above examples and comparative examples were measured on various properties. The results are set forth in Table 1.

TABLE 1

| | Syndiotactic propylene polymer (A) (part(s) by weight) | α-olefin polymer (B) (part(s) by weight) | Crystal nucleating agent (C) (part(s) by weight) | Elastic modulus (MPa) | Martens' hardness (1/mm) | Penetration temperature (° C.) | Haze (%) |
|---|---|---|---|---|---|---|---|
| Ex. 1 | Synthesis Ex. 1 70 | Synthesis Ex. 2 30 | Sorbitol type crystal nucleating agent 0.02 | 121 | 12.3 | 131 | 9.8 |
| Ex. 2 | Synthesis Ex. 1 50 | Synthesis Ex. 3 50 | Sorbitol type crystal nucleating agent 0.02 | 95 | 9.3 | 125 | 26 |
| Ex. 3 | Synthesis Ex. 1 60 | Synthesis Ex. 4 40 | Sorbitol type crystal nucleating agent 0.02 | 121 | 11.6 | 123 | 8.1 |
| Ex. 4 | Synthesis Ex. 1 70 | Synthesis Ex. 5 30 | Sorbitol type crystal nucleating agent 0.02 | 132 | 13.6 | 126 | 11.1 |
| Ex. 5 | Synthesis Ex. 1 10 | Synthesis Ex. 6 90 | Sorbitol type crystal nucleating agent 0.02 | 241 | 13.9 | 114 | 18.2 |
| Ex. 6 | Synthesis Ex. 1 70 | Synthesis Ex. 7 30 | Sorbitol type crystal nucleating agent 0.02 | 130 | 13.1 | 125 | 9.1 |
| Comp Ex. 1 | Synthesis Ex. 1 70 | Synthesis Ex. 2 30 | None | 109 | 12.0 | 127 | 12.0 |
| Comp Ex. 2 | Synthesis Ex. 1 50 | Synthesis Ex. 3 50 | None | 77 | 8.6 | 122 | 32.0 |
| Comp Ex. 3 | Synthesis Ex. 1 60 | Synthesis Ex. 4 40 | None | 116 | 11.0 | 121 | 8.8 |
| Comp Ex. 4 | Synthesis Ex. 1 70 | Synthesis Ex. 5 30 | None | 125 | 13.2 | 124 | 13.5 |
| Comp Ex. 5 | Synthesis Ex. 1 10 | Synthesis Ex. 6 90 | None | 230 | 13.5 | 107 | 22.8 |
| Comp Ex. 6 | Synthesis Ex. 1 70 | Synthesis Ex. 6 30 | None | 126 | 12.4 | 120 | 9.7 |

Example 7

To the total (100 parts by weight) of 70 parts by weight of the syndiotactic polypropylene obtained in Synthesis Example 1, 24 parts by weight of the atactic propylene/ethylene copolymer obtained in Synthesis Example 2 and 6 parts by weight of the syndiotactic propylene/ethylene copolymer obtained in Synthesis Example 4, 0.02 part by weight of a sorbitol type crystal nucleating agent Gelol MD (available from Shinnihon Rikagaku) was added, and they were melt kneaded to obtain a soft syndiotactic polypropylene composition.

Example 8

To the total (100 parts by weight) of 70 parts by weight of the syndiotactic polypropylene obtained in Synthesis Example 1, 24 parts by weight of the syndiotactic propylene/ethylene copolymer obtained in Synthesis Example 4 and 6 parts by weight of the isotactic propylene/ethylene copolymer obtained in Synthesis Example 3, 0.02 part by weight of a sorbitol type crystal nucleating agent Gelol MD (available from Shinnihon Rikagaku) was added, and they were melt kneaded to obtain a soft syndiotactic polypropylene composition.

Example 9

To the total (100 parts by weight) of 70 parts by weight of the syndiotactic polypropylene obtained in Synthesis Example 1, 24 parts by weight of the atactic propylene/ethylene copolymer obtained in Synthesis Example 2 and 6 parts by weight of the isotactic propylene/ethylene copolymer obtained in Synthesis Example 3, 0.02 part by weight of a sorbitol type crystal nucleating agent Gelol MD (available from Shinnihon Rikagaku) was added, and they were melt kneaded to obtain a soft syndiotactic polypropylene composition.

Example 10

To the total (100 parts by weight) of 70 parts by weight of the syndiotactic polypropylene obtained in Synthesis Example 1, 24 parts by weight of the atactic propylene/butene copolymer obtained in Synthesis Example 5 and 6 parts by weight of the syndiotactic propylene/butene copolymer obtained in Synthesis Example 6, 0.02 part by weight of a sorbitol type crystal nucleating agent Gelol MD (available from Shinnihon Rikagaku) was added, and they were melt kneaded to obtain a soft syndiotactic polypropylene composition.

The compositions obtained in the above examples were measured on various properties. The results are set forth in Table 2.

TABLE 2

| | Syndiotactic propylene polymer (A) (part(s) by weight) | α-olefin polymer (B) (part(s) by weight) | | Crystal nucleating agent (C) (part(s) by weight) | Tensile modulus (MPa) | Martens' hardness (1/mm) | Penetration temperature (° C.) | Haze (%) |
|---|---|---|---|---|---|---|---|---|
| Ex. 7 | Synthesis Ex. 1 70 | Synthesis Ex. 2 24 | Synthesis Ex. 4 6 | 0.02 | 124 | 11.9 | 124 | 9.5 |
| Ex. 8 | Synthesis Ex. 1 70 | Synthesis Ex. 4 24 | Synthesis Ex. 3 6 | 0.02 | 155 | 10.1 | 123 | 13.1 |
| Ex. 9 | Synthesis Ex. 1 70 | Synthesis Ex. 2 24 | Synthesis Ex. 3 6 | 0.02 | 153 | 11.1 | 126 | 15.2 |
| Ex. 10 | Synthesis Ex. 1 70 | Synthesis Ex. 5 24 | Synthesis Ex. 6 6 | 0.02 | 145 | 13.5 | 127 | 9.7 |

Synthesis Example 8

Synthesis of Isotactic Propylene Polymer

In a 200-liter polymerization reactor equipped with a stirring blade and thoroughly purged with nitrogen, 80 liters of hexane, 80 mmol of triisobutylaluminum, 0.25 liter of hydrogen, 9 kg of ethylene and 0.3 kg of propylene were placed, and the temperature was raised to 70° C. Then, 18 mmol of methylaluminoxane and 0.06 mmol (in terms of Zr atom) of rac-dimethylsilylene-bis(2-methyl-4-phenyl-1-indenyl)zirconium dichloride were added, and propylene and ethylene were fed in amounts of 13.7 kg and 0.5 kg, respectively. After the polymerization, degasification was performed, and the resulting polymer was recovered in a large amount of methanol, followed by vacuum drying at 80° C. for 10 hours.

Thus, a propylene/ethylene random copolymer was obtained in an amount of 7.0 kg, and the polymerization activity was 117 kg-polymer/mmol-Zr·hr. From the $^{13}C$-NMR measurement, this polymer was found to have an isotactic structure. The polymer had a molecular weight distribution Mw/Mn of 2.0, contained units derived from ethylene in amounts of 4.7% by mol, and had an intrinsic viscosity (η) of 2.7 dl/g and a melting point of 123° C.

Example 11

In a kneader, 56 parts by weight of the syndiotactic propylene polymer obtained in Synthesis Example 1, 30 parts by weight of the atactic propylene/ethylene copolymer obtained in Synthesis Example 2 and 14 parts by weight of the propylene/ethylene random copolymer obtained in Synthesis Example 8 were placed, and they were melt kneaded to obtain a soft syndiotactic polypropylene composition.

Example 12

In a kneader, 56 parts by weight of the syndiotactic propylene polymer obtained in Synthesis Example 1, 30 parts by weight of the atactic propylene/ethylene copolymer obtained in Synthesis Example 2, 14 parts by weight of the propylene/ethylene random copolymer obtained in Synthesis Example 8 and 0.02 part by weight of a sorbitol type nucleating agent Gelol MD (available from Shinnihon Rikagaku) were placed, and they were melt kneaded to obtain a soft syndiotactic polypropylene composition.

Example 13

In a kneader, 48 parts by weight of the syndiotactic propylene polymer obtained in Synthesis Example 1, 40 parts by weight of the syndiotactic propylene/ethylene copolymer obtained in Synthesis Example 4 and 12 parts by weight of the propylene/ethylene random copolymer obtained in Synthesis Example 8 (total: 100 parts by weight) were placed, and they were melt kneaded to obtain a soft syndiotactic polypropylene composition.

Example 14

In a kneader, 48 parts by weight of the syndiotactic propylene polymer obtained in Synthesis Example 1, 40 parts by weight of the syndiotactic propylene/ethylene copolymer obtained in Synthesis Example 4, 12 parts by weight of the propylene/ethylene random copolymer obtained in Synthesis Example 8 and 0.02 part by weight of a sorbitol type nucleating agent Gelol MD (available from Shinnihon Rikagaku) were placed, and they were melt kneaded to obtain a soft syndiotactic polypropylene composition.

Example 15

In a kneader, 56 parts by weight of the syndiotactic propylene polymer obtained in Synthesis Example 1, 30 parts by weight of the atactic propylene/butene copolymer obtained in Synthesis Example 5 and 14 parts by weight of the propylene/ethylene random copolymer obtained in Synthesis Example 8 were placed, and they were melt kneaded to obtain a soft syndiotactic polypropylene composition.

Example 16

In a kneader, 56 parts by weight of the syndiotactic propylene polymer obtained in Synthesis Example 1, 30 parts by weight of the atactic propylene/butene copolymer obtained in Synthesis Example 5, 14 parts by weight of the propylene/ethylene random copolymer obtained in Synthesis Example 8 and 0.02 part by weight of a sorbitol type nucleating agent Gelol MD (available from Shinnihon Rikagaku) were placed, and they were melt kneaded to obtain a soft syndiotactic polypropylene composition.

Comparative Example 7

In a kneader, 30 parts by weight of the atactic propylene/ethylene copolymer obtained in Synthesis Example 2 and 70 parts by weight of the propylene/ethylene random copolymer obtained in Synthesis Example 8 were placed, and they were melt kneaded to obtain a polypropylene composition.

Comparative Example 8

In a kneader, 40 parts by weight of the syndiotactic propylene/ethylene copolymer obtained in Synthesis Example 4 and 60 parts by weight of the propylene/ethylene random copolymer obtained in Synthesis Example 8 were placed, and they were melt kneaded to obtain a polypropylene composition.

Comparative Example 9

In a kneader, 30 parts by weight of the atactic propylene/butene copolymer obtained in Synthesis Example 5 and 70 parts by weight of the propylene/ethylene random copolymer obtained in Synthesis Example 8 were placed, and they were melt kneaded to obtain a polypropylene composition.

The compositions obtained in the above examples and comparative examples were measured on various properties. The results are set forth in Table 3.

TABLE 3

| | Syndiotactic propylene polymer (A) (part(s) by weight) | α-olefin polymer (B) (part(s) by weight) | Isotactic propylene polymer (E) (part(s) by weight) | Crystal nucleating agent (D) (part(s) by weight) | Elastic modulus (MPa) | Martens' hardness (1/mm) | Penetration temperature (° C.) | Haze (%) |
|---|---|---|---|---|---|---|---|---|
| Ex. 11 | Synthesis Ex. 1 56 | Synthesis Ex. 2 30 | Synthesis Ex. 8 14 | None | 115 | 11.2 | 118 | 12.3 |
| Ex. 12 | Synthesis Ex. 1 56 | Synthesis Ex. 2 30 | Synthesis Ex. 8 14 | Sorbitol type crystal nucleating agent 0.02 | 121 | 11.9 | 126 | 10.8 |
| Ex. 13 | Synthesis Ex. 1 48 | Synthesis Ex. 4 40 | Synthesis Ex. 8 12 | None | 182 | 14.0 | 115 | 8.0 |
| Ex. 14 | Synthesis Ex. 1 48 | Synthesis Ex. 4 40 | Synthesis Ex. 8 12 | Sorbitol type crystal nucleating agent 0.02 | 191 | 14.9 | 120 | 7.8 |
| Ex. 15 | Synthesis Ex. 1 56 | Synthesis Ex. 5 30 | Synthesis Ex. 8 14 | None | 167 | 13.6 | 120 | 16.0 |
| Ex. 16 | Synthesis Ex. 1 56 | Synthesis Ex. 5 30 | Synthesis Ex. 8 14 | Sorbitol type crystal nucleating agent 0.02 | 171 | 14.3 | 126 | 13.8 |
| Comp Ex. 7 | None | Synthesis Ex. 2 30 | Synthesis Ex. 8 70 | None | 244 | 8.0 | 129 | 91.0 |
| Comp Ex. 8 | None | Synthesis Ex. 4 40 | Synthesis Ex. 8 60 | None | 248 | 8.2 | 129 | 92.6 |

TABLE 3-continued

| | Syndiotactic propylene polymer (A) (part(s) by weight) | α-olefin polymer (B) (part(s) by weight) | Isotactic propylene polymer (E) (part(s) by weight) | Crystal nucleating agent (D) (part(s) by weight) | Elastic modulus (MPa) | Martens' hardness (1/mm) | Penetration temperature (° C.) | Haze (%) |
|---|---|---|---|---|---|---|---|---|
| Comp Ex. 9 | None | Synthesis Ex. 5 30 | Synthesis Ex. 8 70 | None | 250 | 8.1 | 128 | 90.5 |

Example 17

To the total (100 parts by weight) of 42 parts by weight of the syndiotactic polypropylene obtained in Synthesis Example 1, 28 parts by weight of the isotactic propylene (co)polymer obtained in Synthesis Example 8, 24 parts by weight of the atactic propylene/ethylene copolymer obtained in Synthesis Example 2 and 6 parts by weight of the syndiotactic propylene/ethylene copolymer obtained in Synthesis Example 4, 0.02 part by weight of a sorbitol type crystal nucleating agent Gelol MD (available from Shinnihon Rikagaku) was added, and they were melt kneaded to obtain a soft syndiotactic polypropylene composition.

Example 18

To the total (100 parts by weight) of 42 parts by weight of the syndiotactic polypropylene obtained in Synthesis Example 1, 28 parts by weight of the isotactic propylene (co)polymer obtained in Synthesis Example 8, 24 parts by weight of the syndiotactic propylene/ethylene copolymer obtained in Synthesis Example 4 and 6 parts by weight of the isotactic propylene/ethylene copolymer obtained in Synthesis Example 3, 0.02 part by weight of a sorbitol type crystal nucleating agent Gelol MD (available from Shinnihon Rikagaku) was added, and they were melt kneaded to obtain a soft syndiotactic polypropylene composition.

Example 19

To the total (100 parts by weight) of 42 parts by weight of the syndiotactic polypropylene obtained in Synthesis Example 1, 28 parts by weight of the isotactic propylene (co)polymer obtained in Synthesis Example 8, 24 parts by weight of the atactic propylene/ethylene copolymer obtained in Synthesis Example 2 and 6 parts by weight of the isotactic propylene/ethylene copolymer obtained in Synthesis Example 3, 0.02 part by weight of a sorbitol type crystal nucleating agent Gelol MD (available from Shinnihon Rikagaku) was added, and they were melt kneaded to obtain a soft syndiotactic polypropylene composition.

Example 20

To the total (100 parts by weight) of 42 parts by weight of the syndiotactic polypropylene obtained in Synthesis Example 1, 28 parts by weight of the isotactic propylene (co)polymer obtained in Synthesis Example 8, 24 parts by weight of the atactic propylene/butene copolymer obtained in Synthesis Example 5 and 6 parts by weight of the syndiotactic propylene/butene copolymer obtained in Synthesis Example 6, 0.02 part by weight of a sorbitol type crystal nucleating agent Gelol MD (available from Shinnihon Rikagaku) was added, and they were melt kneaded to obtain a soft syndiotactic polypropylene composition.

Example 21

36 Parts by weight of the syndiotactic propylene polymer obtained in Synthesis Example 1, 35 parts by weight of the syndiotactic-structure propylene/ethylene copolymer obtained in Synthesis Example 2, 5 parts by weight of an ethylene/butene copolymer (density: 0.891 g/cm3, ethylene content: 90% by mol) and 24 parts by weight of the isotactic propylene/ethylene random copolymer obtained in Synthesis Example 8 were blended and melt kneaded to obtain a soft syndiotactic polypropylene composition.

The compositions obtained in the above examples were measured on various properties. The results are set forth in Table 4.

TABLE 4

| | Syndiotactic propylene polymer (A) (part(s) by weight) | α-olefin polymer (B) (parts(s) by weight) | | Isotactic propylene polymer (E) (part(s) by weight) | Crystal nucleating agent (C) (part(s) by weight) | Tensile modulus (MPa) | Martens' hardness (1/mm) | Penetration temperature (° C.) | Haze (%) |
|---|---|---|---|---|---|---|---|---|---|
| Ex. 17 | Synthesis Ex. 1 42 | Synthesis Ex. 2 24 | Synthesis Ex. 4 6 | Synthesis Ex. 8 28 | 0.02 | 144 | 11.2 | 124 | 12.5 |
| Ex. 18 | Synthesis Ex. 1 42 | Synthesis Ex. 4 24 | Synthesis Ex. 3 6 | Synthesis Ex. 8 28 | 0.02 | 174 | 9.4 | 123 | 14.9 |
| Ex. 19 | Synthesis Ex. 1 42 | Synthesis Ex. 2 24 | Synthesis Ex. 3 6 | Synthesis Ex. 8 28 | 0.02 | 183 | 10.3 | 126 | 17.6 |
| Ex. 20 | Synthesis Ex. 1 42 | Synthesis Ex. 5 24 | Synthesis Ex. 6 6 | Synthesis Ex. 8 28 | 0.02 | 165 | 11.7 | 127 | 11.6 |

TABLE 4-continued

| | Syndiotactic propylene polymer (A) (part(s) by weight) | α-olefin polymer (B) (parts(s) by weight) | | Isotactic propylene polymer (E) (part(s) by weight) | Crystal nucleating agent (C) (part(s) by weight) | Tensile modulus (MPa) | Martens' hardness (1/mm) | Penetration temperature (° C.) | Haze (%) |
|---|---|---|---|---|---|---|---|---|---|
| Ex. 21 | Synthesis Ex. 1 36 | Synthesis Ex. 2 35 | Ethylene/ butene copolymer 5 | Synthesis Ex. 8 24 | None | 145 | 11.2 | 128 | 14.3 |

Example 22

With the total (100 parts by weight) of 42 parts by weight of the syndiotactic propylene polymer obtained in Synthesis Example 1, 30 parts by weight of the atactic propylene/ethylene copolymer obtained in Synthesis Example 2 and 28 parts by weight of the isotactic propylene/ethylene random copolymer obtained in Synthesis Example 8, 0.5 part by weight of polyethylene (trade name: 2200J, available from Mitsui Chemicals, Inc., density: 0.96 g/cm$^3$) was blended, and the blend was melt kneaded to obtain a soft syndiotactic polypropylene composition.

Example 23

With the total (100 parts by weight) of 36 parts by weight of the syndiotactic propylene polymer obtained in Synthesis Example 1, 40 parts by weight of the syndiotactic propylene/ethylene copolymer obtained in Synthesis Example 4 and 24 parts by weight of the isotactic propylene/ethylene random copolymer obtained in Synthesis Example 8, 0.5 part by weight of polyethylene (trade name: 2200J) was blended, and the blend was melt kneaded to obtain a soft syndiotactic polypropylene composition.

Example 24

With the total (100 parts by weight) of 42 parts by weight of the syndiotactic propylene polymer obtained in Synthesis Example 1, 30 parts by weight of the atactic propylene/butene copolymer obtained in Synthesis Example 5 and 28 parts by weight of the isotactic propylene/ethylene random copolymer obtained in Synthesis Example 8, 0.5 part by weight of polyethylene (trade name: 2200J) was blended, and the blend was melt kneaded to obtain a soft syndiotactic polypropylene composition.

Comparative Example 10

In a kneader, 40 parts by weight of the syndiotactic propylene/ethylene copolymer obtained in Synthesis Example 4 and 60 parts by weight of the isotactic propylene/ethylene random copolymer obtained in Synthesis Example 8 were placed, and they were melt kneaded to obtain a polypropylene composition.

The compositions obtained in the above examples and comparative example were measured on various properties. The results are set forth in Table 5.

TABLE 5

| | Syndiotactic propylene polymer (A) (part(s) by weight) | α-olefin polymer (B) (part(s) by weight) | Isotactic propylene polymer (E) (part(s) by weight) | Ethylene-based Polymer (D) (part(s) by weight) | Elastic modulus (MPa) | Martens' hardness (1/mm) | Penetration temperature (° C.) | Haze (%) | Crystallizing rate (sec) |
|---|---|---|---|---|---|---|---|---|---|
| Ex. 22 | Synthesis Ex. 1 42 | Synthesis Ex. 2 30 | Synthesis Ex. 8 28 | PE (2000J) 0.5 | 125 | 11.2 | 115 | 12.3 | 300 |
| Ex. 23 | Synthesis Ex. 1 36 | Synthesis Ex. 4 40 | Synthesis Ex. 8 24 | PE (2000J) 0.5 | 182 | 14.0 | 115 | 8.0 | 250 |
| Ex. 24 | Synthesis Ex. 1 42 | Synthesis Ex. 5 30 | Synthesis Ex. 8 28 | PE (2000J) 0.5 | 177 | 13.6 | 120 | 16.0 | 270 |
| Comp Ex. 10 | None | Synthesis Ex. 4 40 | Synthesis Ex. 8 60 | None | 248 | 8.2 | 129 | 92.6 | 290 |

Synthesis Example 9

Synthesis of Syndiotactic Propylene/Ethylene Copolymer

The procedure of Synthesis Example 4 was repeated, except that the polymerization temperature was changed to 10° C., the pressure of ethylene was changed to 7 kg/cm$^2$, and the polymerization time was changed to 15 minutes.

The yield of the propylene/ethylene copolymer obtained above was 33 g, and this copolymer had an intrinsic viscosity (1), as measured in decalin at 135° C., of 2.0 dl/g, a glass transition temperature (Tg) of −54° C., an ethylene content of 45% by mol, and a molecular weight distribution, as measured by GPC, of 2.9.

Synthesis Example 10

Synthesis of Amorphous α-olefin Copolymer

The procedure of Synthesis Example 2 was repeated, except that the amount of propylene was changed to 28.5 liters (25° C., 1 atom).

The yield of the propylene/ethylene copolymer obtained above was 39 g, and this copolymer had an intrinsic viscosity (η), as measured in decalin at 135° C., of 2.9 dl/g, a glass transition temperature (Tg) of −31° C., an ethylene content of 24% by mol (ethylene: 17.4% by weight), an activity of 412 kg/mmol-Zr·hr, and a molecular weight distribution, as measured by GPC, of 2.4. A melting peak measured by DSC was not substantially observed.

Example 25

With the total (100 parts by weight) of 36 parts by weight of the syndiotactic propylene polymer obtained in Synthesis Example 1, 6 parts by weight of the syndiotactic-structure propylene/ethylene copolymer obtained in Synthesis Example 4, 24 parts by weight of the atactic propylene/ethylene copolymer obtained in Synthesis Example 2, 10 parts by weight of an ethylene/octene copolymer (trade name: H430, available from Mitsui Chemicals, Inc., density: 0.872 g/cm$^3$) and 24 parts by weight of the isotactic propylene/ethylene random copolymer obtained in Synthesis Example 8, 1 part by weight of polyethylene (trade name: 2200J) was blended, and the blend was melt kneaded to obtain a soft syndiotactic polypropylene composition.

Example 26

With the total (100 parts by weight) of 36 parts by weight of the syndiotactic propylene polymer obtained in Synthesis Example 1, 6 parts by weight of the syndiotactic propylene/ethylene copolymer obtained in Synthesis Example 4, 24 parts by weight of the atactic propylene/ethylene copolymer obtained in Synthesis Example 10, 10 parts by weight of an ethylene/octene copolymer (trade name: H430, available from Mitsui Chemicals, Inc.) and 24 parts by weight of the isotactic propylene/ethylene random copolymer obtained in Synthesis Example 8, 1 part by weight of polyethylene (trade name: 2200J, available from Mitsui Chemicals, Inc.) was blended, and the blend was melt kneaded to obtain a soft syndiotactic polypropylene composition.

Example 27

With the total (100 parts by weight) of 42 parts by weight of the syndiotactic propylene polymer obtained in Synthesis Example 1, 4 parts by weight of the syndiotactic propylene/ethylene copolymer obtained in Synthesis Example 4, 16 parts by weight of the atactic propylene/ethylene copolymer obtained in Synthesis Example 2, 10 parts by weight of an ethylene/octene copolymer (trade name: H430, available from Mitsui Chemicals, Inc.) and 28 parts by weight of the isotactic propylene/ethylene random copolymer obtained in Synthesis Example 8, 1 part by weight of polyethylene (trade name: 2200J, available from Mitsui Chemicals, Inc.) was blended, and the blend was melt kneaded to obtain a soft syndiotactic polypropylene composition.

Comparative Example 11

With the total (100 parts by weight) of 36 parts by weight of the syndiotactic propylene polymer obtained in Synthesis Example 1, 6 parts by weight of the syndiotactic propylene/ethylene copolymer obtained in Synthesis Example 9, 24 parts by weight of the atactic propylene/ethylene copolymer obtained in Synthesis Example 2, 10 parts by weight of an ethylene/octene copolymer (trade name: H430, available from Mitsui Chemicals, Inc.) and 24 parts by weight of the propylene/ethylene random copolymer obtained in Synthesis Example 8, 1 part by weight of polyethylene (trade name: 2200J, available from Mitsui Chemicals, Inc.) was blended, and the blend was melt kneaded to obtain a polypropylene composition.

Comparative Example 12

With the total (100 parts by weight) of 36 parts by weight of the syndiotactic propylene polymer obtained in Synthesis Example 1, 40 parts by weight of the syndiotactic propylene/ethylene copolymer obtained in Synthesis Example 9 and 24 parts by weight of the propylene/ethylene random copolymer obtained in Synthesis Example 8, 1 part by weight of polyethylene (trade name: 2200J, available from Mitsui Chemicals, Inc.) was blended, and the blend was melt kneaded to obtain a polypropylene composition.

Comparative Example 13

With the total (100 parts by weight) of 42 parts by weight of the syndiotactic propylene polymer obtained in Synthesis Example 1, 30 parts by weight of the atactic propylene/ethylene copolymer obtained in Synthesis Example 2 and 28 parts by weight of the propylene/ethylene random copolymer obtained in Synthesis Example 8, 1 part by weight of polyethylene (trade name: 2200J, available from Mitsui Chemicals, Inc.) was blended, and the blend was melt kneaded to obtain a polypropylene composition.

The compositions obtained in the above examples and comparative examples and the films produced from the compositions were measured on various properties. The results are set forth in Table 6.

TABLE 6

| | | Ex. 25 | Ex. 26 | Ex. 27 | Comp Ex. 11 | Comp Ex. 12 | Comp Ex. 13 |
|---|---|---|---|---|---|---|---|
| Composition | (A) (part(s) by weight) | Synthesis Ex. 1 36 | Synthesis Ex. 1 36 | Synthesis Ex. 1 42 | Synthesis Ex. 1 36 | Synthesis Ex. 1 36 | Synthesis Ex. 1 42 |
| | (B1) (part(s) by weight) | Synthesis Ex. 4 6 | Synthesis Ex. 4 6 | Synthesis Ex. 4 4 | Synthesis Ex. 9 6 | Synthesis Ex. 9 40 | — |
| | (B2) (part(s) by weight) | Synthesis Ex. 2 24 | Synthesis Ex. 10 24 | Synthesis Ex. 2 16 | Synthesis Ex. 2 24 | — | Synthesis Ex. 2 30 |
| | (B3) (part(s) by weight) | Ethylene/ octene copolymer 10 | Ethylene/ octene copolymer 10 | Ethylene/ octene copolymer 10 | Ethylene/ octene copolymer 10 | — | — |

TABLE 6-continued

| | | Ex. 25 | Ex. 26 | Ex. 27 | Comp Ex. 11 | Comp Ex. 12 | Comp Ex. 13 |
|---|---|---|---|---|---|---|---|
| | (E) | Synthesis Ex. 8 | Synthesis Ex. 8 | Synthesis Ex. 8 | Synthesis Ex. 8 | Synthesis Ex. 8 | Synthesis Ex. 8 |
| | (part(s) by weight) | 24 | 24 | 28 | 24 | 24 | 28 |
| | (D) | PE | PE | PE | PE | PE | PE |
| | (part(s) | (2200J) | (2200J) | (2200J) | (2200J) | (2200J) | (2200J) |
| | by weight) | 1 | 1 | 1 | 1 | 1 | 1 |
| Property | Tensile modulus (MPa) | 175 | 152 | 187 | 175 | 128 | 118 |
| | Martens' hardness (1/mm) | 13.2 | 12.0 | 13.6 | 10.2 | 11.2 | 11.8 |
| | Penetration temperature (° C.) | 118 | 115 | 120 | 115 | 122 | 119 |
| | Haze (%) | 10.3 | 8.0 | 9.0 | 19.5 | 12.6 | 14.6 |
| | Crystallizing rate (sec) | 300 | 320 | 270 | 370 | 340 | 320 |
| | Film haze (%) | 2.1 | 2.9 | 2.2 | 5.2 | 2.2 | 3.2 |
| | Film impact (kJ/m) | 5 | 8 | 6 | 6 | 3 | 2.5 |
| | Strain recovery (%) | 72 | 71 | 70 | 65 | 60 | 68 |

(A): Syndiotactic propylene polymer
(B1): Syndiotactic-structure propylene/ethylene copolymer
(B2): Amorphous α-olefin polymer
(B3): Ethylene/α-olefin polymer
(E): Isotactic propylene polymer
(D): Ethylene-based polymer

Example 28

With the total (100 parts by weight) of 42 parts by weight of the syndiotactic propylene polymer obtained in Synthesis Example 1, 30 parts by weight of the syndiotactic-structure propylene/ethylene copolymer obtained in Synthesis Example 4 and 28 parts by weight of the isotactic propylene/ethylene random copolymer obtained in Synthesis Example 5, 20 parts by weight of an ethylene/vinyl acetate copolymer (trade name: EV460, available from Mitsui Dupont Polychemical K.K., vinyl acetate content: 19% by weight, density: 0.94 g/cm$^3$) and 1 part by weight of polyethylene (trade name: 2200J, available from Mitsui Chemicals, Inc.) were blended, and the blend was melt kneaded to obtain a soft syndiotactic polypropylene composition.

Example 29

With the total (100 parts by weight) of 42 parts by weight of the syndiotactic propylene polymer obtained in Synthesis Example 1, 30 parts by weight of the syndiotactic propylene/ethylene copolymer obtained in Synthesis Example 9 and 28 parts by weight of the isotactic propylene/ethylene random copolymer obtained in Synthesis Example 5, 20 parts by weight of an ethylene/vinyl acetate copolymer (trade name: EV460, available from Mitsui Dupont Polychemical K.K.) and 1 part by weight of polyethylene (trade name: 2200J, available from Mitsui Chemicals, Inc.) were blended, and the blend was melt kneaded to obtain a soft syndiotactic polypropylene composition.

Example 30

With the total (100 parts by weight) of 42 parts by weight of the syndiotactic propylene polymer obtained in Synthesis Example 1, 30 parts by weight of the atactic propylene/ethylene copolymer obtained in Synthesis Example 2 and 28 parts by weight of the isotactic propylene/ethylene random copolymer obtained in Synthesis Example 5, 20 parts by weight of an ethylene/vinyl acetate copolymer (trade name: EV460, available from Mitsui Dupont Polychemical K.K.) and 1 part by weight of polyethylene (trade name: 2200J, available from Mitsui Chemicals, Inc.) were blended, and the blend was melt kneaded to obtain a soft syndiotactic polypropylene composition.

Example 31

With the total (100 parts by weight) of 42 parts by weight of the syndiotactic propylene polymer obtained in Synthesis Example 1, 30 parts by weight of the atactic propylene/ethylene copolymer obtained in Synthesis Example 10 and 28 parts by weight of the isotactic propylene/ethylene random copolymer obtained in Synthesis Example 5, 20 parts by weight of an ethylene/vinyl acetate copolymer (trade name: EV460, available from Mitsui Dupont Polychemical K.K.) and 1 part by weight of polyethylene (trade name: 2200J, available from Mitsui Chemicals, Inc.) were blended, and the blend was melt kneaded to obtain a soft syndiotactic polypropylene composition.

The compositions obtained in the above examples and the films produced from the compositions were measured on various properties. The results are set forth in Table 7.

TABLE 7

| | | Ex. 28 | Ex. 29 | Ex. 30 | Ex. 31 |
|---|---|---|---|---|---|
| Com-position | Syndiotactic propylene polymer (A) (part(s) by weight) | Synthesis Ex. 1 42 | Synthesis Ex. 1 42 | Synthesis Ex. 1 42 | Synthesis Ex. 1 42 |
| | α-olefin polymer (B) (part(s) by weight) | Synthesis Ex. 4 30 | Synthesis Ex. 9 30 | Synthesis Ex. 2 30 | Synthesis Ex. 10 30 |
| | Isotactic propylene polymer (E) (part(s) by weight) | Synthesis Ex. 5 28 | Synthesis Ex. 5 28 | Synthesis Ex. 5 28 | Synthesis Ex. 5 28 |
| | Copolymer (F) of polar group-containing vinyl and ethylene (part(s) by weight) | EV 460 20 | EV 460 20 | EV 460 20 | EV 460 20 |
| | Ethylene-based polymer (D) (part(s) by weight) | PE (2200J) 1 | PE (2200J) 1 | PE (2200J) 1 | PE (2200J) 1 |
| Prop-erty | Tensile modulus (MPa) | 155 | 150 | 167 | 160 |
| | Martens' hardness (1/mm) | 12.2 | 11.0 | 13.6 | 12.6 |
| | Penetration temperature (° C.) | 118 | 115 | 120 | 119 |
| | Haze (%) | 8.3 | 10.0 | 9.0 | 10.1 |
| | Crystallizing rate (sec) | 300 | 320 | 270 | 280 |
| | Film haze (%) | 2.7 | 3.0 | 2.2 | 2.8 |
| | Film impact (kJ/m) | 5 | 8 | 6 | 6 |
| | Strain recovery (%) | 72 | 71 | 75 | 73 |
| | Tear strength (N/cm) | 150 | 140 | 100 | 110 |

Example 32

Using the syndiotactic polypropylene composition (SP-1) obtained in Example 28, an ethylene/vinyl acetate copolymer saponification product (trade name: Kraray Eval EP-F, available from Kraray Co., Ltd., MFR: 1.3 g/10 min, density: 1.19 g/cm$^3$, ethylene unit content: 32% by mol, referred to as "EVOH" hereinafter) and maleic acid-modified polyethylene (trade name: Admer HX-210, available from Mitsui Chemicals, Inc., referred to as "M-PE" hereinafter) as an adhesive resin, a 5-layer sheet was produced under the following conditions.

Sheet structure: SP-1/M-PE/EVOH/M-PE/SP-1

Thickness (μm) of each layer: 50/15/30/15/50

Extruder: 30 mmØ extruder 210° C. (for EVOH)
30 mmØ extruder 230° C. (for M-PE)
40 mmØ extruder 200° C. (for SP-1)

In the 5-layer sheet thus obtained, the interlaminar strength (F EVOH) between the EVOH layer and the M-PE layer was 650 g/15 mm, and the interlaminar strength (F SP-1) between the SP-1 layer and the M-PE layer was 770 g/15 mm.

Example 33

Using the syndiotactic polypropylene composition (SP-2) obtained in Example 29, EVOH and M-PE as an adhesive resin, a 5-layer sheet was produced under the following conditions.

Sheet structure: SP-2/M-PE/EVOH/M-PE/SP-2

Thickness (μm) of each layer: 50/15/30/15/50

Extruder: 30 mmØ extruder 210° C. (for EVOH)
30 mmØ extruder 230° C. (for M-PE)
40 mmØ extruder 200° C. (for SP-2)

In the 5-layer sheet thus obtained, the interlaminar strength (F EVOH) between the EVOH layer and the M-PE layer was 640 g/15 mm, and the interlaminar strength (F SP-2) between the SP-2 layer and the M-PE layer was 830 g/15 mm.

Example 34

Using the syndiotactic polypropylene composition (SP-3) obtained in Example 30, EVOH and M-PE as an adhesive resin, a 5-layer sheet was produced under the following conditions.

Sheet structure: SP-3/M-PE/EVOH/M-PE/SP-3

Thickness (μm) of each layer: 50/15/30/15/50

Extruder: 30 mmØ extruder 210° C. (for EVOH)
30 mmØ extruder 230° C. (for M-PE)
40 mmØ extruder 200° C. (for SP-3)

In the 5-layer sheet thus obtained, the interlaminar strength (F EVOH) between the EVOH layer and the M-PE layer was 620 g/15 mm, and the interlaminar strength (F SP-3) between the SP-3 layer and the M-PE layer was 860 g/15 mm.

Example 35

Using the syndiotactic polypropylene composition (SP-4) obtained in Example 31, EVOH and M-PE as an adhesive resin, a 5-layer sheet was produced under the following conditions.

Sheet structure: SP-4/M-PE/EVOH/M-PE/SP-4

Thickness (μm) of each layer: 50/15/30/15/50

Extruder: 30 mmØ extruder 210° C. (for EVOH)
30 mmØ extruder 230° C. (for M-PE)
40 mmØ extruder 200° C. (for SP-4)

In the 5-layer sheet thus obtained, the interlaminar strength (F EVOH) between the EVOH layer and the M-PE layer was 580 g/15 mm, and the interlaminar strength (F SP-4) between the SP-4 layer and the M-PE layer was 760 g/15 mm.

Example 36

A 3-layer sheet was produced under the following conditions in the same manner as in Example 32, except that an ethylene/vinyl acetate copolymer (MFR: 2.5 g/10 min, vinyl acetate content: 25% by weight, referred to as "EVA" hereinafter) was used instead of the ethylene/vinyl acetate copolymer saponification product (EVOH), and the adhesive resin M-PE was not used.

Sheet structure: SP-1/EVA/SP-1

Thickness (μm) of each layer: 50/30/50

Extruder: 30 mmØ extruder 200° C. (for EVA)
40 mmØ extruder 200° C. (for SP-1)

In the 3-layer sheet thus obtained, the interlaminar strength (F EVA) between the EVA layer and the SP-1 layer was 460 g/15 mm.

What is claimed is:

1. A soft syndiotactic polypropylene composition comprising:

(A) a syndiotactic propylene polymer which comprises recurring units ($U_{pr}$) derived from propylene having a substantially syndiotactic structure, and optionally, recurring units ($U_{et}$) derived from ethylene and/or recurring units ($U_{ol}$) derived from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 10 dl/g, (B) an α-olefin polymer which comprises at least one recurring unit derived from an α-olefin selected from α-olefins of 2 to 20 carbon atoms, said at least one recurring unit present in amounts of 50 to 100% by mol, and said polymer has a Young's modulus of not more than 150 MPA, (E) an isotactic propylene polymer which comprises recurring units ($U_{pr}$) derived from propylene having a substantially isotactic structure, and optionally, recurring units ($U_{et}$) derived from ethylene and/or recurring units ($U_{ol}$) derived from an α-olefin of 4 to 20 carbon atoms, contains the recurring units ($U_{pr}$) in amounts of 90 to 100% by mol, the recurring units ($U_{et}$) in amounts of 0 to 10% by mol and the recurring units ($U_{ol}$) in amounts of 0 to 9.5% by mol, and has an intrinsic viscosity (η), as measured in decalin at 135° C., of 0.5 to 6 dl/g, and optionally, (C) a crystal nucleating agent and/or (D) an ethylene-based polymer having a density of 0.91 to 0.97 g/cm$^3$, wherein:

the weight ratio (A/E) of the syndiotactic propylene polymer (A) to the isotactic propylene polymer (E) is in the range of 99/1 to 1/99, and the weight ratio ((A+E)/B) of the total of the syndiotactic propylene polymer (A) and the isotactic propylene polymer (E) to the α-olefin polymer is in the range of 90/10 to 10/90.

2. The soft syndiotactic polypropylene composition as claimed in claim 1, wherein:

said composition comprises the syndiotactic propylene polymer (A), the α-olefin polymer (B) and the isotactic propylene polymer (E), the weight ratio (A/E) of the syndiotactic propylene polymer (A) to the isotactic propylene polymer (E) is in the range of 99/1 to 1/99, and the weight ratio ((A+E)/B) of the total of the syndiotactic propylene polymer (A) and the isotactic propylene polymer (E) to the α-olefin polymer (B) is in the range of 90/10 to 10/90.

3. The soft syndiotactic polypropylene composition as claimed in claim 1, wherein:

said composition comprises the syndiotactic propylene polymer (A), the α-olefin polymer (B), the isotactic propylene polymer (E) and the crystal nucleating agent (C), the weight ratio (A/E) of the syndiotactic propylene polymer (A) to the isotactic propylene polymer (E) is in the range of 99/1 to 1/99, the weight ratio ((A+E)/B) of the total of the syndiotactic propylene polymer (A) and the isotactic propylene polymer (E) to the α-olefin polymer (B) is in the range of 90/10 to 10/90, and the crystal nucleating agent (C) is contained in an amount of 0.01 to 1 part by weight based on 100 parts by weight of the total of the syndiotactic propylene polymer (A), the α-olefin polymer (B) and the isotactic propylene polymer (E).

4. The soft syndiotactic polypropylene composition as claimed in claim 3, wherein the crystal nucleating agent (C) is a sorbitol crystal nucleating agent.

5. The soft syndiotactic polypropylene composition as claimed in claim 4, wherein:

the syndiotactic propylene polymer (A) has a syndiotacticity, that is based on triad sequences of the propylene units, of not less than 0.6, and the α-olefin polymer (B) has an intrinsic viscosity (η), as measured in decalin at 135° C., of 0.01 to 10 dl/g, a molecular weight distribution (Mw/Mn), as determined by gel permeation chromatography (GPC), of not more than 4 and a glass transition temperature of not higher than −5° C.

6. The soft syndiotactic polypropylene composition as claimed in claim 1, wherein:

said composition comprises the syndiotactic propylene polymer (A), two or more of the α-olefin copolymers (B) and the isotactic propylene polymer (E), the weight ratio (A/E) of the syndiotactic propylene polymer (A) to the isotactic propylene polymer (E) is in the range of 99/1 to 1/99, the weight ratio ((A+E)/(total of B)) of the total of the syndiotactic propylene polymer (A) and the isotactic propylene polymer (E) to the total of the two or more α-olefin copolymers (B) is in the range of 90/10 to 10/90, and each content of the two or more α-olefin polymers (B) is at least 1% by weight.

7. The soft syndiotactic polypropylene composition as claimed in claim 1, wherein:

said composition comprises the syndiotactic propylene polymer (A), two or more of the α-olefin copolymers (B), the isotactic propylene polymer (E) and the crystal nucleating agent (C), the weight ratio (A/E) of the syndiotactic propylene polymer (A) to the isotactic propylene polymer (E) is in the range of 99/1 to 1/99, the weight ratio ((A+E)/(total of B)) of the total of the syndiotactic propylene polymer (A) and the isotactic propylene polymer (E) to the total of the two or more α-olefin copolymers (B) is in the range of 90/10 to 10/90, each content of the two or more α-olefin polymers (B) is at least 1% by weight, and the crystal nucleating agent (C) is contained in an amount of 0.01 to 1 part by weight based on 100 parts by weight of the total of the syndiotactic propylene polymer (A), the two or more α-olefin copolymers (B) and the isotactic propylene polymer (E).

8. The soft syndiotactic polypropylene composition as claimed in claim 7, wherein the α-olefin polymer (B) has an intrinsic viscosity (η), as measured in decalin at 135° C., of 0.01 to 10 dl/g, a molecular weight distribution (Mw/Mn), as determined by gel permeation chromatography, of not more than 4 and a glass transition temperature of not higher than −5° C.

9. The soft syndiotactic polypropylene composition as claimed in claim 1, wherein:

said composition comprises the syndiotactic propylene polymer (A), the α-olefin polymer (B), the isotactic propylene polymer (E) and the ethylene-based polymer (D), the weight ratio (A/E) of the syndiotactic propylene polymer (A) to the isotactic propylene polymer (E) is in the range of 99/1 to 1/99, the weight ratio ((A+E)/B) of the total of the syndiotactic propylene polymer (A) and the isotactic propylene polymer (E) to the α-olefin polymer (B) is in the range of 90/10 to 10/90, and the ethylene-based polymer (D) is contained in an amount of 0.01 to 5 parts by weight based on 100 parts by weight of the total of the syndiotactic propylene polymer (A), the α-olefin polymer (B) and the isotactic propylene polymer (E).

10. The soft syndiotactic polypropylene composition as claimed in claim 9, wherein the α-olefin polymer (B) has an intrinsic viscosity (η), as measured in decalin at 135° C., of 0.01 to 10 dl/g, a molecular weight distribution (Mw/Mn), as determined by gel permeation chromatography, of not more than 4 and a glass transition temperature of not higher than −5° C.

11. The soft syndiotactic polypropylene composition as claimed in claim 1, wherein the α-olefin polymer (B) is a copolymer comprising recurring units derived from ethylene in amounts of 50 to 99% by mol and recurring units derived from at least one α-olefin selected from α-olefins of 3 to 20 carbon atoms in amounts of 1 to 50% by mol.

12. The soft syndiotactic polypropylene composition as claimed in claim 1, wherein the α-olefin polymer (B) is a copolymer comprising recurring units derived from propylene in amounts of 50 to 99% by mol and recurring units derived from at least one α-olefin selected from ethylene and α-olefins of 4 to 20 carbon atoms in amounts of 1 to 50% by mol.

13. The soft syndiotactic polypropylene composition as claimed in claim 1, wherein the isotactic propylene polymer (E) has a microisotacticity, that is based on triad sequences of the propylene units, of not less than 0.8.

14. The soft syndiotactic polypropylene composition as claimed in claim 1, wherein the α-olefin polymer (B) is one obtained in the presence of a metallocene catalyst comprising:

(a1) a transition metal compound represented by the following formula (I) or (II):

(I)

Z, $Cp^2$, $Cp^1$, M, $X^2$, $X^1$ (II)

Z, Y, $Cp^1$, M, $X^2$, $X^1$ wherein M is Ti, Zr, Hf, Rn, Nd, Sm or Ru; $Cp^1$ and $Cp^2$ are each a cyclopentadienyl group, an indenyl group, a fluorenyl group or a derivative group thereof, each of which is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is an atom of C, O, B, S, Ge, Si or Sn, or a group containing any of these atoms, and (b) at least one compound selected from:

(b-1) a compound which reacts with a transition metal M in the transition metal compound (a1) to form an ionic complex, (b-2) an organoaluminum oxy-compound, and (b-3) an organoaluminum compound.

15. A laminate comprising:

a layer which comprises a thermoplastic resin, and a layer which comprises the soft syndiotactic polypropylene composition of claim 1.

16. A laminate comprising:

a layer which comprises a polyolefin resin, and a layer which comprises the soft syndiotactic polypropylene composition of claim 1.

17. A laminate comprising:

a layer which comprises an ethylene-based polymer resin or an isotactic propylene polymer resin, and a layer which comprises the soft syndiotactic polypropylene composition of claim 1.

18. A laminate comprising:

a layer which comprises an ethylene/vinyl acetate copolymer resin, and a layer which comprises the soft syndiotactic polypropylene composition of claim 1.

19. A laminate comprising:

a layer which comprises an ethylene/vinyl acetate copolymer saponification product, and a layer which comprises the soft syndiotactic polypropylene composition of claim 1.

20. A molded product comprising the soft syndiotactic polypropylene composition of claim 1.

21. The soft syndiotactic polypropylene composition as claimed in claim 3; wherein:

the syndiotactic propylene polymer (A) has a syndiotacticity, that is based on triad sequences of the propylene units, of not less than 0.6, and the α-olefin polymer (B) has an intrinsic viscosity (η), as measured in decalin at 135° C., of 0.01 to 10 dl/g, a molecular weight distribution (Mw/Mn), as determined by gel permeation chromatography (GPC), of not more than 4 and a glass transition temperature of not higher than −5° C.

22. The soft syndiotactic polypropylene composition as claimed in claim 2, wherein:

the syndiotactic propylene polymer (A) has a syndiotacticity, that is based on triad sequences of the propylene units, of not less than 0.6, and the α-olefin polymer (B) has an intrinsic viscosity (η), as measured in decalin at 135° C., of 0.01 to 10 dl/g, a molecular weight distribution (Mw/Mn), as determined by gel permeation chromatography (GPC), of not more than 4 and a glass transition temperature of not higher than −5° C.

23. The soft syndiotactic polypropylene composition as claimed in claim 6, wherein the α-olefin polymer (B) has an intrinsic viscosity (η), as measured in decalin at 135° C., of 0.01 to 10 dl/g, a molecular weight distribution (Mw/Mn), as determined by gel permeation chromatography, of not more than 4 and a glass transition temperature of not higher than −5° C.

* * * * *